(12) United States Patent
Kondo et al.

(10) Patent No.: US 10,051,217 B2
(45) Date of Patent: Aug. 14, 2018

(54) SOLID-STATE IMAGING DEVICE AND IMAGING SYSTEM FOR TRANSFERRING SIGNAL CHARGES DURING THE SAME EXPOSURE PERIOD

(71) Applicant: OLYMPUS CORPORATION, Hachioji-shi, Tokyo (JP)

(72) Inventors: Toru Kondo, Tokyo (JP); Nobuyuki Watanabe, Yokohama (JP)

(73) Assignee: OLYMPUS CORPORATION, Tokyo (JP)

(*) Notice: Subject to any disclaimer, the term of this patent is extended or adjusted under 35 U.S.C. 154(b) by 0 days.

(21) Appl. No.: 15/226,418

(22) Filed: Aug. 2, 2016

(65) Prior Publication Data
US 2016/0344958 A1 Nov. 24, 2016

Related U.S. Application Data

(63) Continuation of application No. PCT/JP2015/051200, filed on Jan. 19, 2015.

(30) Foreign Application Priority Data

Feb. 3, 2014 (JP) .................................. 2014-018413

(51) Int. Cl.
*H04N 5/361* (2011.01)
*H04N 5/232* (2006.01)
(Continued)

(52) U.S. Cl.
CPC ............. *H04N 5/361* (2013.01); *H04N 5/235* (2013.01); *H04N 5/23212* (2013.01); *H04N 5/345* (2013.01); *H04N 5/378* (2013.01)

(58) Field of Classification Search
CPC ...... H04N 5/361; H04N 5/2312; H04N 5/235; H04N 5/345; H04N 5/378
See application file for complete search history.

(56) References Cited

U.S. PATENT DOCUMENTS 7,400,360 B2 * 7/2008 Linzer ...................... H04N 3/27
  348/554
8,976,281 B2 * 3/2015 Tanaka ............... H04N 5/23212
  348/302

(Continued)

FOREIGN PATENT DOCUMENTS

JP 2001-250931 A 9/2001
JP 2007-134806 A 5/2007
(Continued)

OTHER PUBLICATIONS

International Search Report dated Mar. 17, 2015, issued in counterpart applicaiton No. PCT/JP2015/051200 with English machine translation(2 pages).

*Primary Examiner* — Nicholas G Giles
(74) *Attorney, Agent, or Firm* — Westerman, Hattori, Daniels & Adrian, LLP

(57) ABSTRACT

A solid-state imaging device includes a plurality of pixels in which photoelectric conversion units that generate signal charges are arranged in a matrix, a plurality of first charge accumulation circuits that hold the signal charges and output the signal charges as a first pixel signal, a plurality of charge transfer circuits that transfer the signal charges to the first charge accumulation circuit, and a plurality of second charge accumulation circuits that hold signal charges based on the signal charges generated by the photoelectric conversion units and output the signal charges as a second pixel signal in which the number of pixels is reduced to a predetermined number, and the charge transfer circuit transfers the signal charges in the same exposure period to the second charge accumulation circuit when transferring the signal charges of the same exposure to the first charge accumulation circuit.

12 Claims, 33 Drawing Sheets

(51) Int. Cl.
*H04N 5/235* (2006.01)
*H04N 5/345* (2011.01)
*H04N 5/378* (2011.01)

(56) References Cited

U.S. PATENT DOCUMENTS

| | | | |
|---|---|---|---|
| 9,124,794 B2 * | 9/2015 | Choe | H04N 5/232 |
| 2010/0194958 A1 | 8/2010 | Honda et al. | |
| 2011/0188580 A1 * | 8/2011 | Valmiki | G06T 9/007 |
| | | | 375/240.24 |
| 2011/0261217 A1 * | 10/2011 | Muukki | G06T 3/4015 |
| | | | 348/222.1 |
| 2013/0063638 A1 * | 3/2013 | Tanaka | H04N 5/23212 |
| | | | 348/302 |

FOREIGN PATENT DOCUMENTS

| | | |
|---|---|---|
| JP | 2010-183195 A | 8/2010 |
| JP | 2011-250325 A | 12/2011 |
| JP | 2012-28971 A | 2/2012 |
| JP | 2012-165104 A | 8/2012 |
| JP | 2013-30913 A | 2/2013 |
| JP | 5226552 B2 | 7/2013 |

* cited by examiner

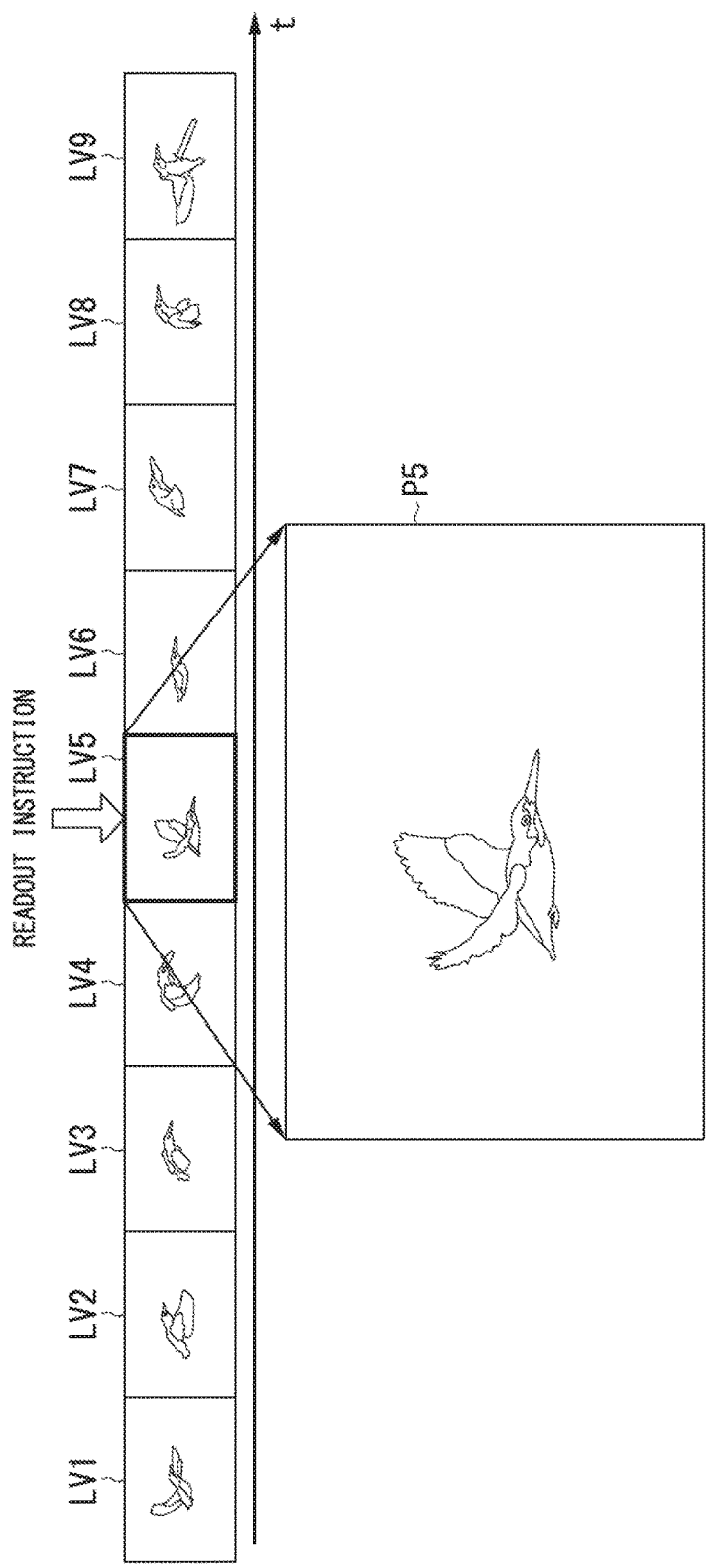

SOLID-STATE IMAGING DEVICE AND IMAGING SYSTEM FOR TRANSFERRING SIGNAL CHARGES DURING THE SAME EXPOSURE PERIOD

This application is a continuation application based on a PCT Patent Application No. PCT/JP2015/051200, filed on Jan. 19, 2015, whose priority is claimed on Japanese Patent Application No. 2014-018413, filed on Feb. 3, 2014, the content of which are incorporated herein by reference.

TECHNICAL FIELD

The present invention relates to a solid-state imaging device and an imaging system.

BACKGROUND ART

In recent years, imaging systems such as video cameras and electronic still cameras have spread among the general public. On such imaging systems, a charge coupled device (CCD) type solid-state imaging device or a complementary metal oxide semiconductor (CMOS) type solid-state imaging device is mounted. In a solid-state imaging device, a plurality of pixels are arranged in a two-dimensional matrix, signal charges generated by a photoelectric conversion unit such as a photodiode provided in the pixel on which light is incident are held in a charge holding unit, amplified by an amplifying unit provided in the pixel, and output as a pixel signal. In this case, in a general CMOS type solid-state imaging device, pixel signals from pixels arranged in a two-dimensional matrix are sequentially read for each row.

However, in an imaging system, there is an operation in which processing for a pixel signal of resolution corresponding to the total number of pixels included in a solid-state imaging device (full resolution) is not necessary. For example, while the processing for a pixel signal of full resolution of the solid-state imaging device is performed when a still image is captured in an imaging system, it is not necessary to perform the processing on a pixel signal of full resolution of the solid-state imaging device when a moving image is captured or when an image for confirming a subject, that is, a live view image (through image), is displayed on a display device provided in the imaging system. Further, in control such as auto exposure (AE), auto white balance (AWB), or auto focus (AF) performed when a still image is captured, or in confirmation of a dynamic range, confirmation of color of an entire image and, confirmation in image processing when a still image is generated such as confirmation of flickering of a fluorescent lamp, it is not necessary to perform the processing on a pixel signal of full resolution of the solid-state imaging device, and pixel signals of only some of the pixels may be read and the processing may be performed on the pixel signals.

This is because resolution necessary for each process is low in capturing of a moving image, generation of a live view image, and control when the still image is captured, in comparison with a case in which the still image is captured. Rather, in the capturing of a moving image, the generation of a live view image, or the control when the still image is captured, a frequency of update of an image to be processed is required to be high, that is, a frame rate is required to be high, rather than the resolution of the image. Further, in AF, AE, or AWB detection, an even higher frame rate is required.

Therefore, as a technology for reading pixel signals from a solid-state imaging device at a high frame rate, there is a method of decimating and reading pixel signals and adding and averaging signals of a plurality of pixels. This method has already been realized in a large number of imaging systems. A problem with such a method of reducing resolution and reading pixel signals is that, since a photoelectric conversion unit and a charge holding unit are occupied when the pixel signals are read, it is difficult to periodically overlay reading of pixel signals of full resolution of the solid-state imaging device and reading of pixel signals at decreased resolution. For example, in a digital camera, after a shutter is pressed at the time of capturing a still image at full resolution, it is difficult to perform photographing at a higher frame rate as described above while the signals are being read from the solid-state imaging device. As a method for solving this, for example, a technology as shown in Japanese Patent No. 5226552 is disclosed. In the technology disclosed in Japanese Patent No. 5226552, reading of pixel signals from a solid-state imaging device is decimated for each row of pixels to increase a frame rate. For example, the pixel signals of pixels included in the solid-state imaging device are first read to increase the frame rate through decimation at a rate of one line to seven lines, and then pixel signals of a row that is not decimated are read. Accordingly, in the technology disclosed in Japanese Patent No. 5226552, pixel signals for generating a moving image or a live view image, and pixel signals for generating a still image can be acquired.

Further, for example, a technology of a solid-state imaging device including pixels including a plurality of charge accumulation circuits that accumulate signal charges generated by photoelectric conversion units is also disclosed as in the technology disclosed in Japanese Unexamined Patent Application, First Publication No. 2013-030913. In the technology disclosed in Japanese Unexamined Patent Application, First Publication No. 2013-030913, respective signal charges generated by photoelectric conversion units in each exposure are accumulated in respective charge accumulation circuits. Accordingly, for example, solid pattern noise or the like is reduced, and output linearity of autofocus is improved.

SUMMARY OF INVENTION

According to a first aspect of the present invention, a solid-state imaging device includes a plurality of pixels in which photoelectric conversion units that generate signal charges obtained by photoelectrically converting incident light are arranged in a matrix; a plurality of first charge accumulation circuits that hold the signal charges generated by the photoelectric conversion unit and output a signal voltage according to the held signal charges as a first pixel signal; a plurality of charge transfer circuits that transfer the signal charges generated by the photoelectric conversion unit to the first charge accumulation circuit; and a plurality of second charge accumulation circuits that hold signal charges based on the signal charges generated by the photoelectric conversion units in the plurality of pixels and output a signal voltage according to the held signal charges as a second pixel signal in which the number of pixels is reduced to a predetermined number, wherein the charge transfer circuit transfers the signal charges generated by the corresponding photoelectric conversion unit in the same exposure period to the second charge accumulation circuit when transferring the signal charges of the same exposure to the first charge accumulation circuit.

According to a second aspect of the present invention, in the solid-state imaging device of the first aspect, the second charge accumulation circuit may hold signal charges of a charge amount obtained by adding or averaging the respective signal charges generated by the respective photoelectric conversion units in the plurality of corresponding pixels.

According to a third aspect of the present invention, in the solid-state imaging device of the first aspect, the second charge accumulation circuit may hold any one of the signal charges generated by the photoelectric conversion unit in a predetermined pixel among the respective signal charges generated by the respective photoelectric conversion units in the plurality of corresponding pixels.

According to a fourth aspect of the present invention, in the solid-state imaging device of the second aspect, the solid-state imaging device may further include; a photoelectric conversion substrate on which a plurality of photoelectric conversion units are arranged; a first substrate on which one of the plurality of first charge accumulation circuit and the plurality of second charge accumulation circuit are arranged; a second substrate on which the other of the plurality of first charge accumulation circuit and the plurality of second charge accumulation circuit are arranged; a first connection portion that electrically connects the photoelectric conversion substrate to the first substrate; and a second connection portion that electrically connects the first substrate to the second substrate.

According to a fifth aspect of the present invention, in the solid-state imaging device of the second aspect, the solid-state imaging device may further include: a photoelectric conversion substrate on which a plurality of photoelectric conversion units are arranged; a first substrate on which a plurality of first charge accumulation circuits and a plurality of second charge accumulation circuits are arranged; and a first connection portion that electrically connects the photoelectric conversion substrate to the first substrate.

According to a sixth aspect of the present invention, in the solid-state imaging device of the second aspect, an area in which a plurality of pixels are arranged in a matrix may include an area in which a plurality of pixel groups are arranged, the pixel group including at least two adjacent pixels in which light in different directions is incident on the photoelectric conversion unit, and the second charge accumulation circuit may hold the amount of the signal charges obtained by adding or averaging the respective signal charges generated by the respective photoelectric conversion unit in the plurality of corresponding pixels, the respective signal charges being obtained by photoelectrically converting the light in the same direction incident on the different pixel groups in the area in which the plurality of pixel groups are arranged.

According to a seventh aspect of the present invention, in the solid-state imaging device of the sixth aspect, in the area in which a plurality of pixel groups are arranged, the plurality of pixel groups may be arranged in a direction perpendicular to the direction in which the pixels constituting the pixel group are adjacent to each other.

According to an eighth aspect of the present invention, in the solid-state imaging device of the seventh aspect, in the pixel group, the pixels constituting the pixel group may be adjacent to each other at least in a row direction or a column direction, and in the area in which a plurality of pixel groups are arranged, the plurality of pixel groups may be arranged at least in the column direction or the row direction.

According to a ninth aspect of the present invention, the solid-state imaging device of the first aspect may further include: a plurality of third charge accumulation circuits that hold a signal charges based on the signal charges held in the plurality of second charge accumulation circuits and output the signal voltage according to the held signal charges as a third pixel signal in which the number of pixels is further reduced to a predetermined number.

According to a tenth aspect of the present invention, in the solid-state imaging device of the ninth aspect, the third charge accumulation circuit may hold the amount of the signal charges obtained by adding or averaging the respective signal charges held in the plurality of second charge accumulation circuits corresponding thereto.

According to an eleventh aspect of the present invention, in the solid-state imaging device of the ninth aspect may further include, a photoelectric conversion substrate on which a plurality of photoelectric conversion units are arranged; a first substrate on which one of the plurality of first charge accumulation circuit and the plurality of second charge accumulation circuit are arranged; a second substrate on which the other of the plurality of first charge accumulation circuit and the plurality of second charge accumulation circuit are arranged; a third substrate on which a plurality of third charge accumulation circuits are arranged; a first connection portion that electrically connects the photoelectric conversion substrate to the first substrate; a second connection portion that electrically connects the first substrate to the second substrate; and a third connection portion that electrically connects the second substrate to the third substrate.

According to a twelfth aspect of the present invention, in the solid-state imaging device of the ninth aspect may further include: a photoelectric conversion substrate on which a plurality of photoelectric conversion units are arranged; a first substrate on which a plurality of first charge accumulation circuits, a plurality of second charge accumulation circuits, and a plurality of third charge accumulation circuits are arranged; and a first connection portion that electrically connects the photoelectric conversion substrate to the first substrate.

According to a thirteenth aspect of the present invention, an imaging system includes the solid-state imaging device of the first aspect; a first reading unit that reads the first pixel signal from the first charge accumulation circuit included in the solid-state imaging device; and a second reading unit that reads the second pixel signal from the second charge accumulation circuit included in the solid-state imaging device.

According to a fourteenth aspect of the present invention, in the imaging system of the thirteenth aspect, the imaging system may performs reading of the second pixel signal in which the number of pixels is reduced by the second reading unit prior to reading of the first pixel signal by the first reading unit.

According to a fifteenth aspect of the present invention, in the imaging system of the thirteenth aspect may further include: an event detection unit for detecting, a photographing operation or a change in a state of the subject, as an event, the imaging system perform the reading of the first pixel signal by the first reading unit, when the event is detected by the event detection unit, and discards the signal charges held in the first charge accumulation circuit, when the event is not detected by the event detection unit.

According to a sixteenth aspect of the present invention, in the imaging system of the thirteenth aspect, the imaging system may first read the second pixel signal of which an update frequency is high among the first pixel signal and the second pixel signal using the second reading unit.

According to a seventeenth aspect of the present invention, an imaging system includes the solid-state imaging device of the ninth aspect; a first reading unit that reads the first pixel signal from the first charge accumulation circuit included in the solid-state imaging device; a second reading unit that reads the second pixel signal from the second charge accumulation circuit included in the solid-state imaging device; and a third reading unit that reads the third pixel signal from the third charge accumulation circuit included in the solid-state imaging device.

According to an eighteenth aspect of the present invention, in the imaging system of the seventeenth aspect, the imaging system may perform reading of the second pixel signal in which the number of pixels is reduced by the second reading unit or reading of the third pixel signal in which the number of pixels is further reduced by the third reading unit, prior to reading of the first pixel signal by the first reading unit.

According to a nineteenth aspect of the present invention, in the imaging system of the seventeenth aspect may further include: an event detection unit for detecting, a photographing operation or a change in a state of the subject, as an event, the imaging system perform at least one of the reading of the first pixel signal by the first reading unit and the reading of the second pixel signal by the second reading unit, when the event is detected by the event detection unit, and discards the signal charges held in among the first charge accumulation circuit and the second charge accumulation circuit in which the reading is not performed, when the event is not detected by the event detection unit.

According to a twentieth aspect of the present invention, in the imaging system of the seventeenth aspect, the imaging system may first read the second pixel signal or the third pixel signal of which an update frequency is high among the first pixel signal, the second pixel signal, and the third pixel signal using the second reading unit or the third reading unit corresponding thereto.

BRIEF DESCRIPTION OF DRAWINGS

FIG. 32B is a diagram schematically illustrating an operation of the imaging system of the tenth system example on which the solid-state imaging device of the embodiment of the present invention is mounted.

DESCRIPTION OF EMBODIMENTS

Hereinafter, embodiments of the present invention will be described with reference to the drawings. The following description includes specific detailed content for the purpose of illustration. However, those skilled in the art can understand that, even when various changes are applied to the detailed content to be described below, this does not exceed the scope of the present invention. Accordingly, the embodiments of the present invention to be described below maintain the generality of the claimed invention and are described without making any limitations.

Figure 1:
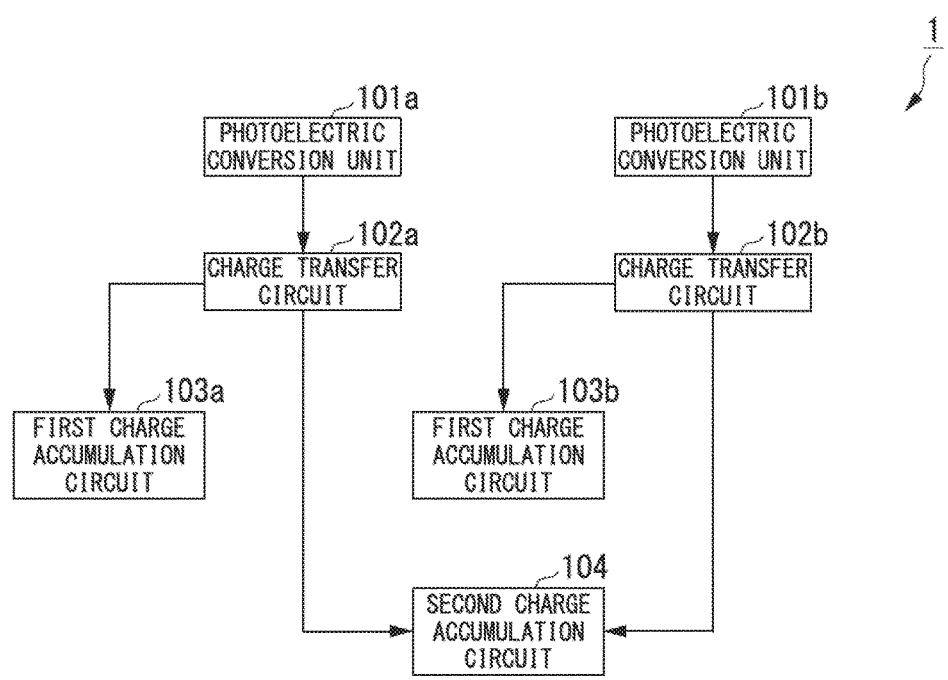
FIG. 1 is a block diagram illustrating a schematic configuration of a solid-state imaging device of an embodiment of the present invention.

FIG. 1 is a block diagram illustrating a schematic configuration of a solid-state imaging device of an embodiment of the present invention. In the solid-state imaging device, a plurality of pixels are arranged in a two-dimensional matrix to form a pixel array, and this pixel array is included, but an example of a case in which two pixels including a pixel 100a and a pixel 100b are arranged in the solid-state imaging device will be described in FIG. 1 for ease of description. In fact, there are a plurality of sets of the pixel 100a and the pixel 100b (for example, sets corresponding to a half of the total number of pixels in the solid-state imaging device). Components such as a scanning circuit, e.g., a vertical scanning circuit or a horizontal scanning circuit, that drives components of each of the pixels or an output amplifier for outputting a pixel signal to the outside of the solid-state imaging device 1 under control of a control device that performs control of the solid-state imaging device 1 included in an imaging system having the solid-state imaging device 1 mounted thereon are included in the solid-state imaging device 1, but are omitted from FIG. 1.

In the following description, a reference sign "a" or "b" indicating the corresponding pixel is added after the reference sign of each component in order to distinguish between the components corresponding to the respective pixels, that is, between the pixel 100a and the pixel 100b. More specifically, "a" is added after the reference sign of a component corresponding to the pixel 100a, and "b" is added after the reference sign of a component corresponding to the pixel 100b. Further, reference signs "a" and "b" are not added to common components corresponding to the pixel 100a and the pixel 100b. Further, in the components corresponding to one of the pixel 100a and the pixel 100b, when corresponding pixels at the time of description are not distinguished, the reference signs of the respective components are shown without the reference signs "a" and "b."

The solid-state imaging device 1 illustrated in FIG. 1 includes a photoelectric conversion unit 101a and a photoelectric conversion unit 101b, a charge transfer circuit 102a and a charge transfer circuit 102b, a first charge accumulation circuit 103a and a first charge accumulation circuit 103b, and a second charge accumulation circuit 104. Although one second charge accumulation circuit 104 is arranged for the two photoelectric conversion units including the photoelectric conversion unit 101a and the photoelectric conversion unit 101b, for example, one second charge accumulation circuit 104 may be arranged for nine photoelectric conversion units, or one second charge accumulation circuit 104 may be arranged for 25 photoelectric conversion units. That is, one second charge accumulation circuit 104 may be arranged for a plurality of photoelectric conversion units.

Each of the photoelectric conversion unit 101a and the photoelectric conversion unit 101b is a photoelectric conversion unit such as a photodiode that performs photoelectric conversion on incident light to generate signal charges and accumulates the generated signal charges.

Each of the charge transfer circuit 102a and the charge transfer circuit 102b is a circuit for transferring signal charges generated and accumulated by the photoelectric conversion unit 101a or the photoelectric conversion unit 101b corresponding thereto to the first charge accumulation circuit 103a or the first charge accumulation circuit 103b, and the second charge accumulation circuit 104.

Each of the first charge accumulation circuit 103a and the first charge accumulation circuit 103b is a circuit that holds (accumulates) the signal charges generated by the photoelectric conversion unit 101a or the photoelectric conversion unit 101b corresponding thereto, which are transferred from the charge transfer circuit 102a or the charge transfer circuit 102b corresponding thereto. Further, each of the first charge accumulation circuit 103a and the first charge accumulation circuit 103b is also a circuit that outputs a signal voltage according to the held signal charges as a pixel signal.

The second charge accumulation circuit 104 is a circuit (averaged charge accumulation circuit) that holds (accumulates) the amount of signal charges obtained by averaging the charge amounts of the respective signal charges generated by the photoelectric conversion unit 101a and the photoelectric conversion unit 101b, and the signal charges for averaging the charge amounts of the respective signal charges, which are transferred by the charge transfer circuit 102a and the charge transfer circuit 102b. That is, the second charge accumulation circuit 104 is a circuit that holds the signal charges of which the number of pixels (pixel number) is to be reduced, by adding and averaging the signal charges of the respective pixels included in the solid-state imaging device 1. Further, the second charge accumulation circuit 104 is a circuit that outputs a signal voltage according to the held signal charges as a pixel signal which is in a state in which the number of pixels is reduced.

A configuration for adding and averaging the signal charges of the respective pixels in order to reduce the number of pixels includes, for example, a configuration for adding and averaging the signal charges when the respective signal charges generated by the photoelectric conversion unit 101a and the photoelectric conversion unit 101b are held in the second charge accumulation circuit 104, a configuration for adding and averaging the signal charges when the second charge accumulation circuit 104 outputs a signal voltage (a pixel signal) according to respective held signal charges. The configuration may be a configuration for adding and averaging the signal charges after the second charge accumulation circuit 104 outputs the signal voltage according to respective held signal charges.

According to the embodiment, a solid-state imaging device (a solid-state imaging device 1) including a plurality of pixels (the pixel 100a and the pixel 100b) in which the photoelectric conversion units (the photoelectric conversion unit 101a or the photoelectric conversion unit 101b) that generate signal charges obtained by photoelectrically converting incident light are arranged in a matrix, a plurality of first charge accumulation circuits (the first charge accumulation circuit 103a and the first charge accumulation circuit 103b) that hold the signal charges generated by the photoelectric conversion unit 101a or the photoelectric conversion unit 101b and output the signal voltage according to the held signal charges as the first pixel signal (pixel signal of all the pixels), a plurality of charge transfer circuits (the charge transfer circuit 102a and the charge transfer circuit 102b) that transfer the signal charges generated by the photoelectric conversion unit 101a or the photoelectric conversion unit 101b to the first charge accumulation circuit 103a or the first charge accumulation circuit 103b, and a plurality of second charge accumulation circuits (the second charge accumulation circuit 104) that hold signal charges based on the signal charges generated by the photoelectric conversion unit 101a and the photoelectric conversion unit 101b in the plurality of pixels (the pixel 100a and the pixel 100b) and output the signal voltage according to the held signal charges as the second pixel signal in which the number of pixels is reduced to a predetermined number (a pixel signal in a state in which the number of pixels is reduced), wherein the charge transfer circuit 102a or the charge transfer circuit 102b transfers the signal charges generated by the photoelectric conversion unit 101a or the photoelectric conversion unit 101b corresponding thereto in the same exposure period to the second charge accumulation circuit 104 when transferring the signal charges to the first charge accumulation circuit 103a or the first charge accumulation circuit 103b is configured.

Further, according to the embodiment, the solid-state imaging device 1 in which the second charge accumulation circuit 104 holds signal charges of a charge amount obtained by adding or averaging the respective signal charges generated by each of the photoelectric conversion unit 101a and the photoelectric conversion unit 101b in the plurality of corresponding pixels (the pixel 100a and the pixel 100b) is configured.

With this configuration, in the solid-state imaging device 1 of the embodiment, the respective pixels are exposed in the same exposure period. Further, with this configuration, in the solid-state imaging device 1 of the embodiment, in each pixel, the signal charges generated by the photoelectric conversion unit 101a are held in the first charge accumulation circuit 103a, the signal charges generated by the photoelectric conversion unit 101b are held in the first charge accumulation circuit 103b, and the signal charges for reducing the number of pixels by averaging the amounts of the respective signal charges are held in the second charge accumulation circuit 104. The solid-state imaging device 1 of the embodiment can separately output the pixel signals according to the signal charges held in the first charge accumulation circuit 103a and the first charge accumulation circuit 103b, and the pixel signal according to the signal charges held in the second charge accumulation circuit 104. That is, the solid-state imaging device 1 of the embodiment can separately output the pixel signal of all the pixels (hereinafter referred to as a "full-resolution image signal") and the pixel signal in which the number of pixels is reduced (hereinafter referred to as a "reduced image signal") on the basis of the signal charges obtained through the same single exposure.

The configuration in which the solid-state imaging device 1 of the embodiment includes the second charge accumulation circuit 104 that holds the signal charges obtained by averaging the amounts of the respective signal charges generated by the photoelectric conversion unit 101a and the photoelectric conversion unit 101b included in respective pixels has been illustrated in FIG. 1. However, the configuration of the solid-state imaging device 1 of the embodiment is not limited to the configuration illustrated in FIG. 1. For example, the solid-state imaging device 1 may be configured to hold the charge amount of signal charges obtained by adding the charge amounts of the respective signal charges generated by the photoelectric conversion unit 101a and the photoelectric conversion unit 101b. In this case, the solid-state imaging device 1 illustrated in FIG. 1 may be configured to include a circuit (added charge accumulation circuit) that holds the signal charges that are in a state in which a level of the signal charges rises while the number of pixels is reduced by adding the signal charges of the respective pixels included in the solid-state imaging device 1, instead of the second charge accumulation circuit 104. Further, for example, the solid-state imaging device 1 may be configured to hold both the signal charges obtained by averaging the charge amounts of the respective signal charges generated by the photoelectric conversion unit 101a and the photoelectric conversion unit 101b and signal charges of the amount obtained by adding the charge amounts of the respective signal charges.

According to an embodiment, the solid-state imaging device 1 in which the second charge accumulation circuit (for example, the added charge accumulation circuit) holds any one of the signal charges generated by the photoelectric conversion unit 101a and the photoelectric conversion unit 101b in a predetermined pixel among the respective signal charges generated by the respective photoelectric conversion unit 101a and the photoelectric conversion unit 101b in the plurality of corresponding pixels (the pixel 100a and the pixel 100b) is configured.

First Configuration Example

Figure 2:
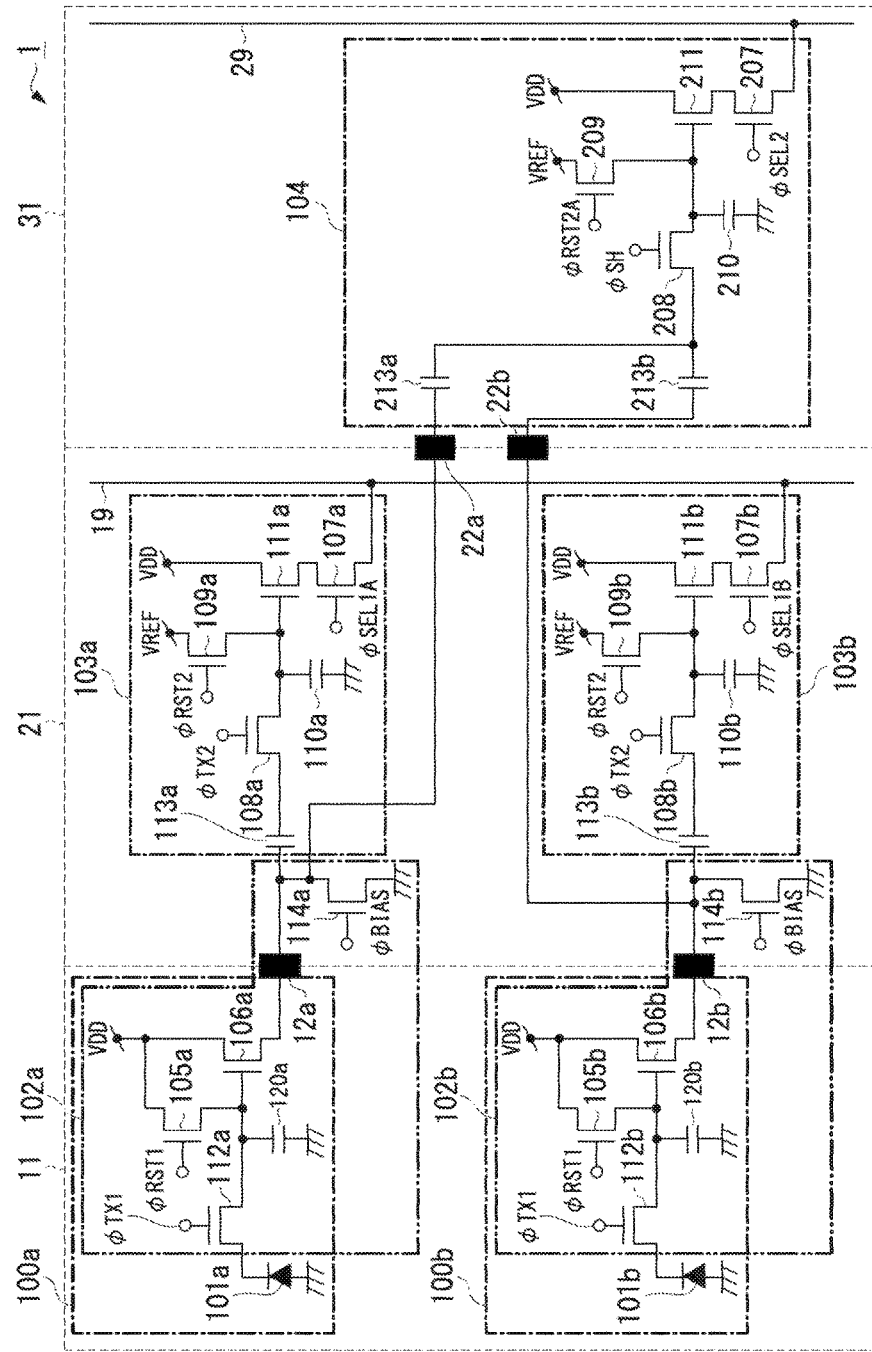
FIG. 2 is a circuit diagram illustrating a first configuration example of the solid-state imaging device of the embodiment of the present invention.

Next, an example of a more specific configuration of the solid-state imaging device 1 of the embodiment will be described. The solid-state imaging device 1 of the first configuration example is a configuration example in which, when signal charges generated by the respective photoelectric conversion unit 101 are held in the second charge accumulation circuit 104, signal charges obtained by adding and averaging the respective signal charges are held. FIG. 2 is a circuit diagram illustrating the first configuration example of the solid-state imaging device 1 of the embodiment of the present invention. FIG. 2 illustrates the solid-state imaging device 1 having a multilayer substrate structure in which respective components of the first configuration example of the solid-state imaging device 1 are distributed to a plurality of substrates. More specifically, the solid-state imaging device 1 has a multilayer substrate structure of three substrates including a photoelectric conversion substrate 11, a first readout substrate 21, and a second readout substrate 31. In the case of this multilayer substrate structure, signal lines of the respective substrates are electrically connected by a connection portion (hereinafter referred to as an "inter-substrate connection portion") that electrically connects signal lines of the different substrates.

As the inter-substrate connection portion, for example, an evaporation method or a plating method is used a bump formed using. In this case, space between the respective substrates may be filled with an insulating material such as an adhesive. The components formed in connected the respective substrates perform transmission and reception of signals via the inter-substrate connection portion.

A structure of the inter-substrate connection portion is not limited to the bump scheme described above. For example, a Through-Silicon-Via (TSV) scheme may be used. Further, a structure of the solid-state imaging device 1 is not necessarily limited to the multilayer substrate structure and may be formed of a single substrate, that is, the photoelectric conversion substrate 11, the first readout substrate 21, and the second readout substrate 31 may be formed in a monolithic structure. However, when these structures are compared, the number of contacts between the substrates per unit area in the general bump scheme can be larger than in the TSV scheme. This is because it is difficult to arrange a circuit around the through-silicon-via in the TSV scheme. Further, in the case of the monolithic structure, since a circuit is complicated, there is a heat generation problem particularly in a high-speed operation, and power consumption is also considered to be high. Therefore, the bump scheme is most preferable for a high resolution solid-state imaging device. The connection may be performed using the TSV scheme when the number of contacts between the substrates is small due to pixel addition or the like. Further, when the resolution of the solid-state imaging device is low, the TSV scheme may be used.

In FIG. 2, in the first configuration example of the solid-state imaging device 1, photoelectric conversion unit 101a and 101b, pixel reset transistor 105a and 105b, first amplifying transistor 106a and 106b, and charge transfer transistor 112a and 112b are formed in the photoelectric conversion substrate 11. In FIG. 2, a node capacitance 120a that is a capacitance associated with a node connected to the gate terminal of the first amplifying transistor 106a included in the pixel 100a, and a node capacitance 120b that is a capacitance associated with a node connected to the gate terminal of the first amplifying transistor 106b included in the pixel 100b are shown by a symbol of a capacitor. The pixel 100a includes the photoelectric conversion unit 101a, the pixel reset transistor 105a, the first amplifying transistor 106a, the charge transfer transistor 112a, and the node capacitance 120a. The pixel 100b includes the photoelectric conversion unit 101b, the pixel reset transistor 105b, the first amplifying transistor 106b, the charge transfer transistor 112b, and the node capacitance 120b.

Further, in FIG. 2, in the first configuration example of the solid-state imaging device 1, first clamping transistor 109a and 109b, first sample and hold transistor 108a and 108b, second amplifying transistor 111a and 111b, first selection transistor 107a and 107b, first charge accumulation units 110a and 110b, pixel load transistor 114a and 114b, and first noise suppression elements 113a and 113b are formed in the first readout substrate 21. The charge transfer circuit 102a includes the pixel reset transistor 105a, the first amplifying transistor 106a, the charge transfer transistor 112a, the node capacitance 120a, and the pixel load transistor 114a. The charge transfer circuit 102b includes the pixel reset transistor 105b, the first amplifying transistor 106b, the charge transfer transistor 112b, the node capacitance 120b, and the pixel load transistor 114b. The first charge accumulation circuit 103a includes the first clamping transistor 109a, the first sample and hold transistor 108a, the second amplifying transistor 111a, the first selection transistor 107a, the first charge accumulation unit 110a, and the first noise suppression element 13a. The first charge accumulation circuit 103b includes the first clamping transistor 109b, the first sample and hold transistor 108b, the second amplifying transistor 111b, the first selection transistor 107b, the first charge accumulation unit 110b, and the first noise suppression element 113b.

Further, in FIG. 2, in the first configuration example of the solid-state imaging device 1, the second charge accumulation circuit 104 including a second clamping transistor 209, a second sample and hold transistor 208, a third amplifying transistor 211, a second selection transistor 207, a second charge accumulation unit 210, a second noise suppression element 213a, and a second noise suppression element 213b is formed in the second readout substrate 31.

The photoelectric conversion substrate 11 and the first readout substrate 21 are connected by a first inter-substrate connection portion 12a and a first inter-substrate connection portion 12b. The first readout substrate 21 and the second readout substrate 31 are connected by a second inter-substrate connection portion 22a and a second inter-substrate connection portion 22b.

More specifically, in the first configuration example of the solid-state imaging device 1 illustrated in FIG. 2, the first amplifying transistor 106a of the photoelectric conversion substrate 11 is connected to the pixel load transistor 114a and the first noise suppression element 113a of the first readout substrate 21, via the first inter-substrate connection portion 12a. In the first configuration example of the solid-state imaging device 1 illustrated in FIG. 2, the first amplifying transistor 106b of the photoelectric conversion substrate 11 is connected to the pixel load transistor 114b and the first noise suppression element 113b of the first readout substrate 21, via the first inter-substrate connection portion 12b. In the first configuration example of the solid-state imaging device 1 illustrated in FIG. 2, the first amplifying transistor 106a of the photoelectric conversion substrate 11 is connected to the second noise suppression element 213a of the second readout substrate 31, via the first inter-substrate connection portion 12a and the second inter-substrate connection portion 22a. In the first configuration example of the solid-state imaging device 1 illustrated in FIG. 2, the first amplifying transistor 106b of the photoelectric conversion substrate 11 is connected to the second noise suppression element 213b of the second readout substrate 31, via the first inter-substrate connection portion 12b and the second inter-substrate connection portion 22b.

In the first configuration example of the solid-state imaging device 1 of the embodiment, a structure of the first inter-substrate connection portion 12a and the first inter-substrate connection portion 12b electrically connecting the photoelectric conversion substrate 11 to the first readout substrate 21 is not particularly defined. Further, in the first configuration example of the solid-state imaging device 1 of the embodiment, a structure of the second inter-substrate connection portion 22a and the second inter-substrate connection portion 22b electrically connecting the first readout substrate 21 to the second readout substrate 31 is not particularly defined. Therefore, in the first configuration example of the solid-state imaging device 1 of the embodiment for example, all of the first inter-substrate connection portion 12a, the first inter-substrate connection portion 12b, the second inter-substrate connection portion 22a, and the second inter-substrate connection portion 22b may be formed as bumps. Further, for example, the first inter-substrate connection portion 12a and the first inter-substrate connection portion 12b may be formed as bumps, and the second inter-substrate connection portion 22a and the second inter-substrate connection portion 22b may be formed as silicon through-electrodes. Further, a monolithic structure in which components formed in the photoelectric conversion substrate 11, the first readout substrate 21, and the second readout substrate 31 are formed in one substrate may be adopted.

Each of the photoelectric conversion unit 101a and the photoelectric conversion unit 101b is a photodiode that performs photoelectric conversion on incident light to generate signal charges and accumulate the signal charges.

Each of the charge transfer transistor 112a and the charge transfer transistor 112b transfers the signal charges generated and accumulated in the photoelectric conversion unit 101a or the photoelectric conversion unit 101b corresponding thereto, to a gate terminal of the first amplifying transistor 106a or the first amplifying transistor 106b corresponding thereto according to a control signal ϕTX1 input from the vertical scanning circuit (not illustrated). In this case, the signal charges transferred by the charge transfer transistor 112a are accumulated in the corresponding node capacitance 120a, and the signal charges transferred by the charge transfer transistor 112b are accumulated in the corresponding node capacitance 120b.

Each of the first amplifying transistor 106a and the first amplifying transistor 106b outputs a signal voltage according to the signal charges transferred to the gate terminal, that is, the signal charges accumulated in the node capacitance 120a or the node capacitance 120b corresponding thereto, to the first inter-substrate connection portion 12a or the first inter-substrate connection portion 12b corresponding thereto. Accordingly, each signal voltage according to signal charges generated in each of the photoelectric conversion unit 101a and the photoelectric conversion unit 101b is output to the first readout substrate 21 via the first inter-substrate connection portion 12a or the first inter-substrate connection portion 12b. Further, each signal voltage according to the signal charges generated by each of the photoelectric conversion unit 101a and the photoelectric conversion unit 101b is also output to the second readout substrate 31 via the second inter-substrate connection portion 22a or the second inter-substrate connection portion 22b.

Each of the pixel reset transistor 105a and the pixel reset transistor 105b resets the signal charges in the pixel 100a or the pixel 100b to a power supply voltage VDD according to a control signal ϕRST1 input from a vertical scanning circuit (not illustrated).

Each of the pixel load transistor 114a and the pixel load transistor 114b operates as a load of the first amplifying transistor 106a or the first amplifying transistor 106b that outputs the signal voltage corresponding thereto according to a control signal ϕBIAS input from the vertical scanning circuit (not illustrated). Each of the pixel load transistor 114a and the pixel load transistor 114b supplies a current for driving the first amplifying transistor 106a or the first amplifying transistor 106b that outputs the signal voltage corresponding thereto to the first amplifying transistor 106a or the first amplifying transistor 106b that corresponds thereto.

Each of the first noise suppression element 13a and the first noise suppression element 113b is a capacitor that holds (accumulates) the signal voltage input from the first amplifying transistor 106a or the first amplifying transistor 106b corresponding thereto via the first inter-substrate connection portion 12a and the first inter-substrate connection portion 12b.

Each of the first clamping transistor 109a and the first clamping transistor 109b clamps the first charge accumulation unit 10a a or the first charge accumulation unit 110b and the first noise suppression element 113a or the first noise suppression element 113b corresponding thereto to a fixed potential VREF according to a control signal ϕRST2 input from the vertical scanning circuit (not illustrated). Accordingly, each of the first charge accumulation unit 110a, the first charge accumulation unit 110b, the first noise suppression element 113a, and the first noise suppression element 113b holds the clamped fixed potential VREF.

Each of the first sample and hold transistor 108a and the first sample and hold transistor 108b holds the signal voltage of the first noise suppression element 113a or the first noise suppression element 113b corresponding thereto, in the first charge accumulation unit 110a or the first charge accumulation unit 110b corresponding thereto according to a control signal ϕTX2 input from the vertical scanning circuit (not illustrated).

Each of the first charge accumulation unit 110a and the first charge accumulation unit 110b is a capacitor that holds (accumulates) the signal voltage (a signal subjected to a noise removal process) input via the first sample and hold transistor 108a or the first sample and hold transistor 108b corresponding thereto.

A process of removing noise due to a leak current (dark current) is performed on the signal output from the pixel 100a by the configuration of the pixel load transistor 114a, the first clamping transistor 109a, the first sample and hold transistor 108a, the first charge accumulation unit 110a, and the first noise suppression element 113a. The first charge accumulation unit 110a holds the signal subjected to the noise removal process. Further, the process of removing noise due to a leak current (dark current) is performed on the signal output from the pixel 100b by the configuration of the pixel load transistor 114b, the first clamping transistor 109b, the first sample and hold transistor 108b, the first charge accumulation unit 110b, and the first noise suppression element 113b. The first charge accumulation unit 110b holds the signal subjected to the noise removal process.

As the first charge accumulation unit 110a and the first charge accumulation unit 110b, it is more preferable to use metal insulator metal (MIM) capacitors or metal oxide semiconductor (MOS) capacitors that are capacitors in which a leak current (dark current) per unit area is small. Accordingly, it is possible to improve resistance to noise and obtain a high-quality signal.

Each of the second amplifying transistor 11*l* a and the second amplifying transistor 111b outputs a signal voltage according to the voltage of the gate terminal, that is, the signal subjected to the noise removal process accumulated in the first charge accumulation unit 110a or the first charge accumulation unit 110b corresponding thereto.

Each of the first selection transistor 107a and the first selection transistor 107b outputs the signal voltage output from the second amplifying transistor 111a or the second amplifying transistor 111b to a first vertical signal line 19 as a pixel signal of each pixel included in the solid-state imaging device 1 according to a control signal φSEL1A or a control signal φSEL1B corresponding thereto input from the vertical scanning circuit (not illustrated). Accordingly, the pixel signal according to the signal charges generated by any one of the photoelectric conversion unit 101a and the photoelectric conversion unit 101b included in each pixel is read to the first vertical signal line 19.

Each of the second noise suppression element 213a and the second noise suppression element 213b is a capacitor that holds (accumulates) the signal voltage input via the first inter-substrate connection portion 12a or the second inter-substrate connection portion 22a or the first inter-substrate connection portion 12b or the second inter-substrate connection portion 22b from the first amplifying transistor 106a or the first amplifying transistor 106b corresponding thereto.

The second clamping transistor 209 clamps the second charge accumulation unit 210, the second noise suppression element 213a, and the second noise suppression element 213b to a fixed potential VREF according to a control signal φRST2A input from the vertical scanning circuit (not illustrated). Accordingly, each of the second charge accumulation unit 210, the second noise suppression element 213a, and the second noise suppression element 213b holds the clamped fixed potential VREF.

The second sample and hold transistor 208 causes an intermediate signal between signal voltages of the second noise suppression element 213a and the second noise suppression element 213b, that is, averaged signal voltages, to be held in the second charge accumulation unit 210 according to a control signal φSH input from the vertical scanning circuit (not illustrated).

The second charge accumulation unit 210 is a capacitor that holds (accumulates) a signal voltage input via the second sample and hold transistor 208 (a signal subjected to a noise removal process in the second charge accumulation circuit 104).

In the second charge accumulation circuit 104, a process of removing noise due to a leak current (dark current) is performed within the second charge accumulation circuit 104 using the configuration of the pixel load transistor 114a formed in the first readout substrate 21, the second clamping transistor 209, the second sample and hold transistor 208, the second charge accumulation unit 210, the second noise suppression element 213a, and the second noise suppression element 213b. The second charge accumulation unit 210 holds the signal subjected to the noise removal process.

It is more preferable to use an MIM capacitor or an MOS capacitor that is a capacitor in which a leak current (dark current) per unit area is small, as the second charge accumulation unit 210, similar to the pixel 100a and the pixel 100b. Accordingly, it is possible to improve resistance to noise and obtain a high-quality signal.

The third amplifying transistor 211 outputs a signal voltage according to the voltage of the gate terminal, that is, the signal subjected to the noise removal process accumulated in the second charge accumulation unit 210.

The second selection transistor 207 outputs the signal voltage output from the third amplifying transistor 211 as a pixel signal obtained by averaging pixel signals of the predetermined number of pixels included in the solid-state imaging device 1 to a second vertical signal line 29 according to a control signal φSEL2 input from the vertical scanning circuit (not illustrated). Accordingly, the pixel signal according to the signal charges obtained by averaging the charge amounts of the respective signal charges generated by the photoelectric conversion unit 101a and the photoelectric conversion unit 101b included in the respective pixels is read to the second vertical signal line 29.

According to the first configuration example, the solid-state imaging device 1 including the photoelectric conversion substrate (the photoelectric conversion substrate 11) on which a plurality of the photoelectric conversion unit 101a and the photoelectric conversion unit 101b are arranged, the first substrate (the first readout substrate 21) on which a plurality of the first charge accumulation circuit (03a and the first charge accumulation circuit 103b, and the second charge accumulation circuit 104 are arranged, the second substrate (the second readout substrate 31) on which another plurality of the first charge accumulation circuit 103a and the first charge accumulation circuit 103b, and the second charge accumulation circuit 104 are arranged, the first connection portion (the first inter-substrate connection portion 12a or the first inter-substrate connection portion 12b) that electrically connects the photoelectric conversion substrate 11 to the first readout substrate 21, and the second connection portion (the second inter-substrate connection portion 22a or the second inter-substrate connection portion 22b) that electrically connects the first readout substrate 21 and the second readout substrate 31 is configured.

Further, according to the first configuration example, the solid-state imaging device 1 in which the first inter-substrate connection portion 12a or the first inter-substrate connection portion 12b is arranged between the photoelectric conversion substrate 11 and the first readout substrate 21, corresponds to one of the first charge accumulation circuit 103a and the first charge accumulation circuit 103b, and the second charge accumulation circuit 104 arranged on the first readout substrate 21, and electrically connects, between the photoelectric conversion substrate 11 and the first readout substrate 21, respective signal lines of the signal charges transferred from each photoelectric conversion unit (the photoelectric conversion unit 101a or the photoelectric conversion unit 101b) arranged on the photoelectric conversion substrate 11 to one of the first charge accumulation circuit 103a and the first charge accumulation circuit 103b, and the second charge accumulation circuit 104 corresponding thereto arranged on the first readout substrate 21, and the second inter-substrate connection portion 22a or the second inter-substrate connection portion 22b is arranged between the first readout substrate 21 and the second readout substrate 31, corresponds to the other of the first charge accumulation circuit 103a and the first charge accumulation circuit 103b, and the second charge accumulation circuit 104 arranged on the second readout substrate 31, and electrically connects, between the first readout substrate 21 and the second readout substrate 31, respective signal lines of the signal charges transferred from each photoelectric conversion unit (the photoelectric conversion unit 101a or the photoelectric conversion unit 101b) arranged on the photoelectric conversion substrate 11 to the other of the first charge accumulation circuit 103a and the first charge accumulation circuit 103b, and the second charge accumulation circuit 104 corresponding thereto arranged on the second readout substrate 31 via the first readout substrate 21 is configured.

With this configuration, in the first configuration example of the solid-state imaging device 1, the respective signal voltages according to the signal charges obtained by the two photoelectric conversion units (the photoelectric conversion unit 101a and the photoelectric conversion unit 101b) performing photoelectric conversion on incident light are read via the inter-substrate connection portions (the first inter-substrate connection portion 12a and the first inter-substrate connection portion 12b, and the second inter-substrate connection portion 22a and the second inter-substrate connection portion 22b) corresponding to the two photoelectric conversion units. The signals after the noise suppression (the signals after the noise removal process) are held in the charge accumulation units (the first charge accumulation unit 110a and the first charge accumulation unit 110b) corresponding to the two respective photoelectric conversion units. Further, in the first configuration example of the solid-state imaging device 1, the signals (the signals after the noise removal process) obtained by performing noise suppression on the respective signal voltages according to the signal charges obtained by averaging the charge amounts of the respective signal charges obtained through the photoelectric conversion of the two photoelectric conversion units are held in the charge accumulation unit (the second charge accumulation unit 210) common to the two photoelectric conversion units. Thereafter, the solid-state imaging device 1 sequentially reads the signal voltages according to the signals after the noise removal process accumulated in the respective charge accumulation units (the first charge accumulation unit 110a, the first charge accumulation unit 110b, and the second charge accumulation unit 210) as pixel signals and outputs the pixel signals to the first vertical signal line 19 and the second vertical signal line 29.

In the first configuration example of the solid-state imaging device 1 illustrated in FIG. 2, the example of the configuration in which the pixel 100a including the respective components including the photoelectric conversion unit 101a and the pixel 100b including the respective components including the photoelectric conversion unit 101b form a set is shown, but the set of pixels arranged in the solid-state imaging device 1 is not limited to the configuration illustrated in FIG. 2. That is, one set may be configured with more pixels than in the configuration illustrated in FIG. 2. A pixel array included in the solid-state imaging device 1 may be formed by arranging a plurality of sets of the pixels.

Figure 3:
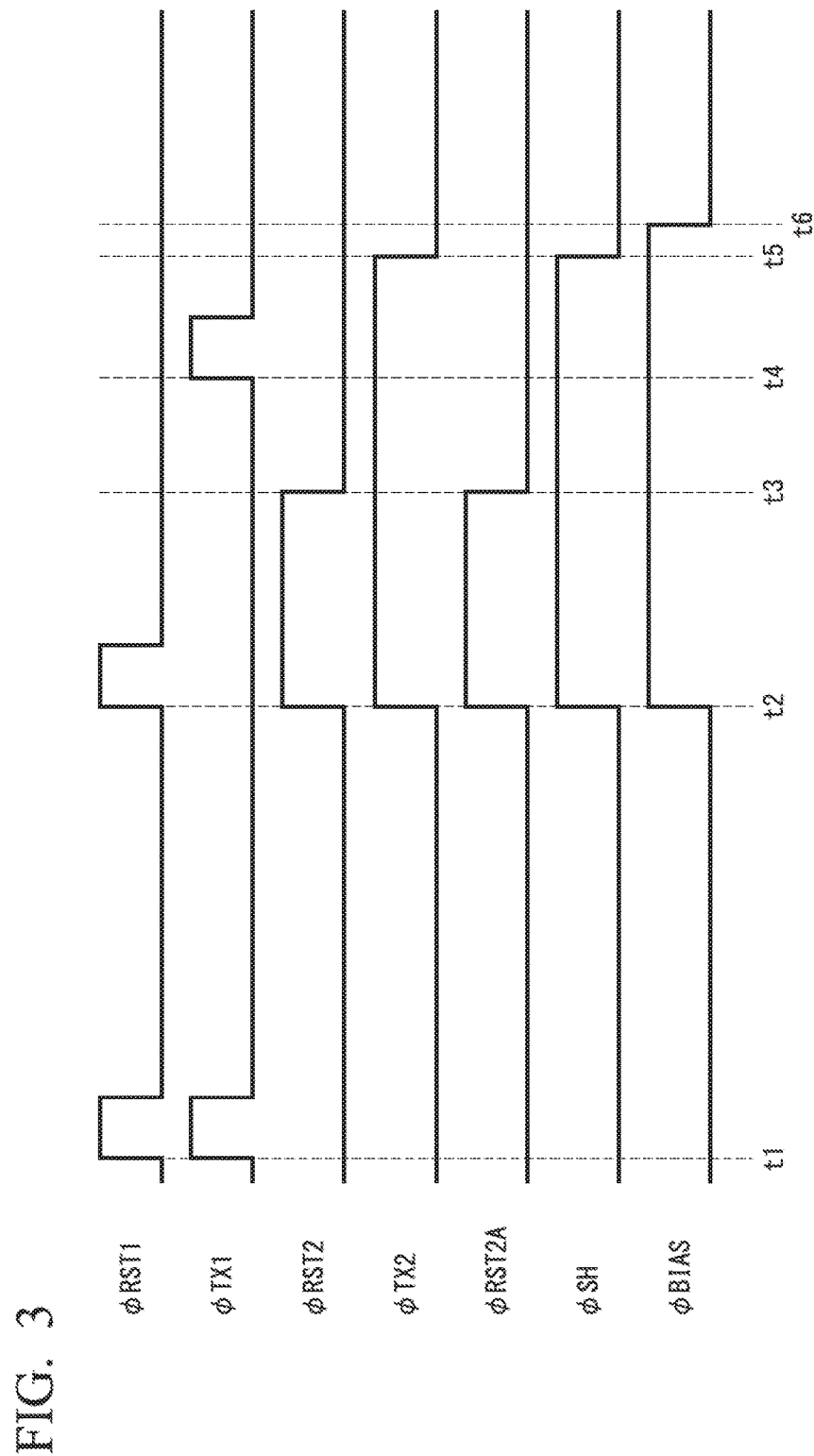
FIG. 3 is a timing chart illustrating timings of driving the first configuration example of the solid-state imaging device of the embodiment of the present invention.

Next, a driving timing of the first configuration example in the solid-state imaging device 1 of the embodiment will be described. FIG. 3 is a timing chart illustrating timings of driving the first configuration example of the solid-state imaging device 1 of the embodiment of the present invention. The timing chart illustrated in FIG. 3 shows timings that are controlled by the vertical scanning circuit (not illustrated) in an operation of the first configuration example of the solid-state imaging device 1 in which the pixel 100a and the pixel 100b are simultaneously exposed, the pixel signal of the pixel 100a and the pixel signal of the pixel 100b are sequentially output to the first vertical signal line 19, and a pixel signal obtained by averaging the pixel signal of the pixel 100a and the pixel signal of the pixel 100b is output to the second vertical signal line 29.

In the first configuration example of the solid-state imaging device 1, two pixels including the pixel 100a and the pixel 100b are configured as one set, as illustrated in FIG. 2. In the first configuration example of the solid-state imaging device 1, two of the first charge accumulation circuit 103a (including the first charge accumulation unit 110a) and the first charge accumulation circuit 103b (including the first charge accumulation unit 110b) respectively corresponding to two of the photoelectric conversion unit 101a and the photoelectric conversion unit 101b, and the second charge accumulation circuit 104 (including the second charge accumulation unit 210) that is common to the two of the photoelectric conversion unit 101a and the photoelectric conversion unit 101b are included. Therefore, in the timing chart illustrated in FIG. 3, timings of holding the signal charges generated by each of the photoelectric conversion unit 101a and the photoelectric conversion unit 101b, in the first charge accumulation unit 110a and the first charge accumulation unit 110b, and the second charge accumulation unit 210 is illustrated.

First, at time t1, all of the pixels (the pixel 100a and the pixel 100b) are reset. More specifically, at time t1, the vertical scanning circuit (not illustrated) simultaneously sets the control signal ϕTX1 and the control signal ϕRST1 to an "H" level to cause the charge transfer transistor 112a, the charge transfer transistor 112b, the pixel reset transistor 105a, and the pixel reset transistor 105b to be in an ON state. Accordingly, the photoelectric conversion unit 101a and the photoelectric conversion unit 101b, and the node capacitance 120a and the node capacitance 120b, included in the pixel 100a and the pixel 100b are reset.

Then, the vertical scanning circuit (not illustrated) simultaneously sets the control signal ϕTX1 and the control signal ϕRST1 to an "L" level to release the reset of the pixel 100a and the pixel 100b. Accordingly, the pixel 100a and the pixel 100b simultaneously start the exposure. That is, the photoelectric conversion unit 101a included in the pixel 100a and the photoelectric conversion unit 101b included in the pixel 100b start accumulation of signal charges obtained by performing photoelectric conversion on incident light.

Subsequently, from time t2 after a certain period of time elapses, that is, after any exposure time elapses, each of the charge transfer circuit 102a and the charge transfer circuit 102b performs readout of the signal at a reset level and an exposure signal (hereinafter referred to as a "signal at an exposure level") of the photoelectric conversion unit 101a or the photoelectric conversion unit 101b corresponding thereto, to the first inter-substrate connection portion 12a and the second inter-substrate connection portion 22a corresponding thereto, or readout of the signal to the first inter-substrate connection portion 12b and the second inter-substrate connection portion 22b. The first charge accumulation circuit 103a performs a noise removal process of obtaining a difference between the signal at a reset level and the signal at an exposure level of the corresponding photoelectric conversion unit 101a. Further, the first charge accumulation circuit 103b performs a noise removal process of obtaining a difference between the signal at a reset level and the signal at an exposure level of the corresponding photoelectric conversion unit 101b. Further, the second charge accumulation circuit 104 performs a noise removal process of obtaining a difference of the averaged signal at a reset level and the averaged signal at an exposure level.

More specifically, at time t2, the vertical scanning circuit (not illustrated) controls the control signal ϕBIAS to operate the pixel load transistor 114a as a load of the corresponding first amplifying transistor 106a and operate the pixel load transistor 114b as a load of the corresponding first amplifying transistor 106b.

Further, the vertical scanning circuit (not illustrated) sets the control signal ϕRST1 to an "H" level to cause the pixel reset transistor 105a and the pixel reset transistor 105b to be in an ON state, and resets the node capacitance 120a and the node capacitance 120b. Accordingly, the signal voltage at a reset level of the photoelectric conversion unit 101a from the first amplifying transistor 106a is output to the first noise suppression element 113a via the first inter-substrate connection portion 12a, and is output to the second noise suppression element 213a via the first inter-substrate connection portion 12a and the second inter-substrate connection portion 22a. Further, the signal voltage at a reset level of the photoelectric conversion unit 100b from the first amplifying transistor 106b is output to the first noise suppression element 113b via the first inter-substrate connection portion 12b, and is output to the second noise suppression element 213b via the first inter-substrate connection portion 12b and the second inter-substrate connection portion 22b.

Further, the vertical scanning circuit (not illustrated) sets the control signal φRST2 and the control signal φTX2 to an "H" level to cause the first clamping transistor 109a and the first clamping transistor 109b, and the first sample and hold transistor 108a and the first sample and hold transistor 108b to be in an ON state. Accordingly, each of the first charge accumulation unit 110a and the first charge accumulation unit 110b, and the first noise suppression element 113a and the first noise suppression element 113b are clamped. Further, the vertical scanning circuit (not illustrated) sets the control signal φRST2A and the control signal φSH to an "H" level to cause the second clamping transistor 209 and the second sample and hold transistor 208 to be in an ON state. Accordingly, each of the second charge accumulation unit 210, the second noise suppression element 213a, and the second noise suppression element 213b is clamped.

Then, the vertical scanning circuit (not illustrated) sets the control signal φRST1 to an "L" level to release the reset of the node capacitance 120a and the node capacitance 120b. Subsequently, at time t3, the vertical scanning circuit (not illustrated) sets the control signal φRST2 to an "L" level to release the clamp of the first charge accumulation unit 110a and the first charge accumulation unit 110b. Further, the vertical scanning circuit (not illustrated) sets the control signal φRST2A to an "L" level to release the clamp of the second charge accumulation unit 210.

Subsequently, at time t4, the vertical scanning circuit (not illustrated) sets the control signal φTX1 to an "H" level to cause the charge transfer transistor 112a and the charge transfer transistor 112b to be in an ON state, and transfer the signal charges accumulated in the photoelectric conversion unit 101a to the gate terminal of the first amplifying transistor 106a, and transfer the signal charges accumulated in the photoelectric conversion unit 101b to the gate terminal of the first amplifying transistor 106b. In this case, the signal charges transferred by the charge transfer transistor 112a are accumulated in the node capacitance 120a, and the signal charges transferred by the charge transfer transistor 112b are accumulated in the node capacitance 120b. Accordingly, a signal voltage (signal at an exposure level) according to the signal charges generated by the photoelectric conversion unit 101a, that is, the signal charges accumulated in the node capacitance 120a, is output from the first amplifying transistor 106a to the first noise suppression element 113a via the first inter-substrate connection portion 12a, and output to the second noise suppression element 213a via the first inter-substrate connection portion 12a and the second inter-substrate connection portion 22a. Further, a signal voltage (signal at an exposure level) according to the signal charges generated by the photoelectric conversion unit 101b, that is, the signal charges accumulated in the node capacitance 120b, is output from the first amplifying transistor 106b to the first noise suppression element 113b via the first inter-substrate connection portion 12b, and output to the second noise suppression element 213b via the first inter-substrate connection portion 12b and the second inter-substrate connection portion 22b.

The first noise suppression element 113a outputs a voltage of a difference between the signal voltage at a reset level and the signal voltage at an exposure level of the photoelectric conversion unit 101a, that is, a signal voltage subjected to the noise removal process. Further, similarly, the first noise suppression element 113b outputs a signal voltage subjected to the noise removal process of the photoelectric conversion unit 101b. Further, similarly, the second noise suppression element 213a outputs a signal voltage subjected to the noise removal process of the photoelectric conversion unit 101a, and the second noise suppression element 213b outputs a signal voltage subjected to the noise removal process of the photoelectric conversion unit 101b.

Then, the vertical scanning circuit (not illustrated) sets the control signal φTX1 to an "L" level to stop transfer to the gate terminal of the first amplifying transistor 106a of the signal charges accumulated in the photoelectric conversion unit 101a and transfer to the gate terminal of the first amplifying transistor 106b of the signal charges accumulated in the photoelectric conversion unit 101b.

Subsequently, at time t5, the vertical scanning circuit (not illustrated) sets the control signal φTX2 to an "L" level to stop sample and hold of the first charge accumulation unit 110a, and sample and hold of the first charge accumulation unit 110b. Accordingly, the first charge accumulation unit 110a holds the signal voltage subjected to the noise removal process output by the first noise suppression element 113a, and the first charge accumulation unit 110b holds the signal voltage subjected to the noise removal process output by the first noise suppression element 113b. Further, the vertical scanning circuit (not illustrated) sets the control signal φSH to an "L" level to stop the sample and hold of the second charge accumulation unit 210. Accordingly, the second charge accumulation unit 210 holds an intermediate signal voltage between the respective signal voltages subjected to the noise removal process output by the second noise suppression element 213a and the second noise suppression element 213b, that is, the averaged signal voltage.

Up to this point, the signal charges generated by the photoelectric conversion unit 101a included in the pixel 100a are subjected to a noise removal process and held in the first charge accumulation unit 110a, and the signal charges generated by the photoelectric conversion unit 101b included in the pixel 100b are subjected to the noise removal process and held (accumulated) in the first charge accumulation unit 110b. Further, the signal charges obtained by averaging the charge amount of the signal charges generated by the photoelectric conversion unit 101a included in the pixel 100a and the charge amount of the signal charges generated by the photoelectric conversion unit 101b included in the pixel 100b are subjected to the noise removal process and held (accumulated) in the second charge accumulation unit 210.

Subsequently, at time t6, the vertical scanning circuit (not illustrated) controls the control signal φBIAS to stop an operation as a load of the first amplifying transistor 106a or the first amplifying transistor 106b corresponding thereto, of each of the pixel load transistor 114a and the pixel load transistor 114b.

Then, the vertical scanning circuit (not illustrated) sequentially controls the control signal φSEL1A and the control signal φSEL1B to sequentially output the respective signal voltages subjected to the noise removal process held in the first charge accumulation unit 110a and the first charge accumulation unit 110b as pixel signals of the respective pixels to the first vertical signal line 19. Further, the vertical scanning circuit (not illustrated) controls the control signal φSEL2 to output the averaged signal voltage subjected to the noise removal process held in the second charge accumulation unit 210 as a pixel signal of which the number of pixels is reduced to the second vertical signal line 29.

In the first configuration example of the solid-state imaging device 1, an output order of the pixel signal (full-resolution image signal) of all the pixels and the pixel signal (the reduced image signal) in which the number of pixels is reduced, or whether to output the respective pixel signals is not particularly defined. Therefore, in the first configuration example of the solid-state imaging device 1, for example, the full-resolution image signal can be output subsequently to the reduced image signal, or only the reduced image signal can be output. Therefore, detailed description of timings at which the vertical scanning circuit (not illustrated) controls the control signal φSEL1A, the control signal φSEL1B, and the control signal φSEL2 so that the full-resolution image signal is output to the first vertical signal line 19 will be omitted. Further, detailed description of timings at which the vertical scanning circuit controls the control signal φSEL1A, the control signal φSEL1B, and the control signal φSEL2 so that the reduced image signal is output to the second vertical signal line 29 will be omitted.

With these driving timings, in the first configuration example of the solid-state imaging device 1, the respective signal voltages according to the signal charges obtained by the two photoelectric conversion units (the photoelectric conversion unit 101a and the photoelectric conversion unit 101b) performing photoelectric conversion on incident light are read to the inter-substrate connection portions (the first inter-substrate connection portion 12a and the first inter-substrate connection portion 12b, and the second inter-substrate connection portion 22a and the second inter-substrate connection portion 22b) corresponding to the two photoelectric conversion units. The signals after the noise removal process are held in the charge accumulation units (the first charge accumulation unit 110a and the first charge accumulation unit 110b) corresponding to the two respective photoelectric conversion units. Further, at the driving timings in the first configuration example of the solid-state imaging device 1, the respective signals after the noise removal process according to the signal charges obtained by averaging the charge amounts of the respective signal charges obtained through the photoelectric conversion of the two photoelectric conversion units are held in the charge accumulation unit (the second charge accumulation unit 210) common to the two photoelectric conversion units. In the solid-state imaging device 1, signal voltages according to the signals after the noise removal process accumulated in the respective charge accumulation units (the first charge accumulation unit 110a, the first charge accumulation unit 110b, and the second charge accumulation unit 210) are output to the first vertical signal line 19 as the full-resolution image signal, and to the second vertical signal line 29 as the reduced image signal.

Thus, in the first configuration example of the solid-state imaging device 1 of the embodiment, the signal charges of the photoelectric conversion unit 101a included in the pixel 100a are subjected to the noise removal process and held in the first charge accumulation unit 110a, the signal charges of the photoelectric conversion unit 101b included in the pixel 100b are subjected to the noise removal process and held in the first charge accumulation unit 110b, and the respective signal charges are averaged and subjected to the noise removal process and held in the second charge accumulation unit 210. Accordingly, in the first configuration example of the solid-state imaging device 1 of the embodiment, both of the pixel signal according to the signal voltage held in each of the first charge accumulation unit 110a and the first charge accumulation unit 110b, that is, the pixel signal (the full-resolution image signal) of all the pixels, and the pixel signal according to the signal voltage held in the second charge accumulation unit 210, that is, the pixel signal (the reduced image signal) in which the number of pixels is reduced, can be output independently. In this case, in the first configuration example of the solid-state imaging device 1 of the embodiment, the pixel signal obtained by averaging, that is, by adding and averaging, the pixel signals of the respective pixels is output as the pixel signal in which the number of pixels is reduced. Therefore, the image generated based on the reduced image signal output in the first configuration example of the solid-state imaging device 1 of the embodiment becomes an image having a smaller relative noise amount or a smaller moiré generation amount and better image quality than an image generated based on a pixel signal output in the related art in which respective pixels are decimated in each row and the number of pixels is reduced.

Further, in the first configuration example of the solid-state imaging device 1 of the embodiment, the respective signal voltages subjected to the noise removal process are separately held in the first charge accumulation unit 10a, the first charge accumulation unit 110b, and the second charge accumulation unit 210 corresponding to the pixel 100a and the pixel 100b. In the first configuration example of the solid-state imaging device 1 of the embodiment, the pixel signal according to the signal voltage held in each of the first charge accumulation unit 11a and the first charge accumulation unit 110b is output from the first vertical signal line 19, and the pixel signal according to the signal voltage held in the second charge accumulation unit 210 is output to the second vertical signal line 29. That is, in the first configuration example of the solid-state imaging device 1 of the embodiment, each of the full-resolution image signal of all the pixels and the reduced image signal in which the number of pixels is reduced can be output independently. Accordingly, in the imaging system on which the solid-state imaging device 1 of the embodiment is mounted, a high resolution image (hereinafter referred to as a "full-resolution image") generated based on the full-resolution image signal output from the solid-state imaging device 1 and a low-resolution image (hereinafter referred to as a "reduced image") generated based on the reduced image signal can be generated in parallel.

Second Configuration Example

Next, an example of another configuration of the solid-state imaging device 1 of the embodiment will be described. The solid-state imaging device 1 of a second configuration example is a configuration example in which signal charges generated by the respective photoelectric conversion unit 101 are held in the second charge accumulation circuit 104, and then are averaged and output when a signal voltage (pixel signal) according to the held the respective signal charges is output. In the solid-state imaging device 1 of the second configuration example, the number of inter-substrate connection portions that connect the first readout substrate to the second readout substrate is smaller than in the first configuration example in a multilayer substrate structure in which the respective components are distributed into three substrates including the photoelectric conversion substrate, the first readout substrate, and the second readout substrate, similar to the solid-state imaging device 1 of the first configuration example. Therefore, the solid-state imaging device 1 of the second configuration example includes a multiplexer as a component for reducing the number of inter-substrate connection portions between the first readout substrate and the second readout substrate. By controlling the multiplexer, the pixel signals of the respective pixels are averaged, as in the solid-state imaging device 1 of the first configuration example.

The solid-state imaging device 1 of the second configuration example also includes the same components as the solid-state imaging device 1 of the first configuration example. Therefore, among the components of the solid-state imaging device 1 of the second configuration example, the same components as the components of the solid-state imaging device 1 of the first configuration example are denoted with the same reference signs, and detailed description of the respective components will be omitted.

Figure 4:
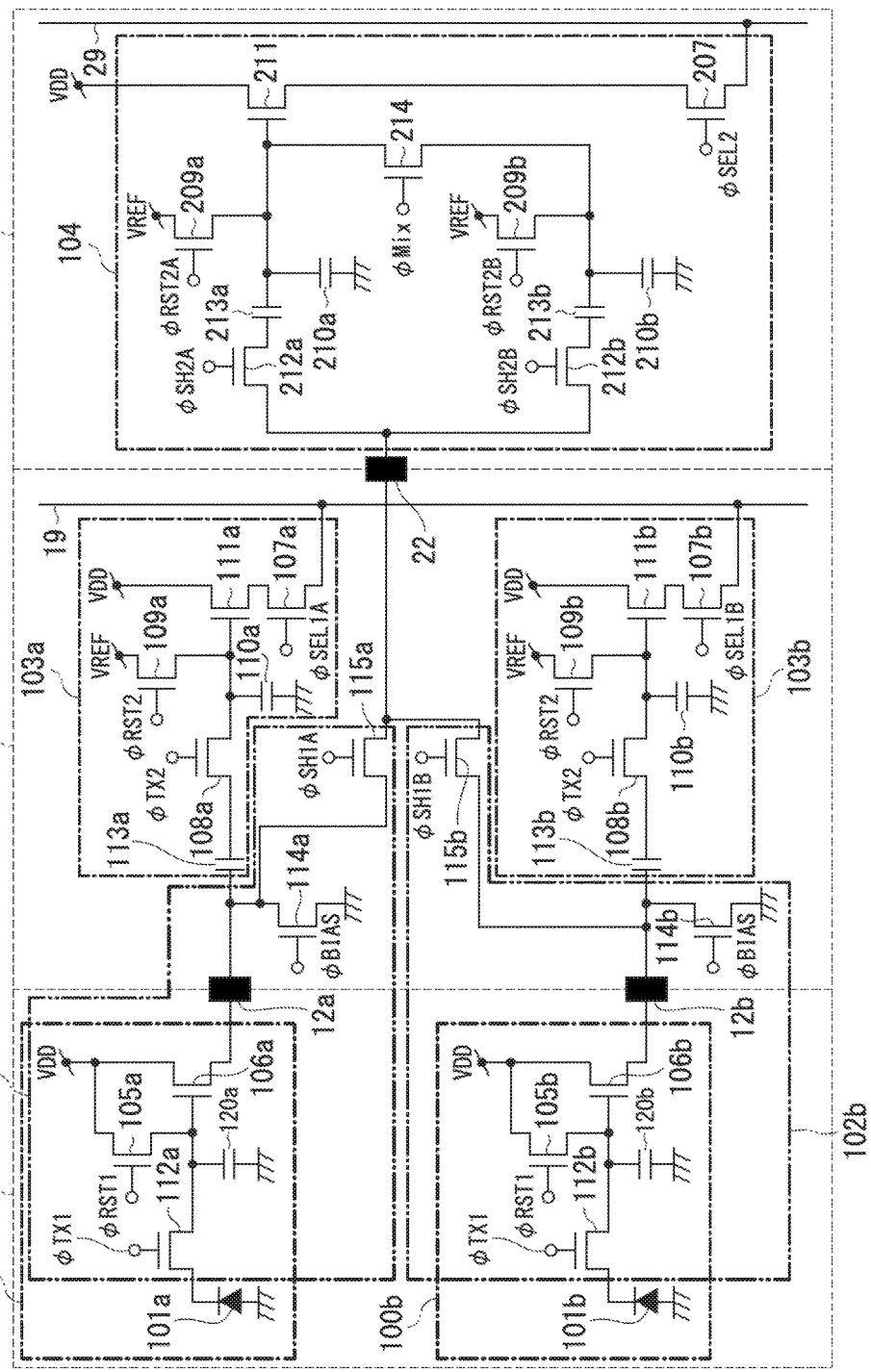
FIG. 4 is a circuit diagram illustrating a second configuration example of the solid-state imaging device of the embodiment of the present invention.

FIG. 4 is a circuit diagram illustrating a second configuration example of the solid-state imaging device 1 of the embodiment of the present invention. In FIG. 4, in the second configuration example of the solid-state imaging device 1, photoelectric conversion unit 101a and 101b, pixel reset transistor 105a and 105b, first amplifying transistor 106a and 106b, and charge transfer transistor 112a and 112b are formed in the photoelectric conversion substrate 11. In FIG. 4, each of the node capacitance 120a and the node capacitance 120b is shown by a symbol of a capacitor, as in the photoelectric conversion substrate 11 of the first configuration example. The pixel 100a includes the photoelectric conversion unit 101a, the pixel reset transistor 105a, the first amplifying transistor 106a, the charge transfer transistor 112a, and the node capacitance 120a. The pixel 100b includes the photoelectric conversion unit 101b, the pixel reset transistor 105b, the first amplifying transistor 106b, the charge transfer transistor 112b, and the node capacitance 120b. The photoelectric conversion substrate 11 is the same as the photoelectric conversion substrate 11 of the first configuration example.

Further, in FIG. 4, in the second configuration example of the solid-state imaging device 1, first clamping transistor 109a and 109b, first sample and hold transistor 108a and 108b, second amplifying transistor 111a and 111b, first selection transistor 107a and 107b, first charge accumulation units 110a and 110b, pixel load transistor 114a and 114b, and first noise suppression elements 113a and 113b are formed in the first readout substrate 21. Further, in the second configuration example of the solid-state imaging device 1, a multiplexer including a pixel selection transistor 115a and a pixel selection transistor 115b is formed in the first readout substrate 21. The charge transfer circuit 102a includes the pixel reset transistor 105a, the first amplifying transistor 106a, the charge transfer transistor 12a, the node capacitance 120a, the pixel load transistor 114a, and the pixel selection transistor 115a. The charge transfer circuit 102b includes the pixel reset transistor 105b, the first amplifying transistor 106b, the charge transfer transistor 112b, the node capacitance 120b, the pixel load transistor 114b, and the pixel selection transistor 115b. The first charge accumulation circuit 103a includes the first clamping transistor 109a, the first sample and hold transistor 108a, the second amplifying transistor 111a, the first selection transistor 107a, the first charge accumulation unit 110a, and the first noise suppression element 113a. The first charge accumulation circuit 103b includes the first clamping transistor 109b, the first sample and hold transistor 108b, the second amplifying transistor 111b, the first selection transistor 107b, the first charge accumulation unit 110b, and the first noise suppression element 113b. Among the respective components formed in the first readout substrate 21, the respective components other than the multiplexer are the same as the respective components formed in the first readout substrate 21 of the first configuration example.

Further, in FIG. 4, in the second configuration example of the solid-state imaging device 1, the second charge accumulation circuit 104 including a second clamping transistor 209a, a second charge accumulation unit 210a, the second noise suppression element 213a, and a pixel selection transistor 212a corresponding to the pixel 100a, a second clamping transistor 209b, a second charge accumulation unit 210b, the second noise suppression element 213b, and a pixel selection transistor 212b corresponding to the pixel 100b, the third amplifying transistor 211, the second selection transistor 207, and an averaging switch transistor 214 is formed in the second readout substrate 31. In the second readout substrate 31, the pixel selection transistor 212a and the pixel selection transistor 212b constitute a demultiplexer corresponding to the multiplexer formed in the first readout substrate 21.

The photoelectric conversion substrate 111 and the first readout substrate 21 are connected by the first inter-substrate connection portion 12a and the first inter-substrate connection portion 12b. The first readout substrate 21 and the second readout substrate 31 are connected by a second inter-substrate connection portion 22.

More specifically, in the second configuration example of the solid-state imaging device 1 illustrated in FIG. 4, the first amplifying transistor 106a of the photoelectric conversion substrate 11 is connected to the pixel load transistor 114a, the first noise suppression element 113a, and the pixel selection transistor 115a of the first readout substrate 21, via the first inter-substrate connection portion 12a. In the second configuration example of the solid-state imaging device 1 illustrated in FIG. 4, the first amplifying transistor 106b of the photoelectric conversion substrate 11 is connected to the pixel load transistor 14b, the first noise suppression element 113b, and the pixel selection transistor 115b of the first readout substrate 21, via the first inter-substrate connection portion 12b. In the second configuration example of the solid-state imaging device 1 illustrated in FIG. 4, the pixel selection transistor 115a and the pixel selection transistor 115b of the first readout substrate 21 are connected to the pixel selection transistor 212a and the pixel selection transistor 212b of the second readout substrate 31, via the second inter-substrate connection portion 22. Accordingly, each signal voltage according to the signal charges generated by each of the photoelectric conversion unit 101a and the photoelectric conversion unit 101b is also output to the second readout substrate 31 via the multiplexer formed in the first readout substrate 21 and the second inter-substrate connection portion 22.

In the second configuration example of the solid-state imaging device 1 of the embodiment, a structure of the first inter-substrate connection portion 12a and the first inter-substrate connection portion 12b electrically connecting the photoelectric conversion substrate 11 to the first readout substrate 21 is not particularly defined, similar to the first configuration example of the solid-state imaging device 1. Further, in the second configuration example of the solid-state imaging device 1 of the embodiment, a structure of the second inter-substrate connection portion 22 electrically connecting the first readout substrate 21 to the second readout substrate 31 is not particularly defined, similar to the first configuration example of the solid-state imaging device 1.

Each of the pixel selection transistor 115a and the pixel selection transistor 115b output any one of the signal voltage input from the first amplifying transistor 106a via the first inter-substrate connection portion 12a and the signal voltage input from the first amplifying transistor 106b via the first inter-substrate connection portion 12b to the second inter-substrate connection portion 22 corresponding thereto according to a control signal φSH1A or a control signal φSH1B input from the vertical scanning circuit (not illustrated). That is, in the solid-state imaging device 1 of the second configuration example, the configuration of the pixel selection transistor 115a and the pixel selection transistor 115b operates as a multiplexer that selects signal charges from one of the two signal voltages. Accordingly, the signal voltage according to the signal charges generated by any one of the photoelectric conversion unit 101a and the photoelectric conversion unit 101b included in the respective pixels is output to the second readout substrate 31 via the second inter-substrate connection portion 22.

Each of the pixel selection transistor 212a and the pixel selection transistor 212b outputs the signal voltage input via the second inter-substrate connection portion 22 to the second noise suppression element 213a or the second noise suppression element 213b corresponding thereto so that the signal voltage is held, corresponding thereto according to a control signal φSH2A or a control signal φSH2B input from the vertical scanning circuit (not illustrated). That is, in the solid-state imaging device 1 of the second configuration example, the configuration of the pixel selection transistor 212a and the pixel selection transistor 212b operates as a demultiplexer that outputs one input signal voltage to either the second noise suppression element 213a or the second noise suppression element 213b corresponding thereto. Accordingly, the respective signal voltages according to the signal charges generated by the photoelectric conversion unit 101a and the photoelectric conversion unit 101b included in the respective pixels are held in each of the second noise suppression element 213a and the second noise suppression element 213b corresponding thereto.

Each of the second noise suppression element 213a and the second noise suppression element 213b is a capacitor that holds (accumulates) the signal voltage output from the pixel selection transistor 212a or the pixel selection transistor 212b corresponding thereto.

Each of the second clamping transistor 209a and the second clamping transistor 209b clamps the second charge accumulation unit 210a or the second charge accumulation unit 210b corresponding thereto and the second noise suppression element 213a or the second noise suppression element 213b corresponding thereto to a fixed potential VREF according to a control signal φRST2A or a control signal φRST2B corresponding thereto input from the vertical scanning circuit (not illustrated). Accordingly, each of the second charge accumulation unit 210a, the second charge accumulation unit 210b, the second noise suppression element 213a, and the second noise suppression element 213b holds the clamped fixed potential VREF.

Each of the second charge accumulation unit 210a and the second charge accumulation unit 210b is a capacitor that holds (accumulates) the signal voltage held in the second noise suppression element 213a or the second noise suppression element 213b corresponding thereto (a signal subjected to a noise removal process in the second charge accumulation circuit 104).

In the second charge accumulation circuit 104 in the second configuration example, a process of removing noise due to a leak current (dark current) is performed within the second charge accumulation circuit 104 using the configuration of the second clamping transistor 209a, the second charge accumulation unit 210a, and the second noise suppression element 213a. The second charge accumulation unit 210a holds the signal subjected to the noise removal process. Further, in the second charge accumulation circuit 104 in the second configuration example, a process of removing noise due to a leak current (dark current) is performed within the second charge accumulation circuit 104 using the configuration of the second clamping transistor 209b, the second charge accumulation unit 210b, and the second noise suppression element 213b. The second charge accumulation unit 210b holds the signal subjected to the noise removal process.

It is more preferable to use MIM capacitors or MOS capacitors that are capacitors in which a leak current (dark current) per unit area is small, as the second charge accumulation unit 210a and the second charge accumulation unit 210b, similar to the second charge accumulation unit 210 of the first configuration example. Accordingly, it is possible to improve resistance to noise and obtain a high-quality signal.

The averaging switch transistor 214 short-circuits the second charge accumulation unit 210a and the second charge accumulation unit 210b according to a control signal φMix input from the vertical scanning circuit (not illustrated). Accordingly, the intermediate signal voltage between the respective signal voltages subjected to the noise removal process, which were held before the short-circuit, that is, the averaged signal voltage, is held in the second charge accumulation unit 210a and the second charge accumulation unit 210b after the short-circuit.

The third amplifying transistor 211 outputs a signal voltage according to a voltage of the gate terminal, that is, a signal subjected to the noise removal process obtained by averaging the respective signal voltages held in the second charge accumulation unit 210a and the second charge accumulation unit 210b through short-circuit performed by the averaging switch transistor 214.

With this configuration, in the second configuration example of the solid-state imaging device 1, the respective signal voltages according to the signal charges obtained by the two photoelectric conversion units (the photoelectric conversion unit 101a and the photoelectric conversion unit 101b) performing photoelectric conversion on incident light are read via the inter-substrate connection portions (the first inter-substrate connection portion 12a and the first inter-substrate connection portion 12b) corresponding to the two photoelectric conversion units. The signals after the noise removal process are held in the charge accumulation units (the first charge accumulation unit 110a and the first charge accumulation unit 110b) corresponding to the two respective photoelectric conversion units. Further, in the second configuration example of the solid-state imaging device 1, the respective signal voltages according to the signal charges subjected to the photoelectric conversion by the two photoelectric conversion units are selected by the multiplexer (the pixel selection transistor 115a and the pixel selection transistor 115b) and output to the second inter-substrate connection portion 22. The respective signal voltages according to the respective signal charges subjected to the photoelectric conversion by the two photoelectric conversion units are separated by the demultiplexer (the pixel selection transistor 212a and the pixel selection transistor 212b). The signals after the noise removal process are held in the charge accumulation units (the second charge accumulation unit 210a and the second charge accumulation unit 210b) corresponding to the two photoelectric conversion units. Thereafter, the signals held in the charge accumulation units (the second charge accumulation unit 210a and the second charge accumulation unit 210b) corresponding to the two photoelectric conversion units are averaged. Thereafter, the solid-state imaging device 1, sequentially reads the signal voltages according to the signals after the noise removal process accumulated in the respective charge accumulation units (the first charge accumulation unit 110a and the first charge accumulation unit 110b) and the averaged signal as pixel signals and output the pixel signals to the first vertical signal line 19 and the second vertical signal line 29.

In the second configuration example of the solid-state imaging device 1 illustrated in FIG. 4, the example of the configuration in which the pixel 100a including the respective components including the photoelectric conversion unit 101a and the pixel 100b including the respective components including the photoelectric conversion unit 101b form a set is shown, but the set of pixels arranged in the solid-state imaging device 1 is not limited to the configuration illustrated in FIG. 4, similar to the solid-state imaging device 1 of the first configuration example. That is, one set may be configured with more pixels than in the configuration illustrated in FIG. 4. A pixel array included in the solid-state imaging device 1 may be formed by arranging a plurality of sets of the pixels.

Figure 5:
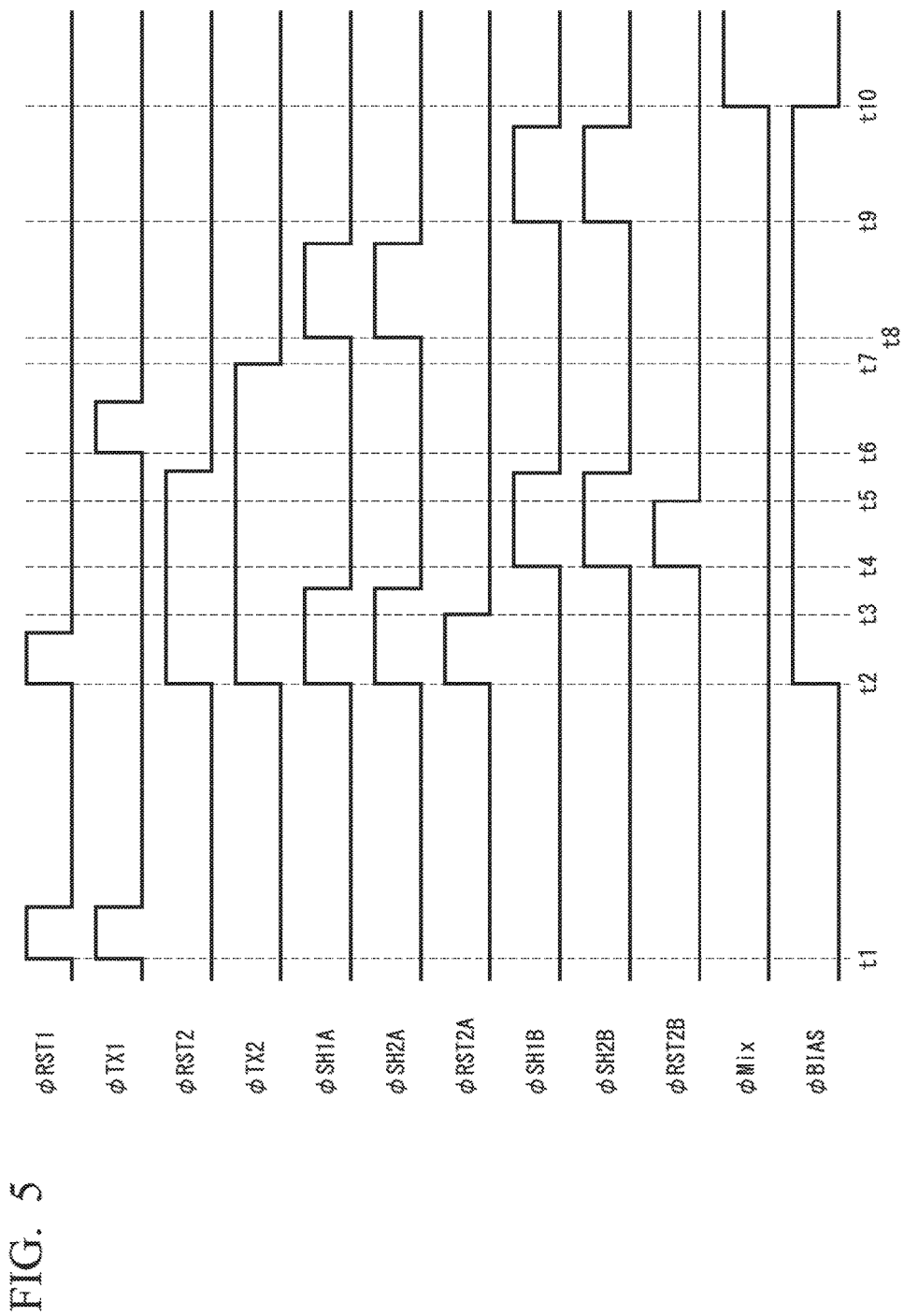
FIG. 5 is a timing chart illustrating timings of driving the second configuration example of the solid-state imaging device of the embodiment of the present invention.

Next, driving timings of the second configuration example in the solid-state imaging device 1 of the embodiment will be described. FIG. 5 is a timing chart illustrating timings of driving the second configuration example of the solid-state imaging device 1 of the embodiment of the present invention. The timing chart illustrated in FIG. 5 shows timings that are controlled by the vertical scanning circuit (not illustrated) in an operation of the second configuration example of the solid-state imaging device 1 in which the pixel 100a and the pixel 100b are simultaneously exposed, the pixel signal of the pixel 100a and the pixel signal of the pixel 100b are sequentially output to the first vertical signal line 19, and a pixel signal obtained by averaging the pixel signal of the pixel 100a and the pixel signal of the pixel 100b is output to the second vertical signal line 29, similar to the driving timings of the solid-state imaging device 1 of the first configuration example illustrated in FIG. 3.

In the second configuration example of the solid-state imaging device 1, two pixels including the pixel 100a and the pixel 100b are configured as one set, as illustrated in FIG. 4. In the second configuration example of the solid-state imaging device 1, two of the first charge accumulation circuit 103a (including the first charge accumulation unit 110a) and the first charge accumulation circuit 103b (including the first charge accumulation unit 110b) respectively corresponding to two of the photoelectric conversion unit 101a and the photoelectric conversion unit 101b, and the second charge accumulation circuit 104 (including the second charge accumulation unit 210a and the second charge accumulation unit 210b) that is common to the two of the photoelectric conversion unit 101a and the photoelectric conversion unit 101b are included. Therefore, in the timing chart illustrated in FIG. 5, timings of holding the signal charges generated by each of the photoelectric conversion unit 101a and the photoelectric conversion unit 101b, in the first charge accumulation unit 100a and the first charge accumulation unit 110b, and the second charge accumulation unit 210a and the second charge accumulation unit 210b is illustrated.

First, at time t1, all of the pixels (the pixel 100a and the pixel 100b) are reset. More specifically, at time t1, the vertical scanning circuit (not illustrated) simultaneously sets the control signal φTX1 and the control signal φRST1 to an "H" level to cause the charge transfer transistor 112a, the charge transfer transistor 12b, the pixel reset transistor 105a, and the pixel reset transistor 105b to be in an ON state. Accordingly, the photoelectric conversion unit 101a and the photoelectric conversion unit 101b, and the node capacitance 120a and the node capacitance 120b, included in the pixel 100a and the pixel 100b are reset.

Then, the vertical scanning circuit (not illustrated) simultaneously sets the control signal φTX1 and the control signal φRST1 to an "L" level to release the reset of the pixel 100a and the pixel 100b. Accordingly, the pixel 100a and the pixel 100b simultaneously start the exposure. That is, the photoelectric conversion unit 101a included in the pixel 100a and the photoelectric conversion unit 101b included in the pixel 100b start accumulation of signal charges obtained by performing photoelectric conversion on incident light.

Subsequently, from time t2 after a certain period of time elapses, that is, after any exposure time elapses, each of the charge transfer circuit 102a and the charge transfer circuit 102b performs readout of the signal at a reset level and the signal at an exposure level of the photoelectric conversion unit 101a or the photoelectric conversion unit 101b corresponding thereto, to the first inter-substrate connection portion 12a or the first inter-substrate connection portion 12b corresponding thereto. The first charge accumulation circuit 103a and the first charge accumulation circuit 103b perform a noise removal process of obtaining a difference between the signal at a reset level and the signal at an exposure level of the photoelectric conversion unit 101a or the photoelectric conversion unit 101b corresponding thereto. From time t2, each of the charge transfer circuit 102a and the charge transfer circuit 102b sequentially performs readout of the signal at a reset level and the signal at an exposure level of the photoelectric conversion unit 101a or the photoelectric conversion unit 101b corresponding thereto, to the second inter-substrate connection portion 22. Further, the second charge accumulation circuit 104 sequentially performs a noise removal process of obtaining a difference of the signal at a reset level and the signal at an exposure level of the pixel 100a, and a noise removal process of obtaining a difference of the signal at a reset level and the signal at an exposure level of the pixel 100b.

More specifically, at time t2, the vertical scanning circuit (not illustrated) controls the control signal φBIAS to operate the pixel load transistor 114a as a load of the corresponding first amplifying transistor 106a and operate the pixel load transistor 114b as a load of the corresponding first amplifying transistor 106b.

Further, the vertical scanning circuit (not illustrated) sets the control signal φRST1 to an "H" level to cause the pixel reset transistor 105a and the pixel reset transistor 105b to be in an ON state, and reset the node capacitance 120a and the node capacitance 120b. Accordingly, the signal voltage at a reset level of the photoelectric conversion unit 101a from the first amplifying transistor 106a is output to the first noise suppression element 113a via the first inter-substrate connection portion 12a, and is output to the pixel selection transistor 115a. Further, the signal voltage at a reset level of the photoelectric conversion unit 101b from the first amplifying transistor 106b is output to the first noise suppression element 113b via the first inter-substrate connection portion 12b, and is output to the pixel selection transistor 115b.

Further, the vertical scanning circuit (not illustrated) sets the control signal φSH1A and the control signal φSH2A to an "H" level to cause the pixel selection transistor 115a and the pixel selection transistor 212a to be in an ON state. Accordingly, the signal voltage at a reset level of the photoelectric conversion unit 101a output from the first amplifying transistor 106a to the pixel selection transistor 115a via the first inter-substrate connection portion 12a is selected, and output to the second noise suppression element 213a via the pixel selection transistor 115a, the second inter-substrate connection portion 22, and the pixel selection transistor 212a.

Further, the vertical scanning circuit (not illustrated) sets the control signal φRST2 and the control signal φTX2 to an "H" level to cause the first clamping transistor 109a and the first clamping transistor 109b, and the first sample and hold transistor 108a and the first sample and hold transistor 108b to be in an ON state. Accordingly, each of the first charge accumulation unit 110a and the first charge accumulation unit 11b, and the first noise suppression element 113a and the first noise suppression element 113b are clamped. Further, the vertical scanning circuit (not illustrated) sets the control signal RST2A to an "H" level to cause the second clamping transistor 209a to be in an ON state. Accordingly, each of the second charge accumulation unit 210a and the second noise suppression element 213a is clamped.

Then, the vertical scanning circuit (not illustrated) sets the control signal φRST1 to an "L" level to release the reset of the node capacitance 120a and the node capacitance 120b. Subsequently, at time t3, the vertical scanning circuit (not illustrated) sets the control signal φRST2A to an "L" level to release the clamp of the second charge accumulation unit 210a. Then, the vertical scanning circuit (not illustrated) sets the control signal φSH1A and the control signal φSH2A to an "L" level to cause the pixel selection transistor 115a and the pixel selection transistor 212a to be in an OFF state, and release the selection of the signal voltage at a reset level of the photoelectric conversion unit 101a.

Subsequently, at time t4, the vertical scanning circuit (not illustrated) sets the control signal φSH1B and the control signal φSH2B to an "H" level to cause the pixel selection transistor 115b and the pixel selection transistor 212b to be in an ON state. Accordingly, the signal voltage at a reset level of the photoelectric conversion unit 101b output from the first amplifying transistor 106b to the pixel selection transistor 115b via the first inter-substrate connection portion 12b is selected, and output to the second noise suppression element 213b via the pixel selection transistor 115b, the second inter-substrate connection portion 22, and the pixel selection transistor 212b. Further, the vertical scanning circuit (not illustrated) sets the control signal φRST2B to an "H" level to cause the second clamping transistor 209b to be in an ON state. Accordingly, each of the second charge accumulation unit 210b and the second noise suppression element 213b is clamped.

Subsequently, at time t5, the vertical scanning circuit (not illustrated) sets the control signal φRST2B to an "L" level to release the clamp of the second charge accumulation unit 210b. Then, the vertical scanning circuit (not illustrated) sets the control signal φSH1B and the control signal φSH2B to an "L" level to cause the pixel selection transistor 115b and the pixel selection transistor 212b to be in an OFF state, and release the selection of the signal voltage at a reset level of the photoelectric conversion unit 101b. Further, the vertical scanning circuit (not illustrated) sets the control signal φRST2 to an "L" level to release the clamp of the first charge accumulation unit 110a and the first charge accumulation unit 110b.

Subsequently, at time t6, the vertical scanning circuit (not illustrated) sets the control signal φTX1 to an "H" level to cause the charge transfer transistor 112a and the charge transfer transistor 112b to be in an ON state, and transfer the signal charges accumulated in the photoelectric conversion unit 101a to the gate terminal of the first amplifying transistor 106a, and transfer the signal charges accumulated in the photoelectric conversion unit 101b to the gate terminal of the first amplifying transistor 106b. In this case, the signal charges transferred by the charge transfer transistor 112a are accumulated in the node capacitance 120a, and the signal charges transferred by the charge transfer transistor 112b are accumulated in the node capacitance 120b. Accordingly, a signal voltage (signal at an exposure level) according to the signal charges generated by the photoelectric conversion unit 101a, that is, the signal charges accumulated in the node capacitance 120a, is output from the first amplifying transistor 106a to the first noise suppression element 113a via the first inter-substrate connection portion 12a, and output to the pixel selection transistor 115a. Further, a signal voltage (signal at an exposure level) according to the signal charges generated by the photoelectric conversion unit 101b, that is, the signal charges accumulated in the node capacitance 120b, is output from the first amplifying transistor 106b to the first noise suppression element 113b via the first inter-substrate connection portion 12b, and output to the pixel selection transistor 115b.

The first noise suppression element 113a outputs a voltage of a difference between the signal voltage at a reset level and the signal voltage at an exposure level of the photoelectric conversion unit 101a, that is, a signal voltage subjected to the noise removal process. Further, similarly, the first noise suppression element 113b outputs a signal voltage subjected to the noise removal process of the photoelectric conversion unit 101b.

Then, the vertical scanning circuit (not illustrated) sets the control signal φTX1 to an "L" level to stop transfer to the gate terminal of the first amplifying transistor 106a of the signal charges accumulated in the photoelectric conversion unit 101a and transfer to the gate terminal of the first amplifying transistor 106b of the signal charges accumulated in the photoelectric conversion unit 101b.

Subsequently, at time t7, the vertical scanning circuit (not illustrated) sets the control signal φTX2 to an 'L' level to stop sample and hold of the first charge accumulation unit 110a, and sample and hold of the first charge accumulation unit 110b. Accordingly, the first charge accumulation unit 110a holds the signal voltage subjected to the noise removal process output by the first noise suppression element 113a, and the first charge accumulation unit 110b holds the signal voltage subjected to the noise removal process output by the first noise suppression element 113b.

Up to this point, the signal charges generated by the photoelectric conversion unit 101a included in the pixel 100a are subjected to a noise removal process and held in the first charge accumulation unit 110a, and the signal charges generated by the photoelectric conversion unit 101b included in the pixel 100b are subjected to the noise removal process and held (accumulated) in the first charge accumulation unit 110b.

Subsequently, at time t8, the vertical scanning circuit (not illustrated) sets the control signal φSH1A and the control signal φSH2A to an "H" level to cause the pixel selection transistor 115a and the pixel selection transistor 212a to be in an ON state. Accordingly, the signal charges generated by the photoelectric conversion unit 101a, which is output from the first amplifying transistor 106a to the pixel selection transistor 115a via the first inter-substrate connection portion 12a, that is, the signal voltage (the signal at an exposure level) according to the signal charges accumulated in the node capacitance 120a is selected, and output to the second noise suppression element 213a via the pixel selection transistor 115a, the second inter-substrate connection portion 22, and the pixel selection transistor 212a.

The second noise suppression element 213a outputs a voltage of a difference between the signal voltage at a reset level and the signal voltage at an exposure level of the photoelectric conversion unit 101a, that is, a signal voltage subjected to the noise removal process.

Then, the vertical scanning circuit (not illustrated) sets the control signal φSH1A and the control signal φSH2A to an "L" level to cause the pixel selection transistor 115a and the pixel selection transistor 212a to be in an OFF state, and release the selection of the signal voltage according to the signal charges generated by the photoelectric conversion unit 101a.

Up to this point, the signal charges generated by the photoelectric conversion unit 101a included in the pixel 100a are subjected to a noise removal process and held (accumulated) in the second charge accumulation unit 210a.

Subsequently, at time t9, the vertical scanning circuit (not illustrated) sets the control signal φSH LB and the control signal φSH2B to an "H" level to cause the pixel selection transistor 115b and the pixel selection transistor 212b to be in an ON state. Accordingly, the signal charges generated by the photoelectric conversion unit 101b, which is output from the first amplifying transistor 106b to the pixel selection transistor 115b via the first inter-substrate connection portion 12b, that is, the signal voltage (the signal at an exposure level) according to the signal charges accumulated in the node capacitance 120b is selected, and output to the second noise suppression element 213b via the pixel selection transistor 115b, the second inter-substrate connection portion 22, and the pixel selection transistor 212b.

The second noise suppression element 213b outputs a voltage of a difference between the signal voltage at a reset level and the signal voltage at an exposure level of the photoelectric conversion unit 101b, that is, a signal voltage subjected to the noise removal process.

Then, the vertical scanning circuit (not illustrated) sets the control signal φSH1B and the control signal φSH2B to an "L" level to cause the pixel selection transistor 115b and the pixel selection transistor 212b to be in an OFF state, and release the selection of the signal voltage according to the signal charges generated by the photoelectric conversion unit 101b.

Up to this point, the signal charges generated by the photoelectric conversion unit 101b included in the pixel 100b are subjected to the noise removal process and held (accumulated) in the second charge accumulation unit 210b.

Subsequently, at time t10, the second charge accumulation circuit 104 performs a process of averaging the signal voltage subjected to the noise removal process held in the second charge accumulation unit 210a and the signal voltage subjected to the noise removal process held in the second charge accumulation unit 210b. More specifically, at time t10, the vertical scanning circuit (not illustrated) sets the control signal Mix to an "H" level to cause the averaging switch transistor 214 to be in an ON state. Accordingly, the second charge accumulation unit 210a and the second charge accumulation unit 210b are short-circuited, and each of the second charge accumulation unit 210a and the second charge accumulation unit 210b holds an intermediate signal voltage between the respective held signal voltages subjected to the noise removal process, that is, the averaged signal voltage.

Further, at time t10, the vertical scanning circuit (not illustrated) controls the control signal φBIAS to stop an operation as a load of the first amplifying transistor 106a or the first amplifying transistor 106b corresponding thereto, of each of the pixel load transistor 14a and the pixel load transistor 114b.

Then, the vertical scanning circuit (not illustrated) sequentially controls the control signal φSEL1A and the control signal φSEL1B to sequentially output the respective signal voltages subjected to the noise removal process held in the first charge accumulation unit 110a and the first charge accumulation unit 10b as pixel signals of the respective pixels to the first vertical signal line 19. Further, the vertical scanning circuit (not illustrated) controls the control signal φSEL2 to output the averaged signal voltage subjected to the noise removal process held in the second charge accumulation unit 210a and the second charge accumulation unit 210b as a pixel signal of which the number of pixels is reduced to the second vertical signal line 29.

In the second configuration example of the solid-state imaging device 1 illustrated in FIG. 4, the vertical scanning circuit (not illustrated) may set the control signal φMix to an "L" level to release a short-circuit between the second charge accumulation unit 210a and the second charge accumulation unit 210b and then output the averaged signal voltage subjected to the noise removal process held in the second charge accumulation unit 210a to the second vertical signal line 29 as the pixel signal (the reduced image signal) in which the number of pixels is reduced. Further, in the second configuration example of the solid-state imaging device 1 illustrated in FIG. 4, the vertical scanning circuit (not illustrated) may set the control signal Mix to an "H" level and control the control signal φSEL2 before the averaged signal voltage is held in each of the second charge accumulation unit 210a and the second charge accumulation unit 210b. Accordingly, the signal voltage subjected to the noise removal process before averaging, which is held in the second charge accumulation unit 210a, that is, the signal charges generated by the photoelectric conversion unit 101a, which are subjected to the noise removal process, can be output to the second vertical signal line 29 as the pixel signal of the pixel 100a. That is, the pixel signal obtained by decimating the pixel 100b can be output to the second vertical signal line 29.

Further, in the second configuration example of the solid-state imaging device 1, an output order of the full-resolution image signal and the reduced image signal or whether to output the respective pixel signals is not particularly defined, similar to the first configuration example of the solid-state imaging device 1. Therefore, detailed description of timings at which the vertical scanning circuit (not illustrated) controls the control signal φSEL1A, the control signal φSEL1B, and the control signal φSEL2 to output the full-resolution image signal to the first vertical signal line 19 and a timing at which the vertical scanning circuit outputs the reduced image signal to the second vertical signal line 29 will be omitted.

With these driving timings, in the second configuration example of the solid-state imaging device 1, the respective signal voltages according to the signal charges obtained by the two photoelectric conversion units (the photoelectric conversion unit 101a and the photoelectric conversion unit 101b) performing photoelectric conversion on incident light are read to the inter-substrate connection portions (the first inter-substrate connection portion 12a and the first inter-substrate connection portion 12b) corresponding to the two photoelectric conversion units. The signals after the noise removal process are held in the charge accumulation units (the first charge accumulation unit 110a and the first charge accumulation unit 110b) corresponding to the two respective photoelectric conversion units. Further, at the driving timing in the second configuration example of the solid-state imaging device 1, the respective signal voltages according to the signal charges subjected to the photoelectric conversion by the two photoelectric conversion units are selected by the multiplexer (the pixel selection transistor 115a and the pixel selection transistor 115b) and output to the second inter-substrate connection portion 22. The respective signal voltages according to the respective signal charges subjected to the photoelectric conversion by the two photoelectric conversion units are separated by the demultiplexer (the pixel selection transistor 212a and the pixel selection transistor 212b). The signals after the noise removal process are held in the charge accumulation units (the second charge accumulation unit 210a and the second charge accumulation unit 210b) corresponding to the two photoelectric conversion units. Thereafter, the signals held in the charge accumulation units (the second charge accumulation unit 210a and the second charge accumulation unit 210b) corresponding to the two photoelectric conversion units are averaged. In the solid-state imaging device 1, signal voltages according to the signals after the noise removal process accumulated in the respective charge accumulation units (the first charge accumulation unit 110a and the first charge accumulation unit 110b) are output to the first vertical signal line 19 as the full-resolution image signal, and the averaged signal voltage is output to the second vertical signal line 29 as the reduced image signal.

Thus, in the second configuration example of the solid-state imaging device 1 of the embodiment, the signal charges of the photoelectric conversion unit 101a included in the pixel 100a are subjected to the noise removal process and held in the first charge accumulation unit 110a, and the signal charges of the photoelectric conversion unit 101b included in the pixel 100b are subjected to the noise removal process and held in the first charge accumulation unit 110b, similar to the solid-state imaging device 1 of the first configuration example. Further, in the second configuration example of the solid-state imaging device 1 of the embodiment, the signal charges of the photoelectric conversion unit 101a included in the pixel 100a are subjected to the noise removal process and held in the second charge accumulation unit 210a, the signal charges of the photoelectric conversion unit 101b included in the pixel 100b are subjected to the noise removal process and held in the second charge accumulation unit 210b, and then the respective signal charges are averaged and held in the second charge accumulation unit 210a and the second charge accumulation unit 210b. Accordingly, in the second configuration example of the solid-state imaging device 1 of the embodiment, both of the pixel signal (the full-resolution image signal) of all the pixels and the pixel signal (the reduced image signal) in which the number of pixels is reduced, that is, which is obtained by averaging (adding and averaging) the pixel signals of the respective pixels, can be output independently, similar to the solid-state imaging device 1 of the first configuration example. Therefore, in the second configuration example of the solid-state imaging device 1 of the embodiment, it is possible to obtain the same effects as those of the solid-state imaging device 1 of the first configuration example. That is, an image having a smaller relative noise amount or a smaller moiré generation amount and a better image quality can be generated from the pixel signal output in the second configuration example of the solid-state imaging device 1 of the embodiment. Further, in the second configuration example of the solid-state imaging device 1 of the embodiment, the full-resolution image and the reduced image can be generated in parallel.

Third Configuration Example

Next, an example of still another configuration of the solid-state imaging device 1 of the embodiment will be described. The solid-state imaging device 1 of a third configuration example is a configuration example in which signal charges generated by the respective photoelectric conversion unit 101 are held in the second charge accumulation circuit 104, and then are averaged and output when a signal voltage (pixel signal) according to the held respective signal charges is output, similar to the solid-state imaging device 1 of the second configuration example. However, in the solid-state imaging device 1 of the third configuration example, a configuration for holding the averaged signal voltage, that is, a configuration of outputting a pixel signal obtained by reducing the number of pixels, is changed in a configuration in which the number of inter-substrate connection portions that connect the first readout substrate to the second readout substrate decreases, similar to the solid-state imaging device 1 of the second configuration example. Therefore, in the solid-state imaging device 1 of the third configuration example, a configuration of the second charge accumulation circuit 104 differs from that in the solid-state imaging device 1 of the second configuration example.

The solid-state imaging device 1 of the third configuration example also includes the same components as the solid-state imaging device 1 of the first configuration example and the second configuration example. Therefore, among the components of the solid-state imaging device 1 of the third configuration example, the same components as the components of the solid-state imaging device 1 of the first configuration example and the second configuration example are denoted with the same reference signs, and detailed description of the respective components will be omitted.

Figure 6:
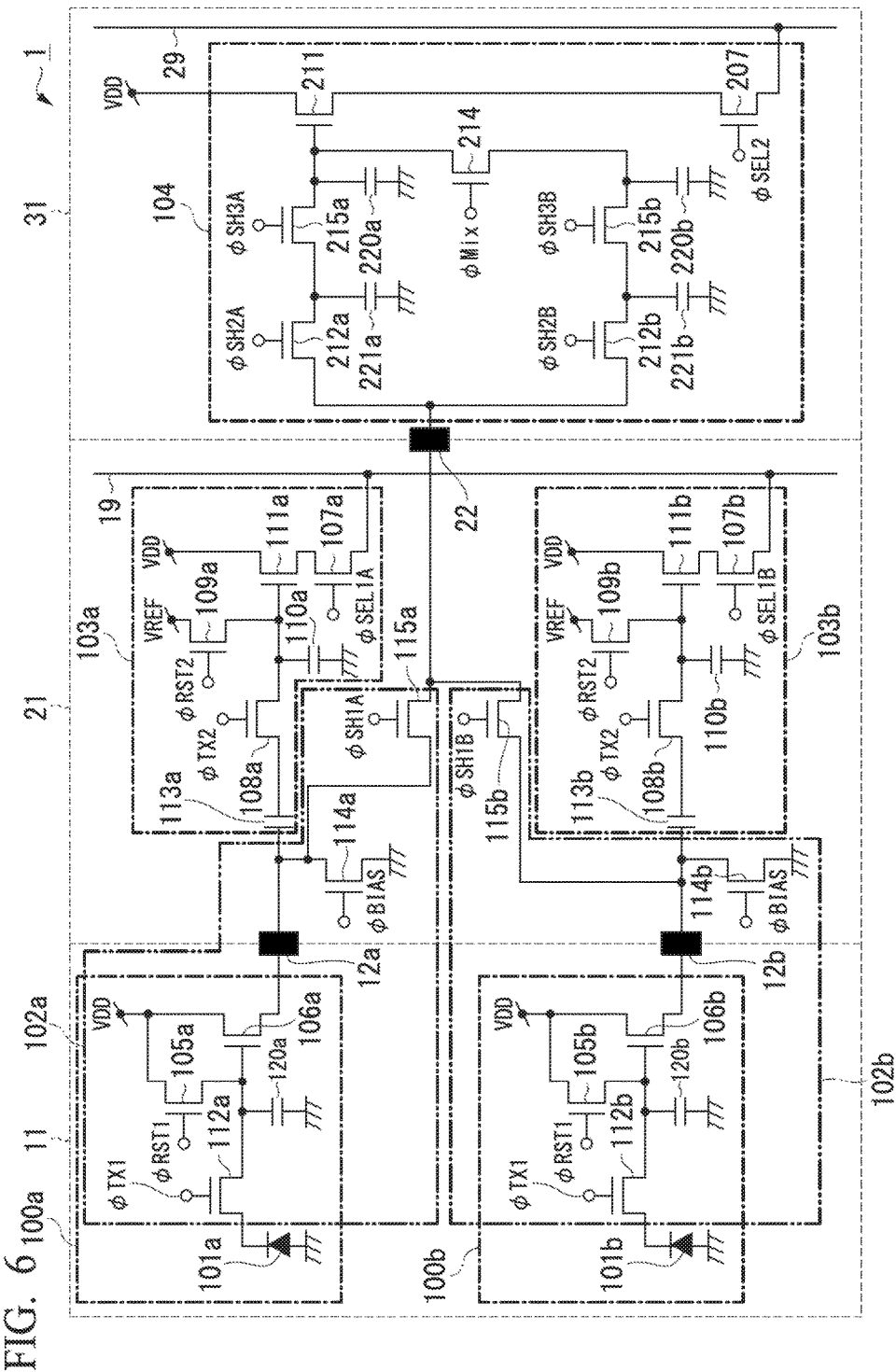
FIG. 6 is a circuit diagram illustrating a third configuration example of the solid-state imaging device of the embodiment of the present invention.

FIG. 6 is a circuit diagram illustrating a third configuration example of the solid-state imaging device 1 of the embodiment of the present invention. In FIG. 6, in the third configuration example of the solid-state imaging device 1, photoelectric conversion unit 101a and 101b, pixel reset transistor 105a and 105b, first amplifying transistor 106a and 106b, and charge transfer transistor 112a and 112b are formed in the photoelectric conversion substrate 11. In FIG. 6, each of the node capacitance 120a and the node capacitance 120b is shown by a symbol of a capacitor, as in the photoelectric conversion substrate 11 of the first configuration example and the second configuration example. The pixel 100a includes the photoelectric conversion unit 101a, the pixel reset transistor 105a, the first amplifying transistor 106a, the charge transfer transistor 112a, and the node capacitance 120a. The pixel 100b includes the photoelectric conversion unit 101b, the pixel reset transistor 105b, the first amplifying transistor 106b, the charge transfer transistor 112b, and the node capacitance 120b. The photoelectric conversion substrate 11 is the same as the photoelectric conversion substrate 11 of the first configuration example and the second configuration example.

Further, in FIG. 6, in the third configuration example of the solid-state imaging device 1, first clamping transistor 109a and 109b, first sample and hold transistor 108a and 108b, second amplifying transistor 111a and 111b, first selection transistor 107a and 107b, first charge accumulation units 110a and 110b, pixel load transistor 114a and 114b, and first noise suppression elements 113a and 113b are formed in the first readout substrate 21. Further, in the third configuration example of the solid-state imaging device 1, the multiplexer including the pixel selection transistor 115a and the pixel selection transistor 115b is formed in the first readout substrate 21. The charge transfer circuit 102a includes the pixel reset transistor 105a, the first amplifying transistor 106a, the charge transfer transistor 112a, the node capacitance 120a, the pixel load transistor 114a, and the pixel selection transistor 115a. The charge transfer circuit 102b includes the pixel reset transistor 105b, the first amplifying transistor 106b, the charge transfer transistor 112b, the node capacitance 120b, the pixel load transistor 114b, and the pixel selection transistor 115b. The first charge accumulation circuit 103a includes the first clamping transistor 109a, the first sample and hold transistor 108a, the second amplifying transistor 111a, the first selection transistor 107a, the first charge accumulation unit 110a, and the first noise suppression element 113a. The first charge accumulation circuit 103b includes the first clamping transistor 109b, the first sample and hold transistor 108b, the second amplifying transistor 111b, the first selection transistor 107b, the first charge accumulation unit 110b, and the first noise suppression element 113b. The first readout substrate 21 is the same as the first readout substrate 21 of the second configuration example.

Further, in FIG. 6, in the third configuration example of the solid-state imaging device 1, the second charge accumulation circuit 104 including the pixel selection transistor 212a, a second sample and hold transistor 215a, a second charge accumulation unit 220a, and a second charge accumulation unit 221a corresponding to the pixel 100a, the pixel selection transistor 212b, a second sample and hold transistor 215b, a second charge accumulation unit 220b, and a second charge accumulation unit 221b corresponding to the pixel 100b, the third amplifying transistor 211, the second selection transistor 207, and the averaging switch transistor 214 is formed in the second readout substrate 31. In the second readout substrate 31, the pixel selection transistor 212a and the pixel selection transistor 212b constitute a demultiplexer corresponding to the multiplexer formed in the first readout substrate 21, similar to the second readout substrate 31 of the second configuration example.

In the third configuration example of the solid-state imaging device 1, the photoelectric conversion substrate 11 and the first readout substrate 21 are connected by the first inter-substrate connection portion 12a and the first inter-substrate connection portion 12b, and the first readout substrate 21 and the second readout substrate 31 are connected by the second inter-substrate connection portion 22, similar to the solid-state imaging device 1 of the second configuration example.

In the third configuration example of the solid-state imaging device 1 of the embodiment, a structure of the first inter-substrate connection portion 12a and the first inter-substrate connection portion 12b electrically connecting the photoelectric conversion substrate 11 to the first readout substrate 21 is not particularly defined, similar to the first configuration example and the second configuration example of the solid-state imaging device 1. Further, in the third configuration example of the solid-state imaging device 1 of the embodiment, a structure of the second inter-substrate connection portion 22 electrically connecting the first readout substrate 21 to the second readout substrate 31 is not particularly defined, similar to the first configuration example and the second configuration example of the solid-state imaging device 1.

Each of the pixel selection transistor 212a and the pixel selection transistor 212b outputs the signal voltage input via the second inter-substrate connection portion 22 to the second sample and hold transistor 215a or the second sample and hold transistor 215b corresponding thereto according to the control signal φSH2A or the control signal φSH2B corresponding thereto input from the vertical scanning circuit (not illustrated). Further, each of the pixel selection transistor 212a and the pixel selection transistor 212b holds the signal voltage input via the second inter-substrate connection portion 22 in the second charge accumulation unit 221a or the second charge accumulation unit 221b corresponding thereto. In the solid-state imaging device 1 of the third configuration example, the configuration of the pixel selection transistor 212a and the pixel selection transistor 212b operates as a demultiplexer that outputs one input signal voltage to either the second sample and hold transistor 215a and the second charge accumulation unit 221a or the second sample and hold transistor 215b and the second charge accumulation unit 221b corresponding thereto.

Each of the second charge accumulation unit 221a and the second charge accumulation unit 221b is a capacitor that holds (accumulates) the signal voltage output from the pixel selection transistor 212a or the pixel selection transistor 212b corresponding thereto.

Each of the second sample and hold transistor 215a and the second sample and hold transistor 215b holds the signal voltage output from the pixel selection transistor 212a or the pixel selection transistor 212b corresponding thereto, in the second charge accumulation unit 220a or the second charge accumulation unit 220b corresponding thereto according to a control signal φSH3A or a control signal φSH3B corresponding thereto input from the vertical scanning circuit (not illustrated). Further, each of the second sample and hold transistor 215a and the second sample and hold transistor 215b transfers the signal voltage held in the second charge accumulation unit 221a or the second charge accumulation unit 221b corresponding thereto to the second charge accumulation unit 220a or the second charge accumulation unit 220b corresponding thereto such that the signal voltage is held.

Each of the second charge accumulation unit 220a and the second charge accumulation unit 220b is a capacitor that holds (accumulates) the signal voltage output from the second sample and hold transistor 215a or the second sample and hold transistor 215b corresponding thereto.

In the second charge accumulation circuit 104 in the third configuration example, the signal at a reset level and the signal at an exposure level of the photoelectric conversion unit 101a are separately held in the second charge accumulation unit 220a or the second charge accumulation unit 221a by the configuration of the pixel selection transistor 212a, the second sample and hold transistor 215a, the second charge accumulation unit 220a, and the second charge accumulation unit 221a. Further, in the second charge accumulation circuit 104 in the third configuration example, the signal at a reset level and the signal at an exposure level of the photoelectric conversion unit 101b are separately held in the second charge accumulation unit 220b or the second charge accumulation unit 221b by the configuration of the pixel selection transistor 212b, the second sample and hold transistor 215b, the second charge accumulation unit 220b, and the second charge accumulation unit 221b. The signal at a reset level and the signal at an exposure level are separately averaged.

It is more preferable to use MIM capacitors or MOS capacitors that are a capacitors in which a leak current (dark current) per unit area is small as the second charge accumulation unit 220a, the second charge accumulation unit 220b, the second charge accumulation unit 221a, and the second charge accumulation unit 221b, similar to the second charge accumulation unit 210a and the second charge accumulation unit 210b of the second configuration example. Accordingly, it is possible to improve resistance to noise and obtain a high-quality signal.

The averaging switch transistor 214 short-circuits the second charge accumulation unit 220a and the second charge accumulation unit 220b according to the control signal ϕMix input from the vertical scanning circuit (not illustrated). Accordingly, the intermediate signal voltage between the respective signal voltages held before the short-circuit, that is, the averaged signal voltage, is held in the second charge accumulation unit 220a and the second charge accumulation unit 220b after the short-circuit.

The third amplifying transistor 211 outputs a signal voltage according to a voltage of the gate terminal, that is, a signal voltage obtained by averaging the respective signal voltages held in the second charge accumulation unit 220a and the second charge accumulation unit 220b through short-circuit performed by the averaging switch transistor 214.

With this configuration, in the third configuration example of the solid-state imaging device 1, the respective signal voltages according to the signal charges obtained by the two photoelectric conversion units (the photoelectric conversion unit 101a and the photoelectric conversion unit 101b) performing photoelectric conversion on incident light are read via the inter-substrate connection portions (the first inter-substrate connection portion 12a and the first inter-substrate connection portion 12b) corresponding to the two photoelectric conversion units. The signals after the noise removal process are held in the charge accumulation units (the first charge accumulation unit 110a and the first charge accumulation unit 110b) corresponding to the two respective photoelectric conversion units. Further, in the third configuration example of the solid-state imaging device 1, the respective signal voltages of the signal at a reset level and the signal at an exposure level of the two photoelectric conversion units are separately selected by a multiplexer (the pixel selection transistor 115a and the pixel selection transistor 115b) and output to the second inter-substrate connection portion 22. The respective signal at a reset level and the signal at an exposure level of the two photoelectric conversion units are separately held in the charge accumulation unit (the second charge accumulation unit 220a, the second charge accumulation unit 220b, the second charge accumulation unit 221a, and the second charge accumulation unit 221b) corresponding to the two photoelectric conversion units by the demultiplexer (the pixel selection transistor 212a and the pixel selection transistor 212b). Thereafter, the signals held in the charge accumulation units (the second charge accumulation unit 220a and the second charge accumulation unit 220b) corresponding to the two photoelectric conversion units are separately averaged. Thereafter, in the solid-state imaging device 1, signal voltages according to the signals after the noise removal process accumulated in the respective charge accumulation units (the first charge accumulation unit 11a and the first charge accumulation unit 110b) are sequentially read to the first vertical signal line 19 as the pixel signal, and the averaged signal voltage according to the signal at a reset level and the averaged signal voltage according to the signal at an exposure level are output to the second vertical signal line 29 as pixel signals. Therefore, in the imaging system on which the solid-state imaging device 1 of the third configuration example is mounted, the noise removal process in the imaging system is assumed to be performed on the basis of the pixel signal according to the averaged signal at a reset level and the pixel signal according to the averaged signal at an exposure level, which are read separately.

In the third configuration example of the solid-state imaging device 1 illustrated in FIG. 6, the example of the configuration in which the pixel 100a including the respective components including the photoelectric conversion unit 101a and the pixel 100b including the respective components including the photoelectric conversion unit 101b form a set is shown, but the set of pixels arranged in the solid-state imaging device 1 is not limited to the configuration illustrated in FIG. 6, similar to the solid-state imaging device 1 of the second configuration example. That is, one set may be configured with more pixels than in the configuration illustrated in FIG. 6. A pixel array included in the solid-state imaging device 1 may be formed by arranging a plurality of sets of the pixels.

Figure 7:
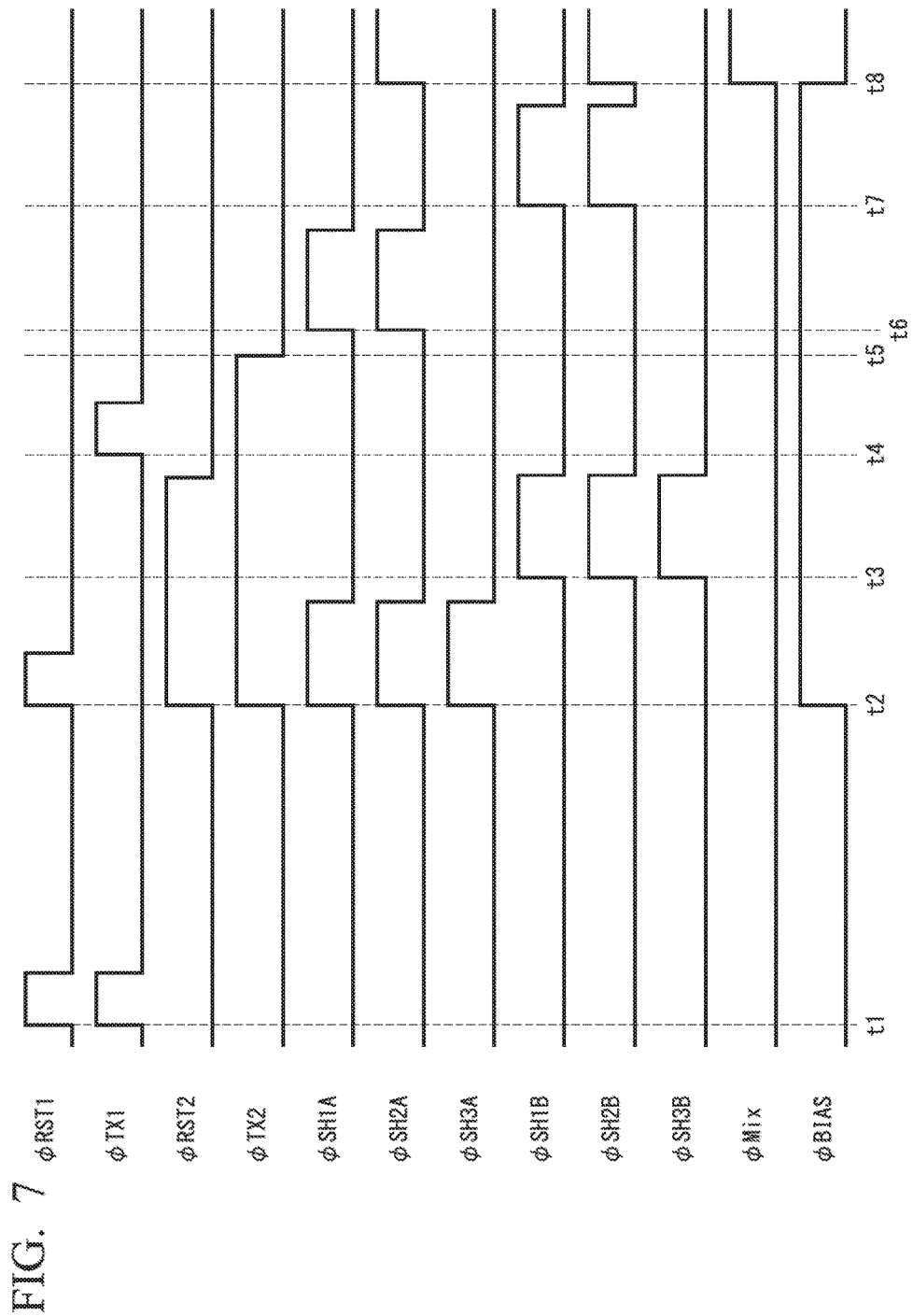
FIG. 7 is a timing chart illustrating timings of driving the third configuration example of the solid-state imaging device of the embodiment of the present invention.

Next, driving timings of the third configuration example in the solid-state imaging device 1 of the embodiment will be described. FIG. 7 is a timing chart illustrating timings of driving the third configuration example of the solid-state imaging device 1 of the embodiment of the present invention. The timing chart illustrated in FIG. 7 shows timings that are controlled by the vertical scanning circuit (not illustrated) in an operation of the third configuration example of the solid-state imaging device 1 in which the pixel 100a and the pixel 100b are simultaneously exposed, the pixel signal of the pixel 100a and the pixel signal of the pixel 100b are sequentially output to the first vertical signal line 19, and a pixel signal obtained by averaging the pixel signal of the pixel 100a and the pixel signal of the pixel 10b is output to the second vertical signal line 29, similar to the driving timings of the solid-state imaging device 1 of the first configuration example and the second configuration example.

In the third configuration example of the solid-state imaging device 1, two pixels including the pixel 100a and the pixel 100b are configured as one set, as illustrated in FIG. 6. In the third configuration example of the solid-state imaging device 1, two of the first charge accumulation circuit 103a (including the first charge accumulation unit 110a) and the first charge accumulation circuit 103b (including the first charge accumulation unit 110b) respectively corresponding to two of the photoelectric conversion unit 101a and the photoelectric conversion unit 101b, the second charge accumulation circuit 104 (including the second charge accumulation unit 220a and the second charge accumulation unit 220b, and the second charge accumulation unit 221a and the second charge accumulation unit 221b) that is common to the two of the photoelectric conversion unit 101a and the photoelectric conversion unit 101b are included. Therefore, in the timing chart illustrated in FIG. 7, timings of holding the signal charges generated by each of the photoelectric conversion unit 101a and the photoelectric conversion unit 101b, in the first charge accumulation unit 110a and the first charge accumulation unit 110b, the second charge accumulation unit 220a and the first charge accumulation unit 220b, and the second charge accumulation unit 220a and the second charge accumulation unit 220b, and the second charge accumulation unit 221a and the second charge accumulation unit 221b are illustrated.

First, at time φ1, all of the pixels (the pixel 100a and the pixel 100b) are reset. More specifically, at time t1, the vertical scanning circuit (not illustrated) simultaneously sets the control signal φTX1 and the control signal φRST1 to an "1-1" level to cause the charge transfer transistor 112a, the charge transfer transistor 112b, the pixel reset transistor 105a, and the pixel reset transistor 105b to be in an ON state. Accordingly, the photoelectric conversion unit 101a and the photoelectric conversion unit 101b, and the node capacitance 120a and the node capacitance 120b, included in the pixel 100a and the pixel 100b are reset.

Then, the vertical scanning circuit (not illustrated) simultaneously sets the control signal φTX1 and the control signal φRST1 to an "L" level to release the reset of the pixel 100a and the pixel 100b. Accordingly, the pixel 100a and the pixel 100b simultaneously start the exposure. That is, the photoelectric conversion unit 101a included in the pixel 100a and the photoelectric conversion unit 101b included in the pixel 100b start accumulation of signal charges obtained by performing photoelectric conversion on incident light.

Subsequently, from time t2 after a certain period of time elapses, that is, after any exposure time elapses, each of the charge transfer circuit 102a and the charge transfer circuit 102b performs readout of the signal at a reset level and the signal at an exposure level of the photoelectric conversion unit 101a or the photoelectric conversion unit 101b corresponding thereto, to the first inter-substrate connection portion 12a or the first inter-substrate connection portion 12b corresponding thereto. The first charge accumulation circuit 103a and the first charge accumulation circuit 103b perform a noise removal process of obtaining a difference between the signal at a reset level and the signal at an exposure level of the photoelectric conversion unit 101a or the photoelectric conversion unit 101b corresponding thereto. From time t2, each of the charge transfer circuit 102a and the charge transfer circuit 102b sequentially performs readout of the signal at a reset level and the signal at an exposure level of the photoelectric conversion unit 101a or the photoelectric conversion unit 101b corresponding thereto, to the second inter-substrate connection portion 22. Further, the second charge accumulation circuit 104 separately holds the signal at a reset level and the signal at an exposure level, of each of the pixel 100a and the pixel 100b.

More specifically, at time t2, the vertical scanning circuit (not illustrated) controls the control signal φBIAS to operate the pixel load transistor 114a as a load of the corresponding first amplifying transistor 106a and operate the pixel load transistor 114b as a load of the corresponding first amplifying transistor 106b.

Further, the vertical scanning circuit (not illustrated) sets the control signal φRST1 to an "H" level to cause the pixel reset transistor 105a and the pixel reset transistor 105b to be in an ON state, and reset the node capacitance 120a and the node capacitance 120b. Accordingly, the signal voltage at a reset level of the photoelectric conversion unit 101a from the first amplifying transistor 106a is output to the first noise suppression element 113a via the first inter-substrate connection portion 12a, and is output to the pixel selection transistor 115a. Further, the signal voltage at a reset level of the photoelectric conversion unit 101b from the first amplifying transistor 106b is output to the first noise suppression element 113b via the first inter-substrate connection portion 12b, and is output to the pixel selection transistor 115b.

Further, the vertical scanning circuit (not illustrated) sets the control signal φSH1A and the control signal φSH2A to an "H" level to cause the pixel selection transistor 15a and the pixel selection transistor 212a to be in an ON state. Accordingly, the signal voltage at a reset level of the photoelectric conversion unit 101a output from the first amplifying transistor 106a to the pixel selection transistor 115a via the first inter-substrate connection portion 12a is selected and output to the second sample and hold transistor 215a via the pixel selection transistor 115a, the second inter-substrate connection portion 22, and the pixel selection transistor 212a.

Further, the vertical scanning circuit (not illustrated) sets the control signal φRST2 and the control signal φTX2 to an "H" level to cause the first clamping transistor 109a and the first clamping transistor 109b, and the first sample and hold transistor 108a and the first sample and hold transistor 108b to be in an ON state. Accordingly, each of the first charge accumulation unit 110a and the first charge accumulation unit 110b, and the first noise suppression element 113a and the first noise suppression element 113b are clamped. Further, the vertical scanning circuit (not illustrated) sets the control signal φSH3A to an "H" level to cause the second sample and hold transistor 215a to be in an ON state. Accordingly, the signal voltage at a reset level of the photoelectric conversion unit 101a is held in the second charge accumulation unit 220a.

Then, the vertical scanning circuit (not illustrated) sets the control signal φRST1 to an "L" level to release the reset of the node capacitance 120a and the node capacitance 120b. Subsequently, the vertical scanning circuit (not illustrated) sets the control signal φSH3A to an "L" level to cause the second sample and hold transistor 215a to be in an OFF state, and release the output of the signal voltage at a reset level of the photoelectric conversion unit 101a to the second charge accumulation unit 220a. Further, the vertical scanning circuit (not illustrated) sets the control signal φSH1A and the control signal φSH2A to an "L" level to cause the pixel selection transistor 115a and the pixel selection transistor 212a to be in an OFF state, and release the selection of the signal voltage at a reset level of the photoelectric conversion unit 101a.

Subsequently, at time 13, the vertical scanning circuit (not illustrated) sets the control signal φSH1B and the control signal φSH2B to an "H" level to cause the pixel selection transistor 115b and the pixel selection transistor 212b to be in an ON state. Accordingly, the signal voltage at a reset level of the photoelectric conversion unit 101b output from the first amplifying transistor 106b to the pixel selection transistor 115b via the first inter-substrate connection portion 12b is selected, and output to the second sample and hold transistor 215b via the pixel selection transistor 115b, the second inter-substrate connection portion 22, and the pixel selection transistor 212b. Further, the vertical scanning circuit (not illustrated) sets the control signal φSH3B to an "H" level to cause the second sample and hold transistor 215b to be in an ON state. Accordingly, the signal voltage at a reset level of the photoelectric conversion unit 101b is held in the second charge accumulation unit 220b.

Then, the vertical scanning circuit (not illustrated) sets the signal φSH3B to an "L" level to cause the second sample and hold transistor 215b to be in an OFF state, and release the output of the signal voltage at a reset level of the photoelectric conversion unit 101b to the second charge accumulation unit 220b. Further, the vertical scanning circuit (not illustrated) sets the control signal φSH1B and the control signal φSH2B to an "L" level to cause the pixel selection transistor 115b and the pixel selection transistor 212b to be in an OFF state, and release the selection of the signal voltage at a reset level of the photoelectric conversion unit 101b. Further, the vertical scanning circuit (not illustrated) sets the control signal φRST2 to an "L" level to release the clamp of the first charge accumulation unit 110a and the first charge accumulation unit 10b.

Subsequently, at time t4, the vertical scanning circuit (not illustrated) sets the control signal φTX1 to an "H" level to cause the charge transfer transistor 112a and the charge transfer transistor 112b to be in an ON state, and transfer the signal charges accumulated in the photoelectric conversion unit 1011a to the gate terminal of the first amplifying transistor 106a, and transfer the signal charges accumulated in the photoelectric conversion unit 101b to the gate terminal of the first amplifying transistor 106b. In this case, the signal charges transferred by the charge transfer transistor 112a are accumulated in the node capacitance 120a, and the signal charges transferred by the charge transfer transistor 112b are accumulated in the node capacitance 120b. Accordingly, a signal voltage (signal at an exposure level) according to the signal charges generated by the photoelectric conversion unit 101a, that is, the signal charges accumulated in the node capacitance 120a, is output from the first amplifying transistor 106a to the first noise suppression element 113a via the first inter-substrate connection portion 12a, and output to the pixel selection transistor 115a. Further, a signal voltage (signal at an exposure level) according to the signal charges generated by the photoelectric conversion unit 101b, that is, the signal charges accumulated in the node capacitance 120b, is output from the first amplifying transistor 106b to the first noise suppression element 113b via the first inter-substrate connection portion 12b, and output to the pixel selection transistor 115b.

The first noise suppression element 113a outputs a voltage of a difference between the signal voltage at a reset level and the signal voltage at an exposure level of the photoelectric conversion unit 101a, that is, a signal voltage subjected to the noise removal process. Further, similarly, the first noise suppression element 113b outputs a signal voltage subjected to the noise removal process of the photoelectric conversion unit 101b.

Then, the vertical scanning circuit (not illustrated) sets the control signal φTX1 to an "L" level to stop transfer to the gate terminal of the first amplifying transistor 106a of the signal charges accumulated in the photoelectric conversion unit 101a and transfer to the gate terminal of the first amplifying transistor 106b of the signal charges accumulated in the photoelectric conversion unit 101b.

Subsequently, at time t5, the vertical scanning circuit (not illustrated) sets the control signal φTX2 to an "L" level to stop sample and hold of the first charge accumulation unit 110a, and sample and hold of the first charge accumulation unit 110b. Accordingly, the first charge accumulation unit 110a holds the signal voltage subjected to the noise removal process output by the first noise suppression element 113a, and the first charge accumulation unit 110b holds the signal voltage subjected to the noise removal process output by the first noise suppression element 113b.

Up to this point, the signal charges generated by the photoelectric conversion unit 101a included in the pixel 100a are subjected to a noise removal process and held in the first charge accumulation unit 110a, and the signal charges generated by the photoelectric conversion unit 101b included in the pixel 100b are subjected to the noise removal process and held (accumulated) in the first charge accumulation unit 110b.

Subsequently, at time t6, the vertical scanning circuit (not illustrated) sets the control signal φSH1A and the control signal φSH2A to an "H" level to cause the pixel selection transistor 15a and the pixel selection transistor 212a to be in an ON state. Accordingly, the signal charges generated by the photoelectric conversion unit 101a, which is output from the first amplifying transistor 106a to the pixel selection transistor 115a via the first inter-substrate connection portion 12a, that is, the signal voltage (the signal at an exposure level) according to the signal charges accumulated in the node capacitance 120a is selected, and output to the second charge accumulation unit 221a via the pixel selection transistor 115a, the second inter-substrate connection portion 22, and the pixel selection transistor 212a. The second charge accumulation unit 221a holds the signal voltage according to the signal at an exposure level of the photoelectric conversion unit 101a.

Then, the vertical scanning circuit (not illustrated) sets the control signal φSH1A and the control signal φSH2A to an "L" level to cause the pixel selection transistor 115a and the pixel selection transistor 212a to be in an OFF state, and release the selection of the signal voltage according to the signal charges generated by the photoelectric conversion unit 101a.

Up to this point, the signal at a reset level and the signal at an exposure level of the photoelectric conversion unit 101a included in the pixel 100a are separately held (accumulated) in the second charge accumulation unit 220a and the second charge accumulation unit 221a. More specifically, the signal voltage according to the signal at a reset level of the photoelectric conversion unit 101a is held in the second charge accumulation unit 220a, and the signal voltage according to the signal at an exposure level is held (accumulated) in the second charge accumulation unit 221a.

Subsequently, at time t7, the vertical scanning circuit (not illustrated) sets the control signal φSH1B and the control signal φSH2B to an "H" level to cause the pixel selection transistor 115b and the pixel selection transistor 212b to be in an ON state. Accordingly, the signal charges generated by the photoelectric conversion unit 101b, Which is output from the first amplifying transistor 106b to the pixel selection transistor 115b via the first inter-substrate connection portion 12b, that is, the signal voltage (the signal at an exposure level) according to the signal charges accumulated in the node capacitance 120b, is selected, and output to the second charge accumulation unit 221b via the pixel selection transistor 115b, the second inter-substrate connection portion 22, and the pixel selection transistor 212b. The second charge accumulation unit 221b holds the signal voltage according to the signal at an exposure level of the photoelectric conversion unit 101b.

Then, the vertical scanning circuit (not illustrated) sets the control signal φSH1B and the control signal φSH2B to an "L" level to cause the pixel selection transistor 115b and the pixel selection transistor 212b to be in an OFF state, and release the selection of the signal voltage according to the signal charges generated by the photoelectric conversion unit 101b.

Up to this point, the signal at a reset level and the signal at an exposure level of the photoelectric conversion unit 101b included in the pixel 100b are separately held (accumulated) in the second charge accumulation unit 220b and the second charge accumulation unit 221b. More specifically, the signal voltage according to the signal at a reset level of the photoelectric conversion unit 101b is held in the second charge accumulation unit 220b, and the signal voltage according to the signal at an exposure level is held (accumulated) in the second charge accumulation unit 221b.

Subsequently, at time t8, the second charge accumulation circuit 104 performs a process of averaging the signal at a reset level held in the second charge accumulation unit 220a and the second charge accumulation unit 220b, and a process of averaging the signal at an exposure level held in the second charge accumulation unit 221a and the second charge accumulation unit 221b.

More specifically, at time t8, the vertical scanning circuit (not illustrated) sets the control signal φMix to an "H" level to cause the averaging switch transistor 214 to be in an ON state. Accordingly, the second charge accumulation unit 220a and the second charge accumulation unit 220b are short-circuited, and each of the second charge accumulation unit 220a and the second charge accumulation unit 220b holds an intermediate signal voltage between the respective signal voltages of the held signals at a reset level, that is, an averaged signal voltage. Accordingly, a process of averaging the signal voltage according to the signal at a reset level of the photoelectric conversion unit 101a held in the second charge accumulation unit 220a, and the signal voltage according to the signal at a reset level of the photoelectric conversion unit 10b held in the second charge accumulation unit 220b is performed.

Further, the vertical scanning circuit (not illustrated) sets the control signal φSH2A and the control signal φSH2B to an "H" level to cause the pixel selection transistor 212a and the pixel selection transistor 212b to be in an ON state. Accordingly, the second charge accumulation unit 221a and the second charge accumulation unit 221b are short-circuited, and each of the second charge accumulation unit 221a and the second charge accumulation unit 221b holds an intermediate signal voltage between the respective signal voltages of the held signals at an exposure level, that is, the averaged signal voltage. Accordingly, a process of averaging the signal voltage according to the signal at an exposure level of the photoelectric conversion unit 101a held in the second charge accumulation unit 221a, and the signal voltage according to the signal at an exposure level of the photoelectric conversion unit 101b held in the second charge accumulation unit 221b is performed.

Further, at time t8, the vertical scanning circuit (not illustrated) controls the control signal φBIAS to stop an operation as a load of the first amplifying transistor 106a or the first amplifying transistor 106b corresponding thereto, of each of the pixel load transistor 114a and the pixel load transistor 114b.

Then, the vertical scanning circuit (not illustrated) sequentially controls the control signal φSEL1A and the control signal φSEL1B to sequentially output the respective signal voltages subjected to the noise removal process held in the first charge accumulation unit 110a and the first charge accumulation unit 110b as pixel signals of the respective pixels to the first vertical signal line 19. Further, the vertical scanning circuit (not illustrated) controls the control signal φSEL2 to output the signal voltage according to the average signal at a reset level held in the second charge accumulation unit 220a and the second charge accumulation unit 220b as a pixel signal at a reset level of which the number of pixels is reduced to the second vertical signal line 29. Further, the vertical scanning circuit (not illustrated) controls the control signal φSH3A and the control signal φSH3B to transfer the signal voltage according to the averaged signal at an exposure level to the second charge accumulation unit 220a and the second charge accumulation unit 220b, and then output the signal voltage according to the averaged signal at an exposure level held in the second charge accumulation unit 220a and the second charge accumulation unit 220b as a pixel signal at an exposure level of which the number of pixels is reduced to the second vertical signal line 29.

Further, in the third configuration example of the solid-state imaging device 1 illustrated in FIG. 6, the vertical scanning circuit (not illustrated) may set the control signal φMix to an "L" level to release a short-circuit between the second charge accumulation unit 220a and the second charge accumulation unit 220b and then output the averaged signal voltage at a reset level and the averaged signal voltage at an exposure level held in the second charge accumulation unit 220a to the second vertical signal line 29 as the pixel signal (the reduced image signal) at a reset level and the pixel signal (the reduced image signal) at an exposure level in which the number of pixels is reduced. Further, in the third configuration example of the solid-state imaging device 1 illustrated in FIG. 6, the vertical scanning circuit (not illustrated) may set the control signal φMix to an "H" level and control the control signal φSEL2 and the control signal φSH3A before the averaged signal voltage is held in each of the second charge accumulation unit 220a and the second charge accumulation unit 220b. Accordingly, the signal voltage according to the signal at a reset level before averaging held in the second charge accumulation unit 220a or the signal voltage according to the signal at an exposure level held in the second charge accumulation unit 221a can be output to the second vertical signal line 29 as the pixel signal of the pixel 100a. That is, the pixel signal obtained by decimating the pixel 100b can be output to the second vertical signal line 29.

Further, in the third configuration example of the solid-state imaging device 1, an output order of the full-resolution image signal and the reduced image signal, or whether to output the respective pixel signals is not particularly defined, similar to the second configuration example of the solid-state imaging device 1. Therefore, detailed description of timings at which the vertical scanning circuit (not illustrated) controls the control signal φSEL1A, the control signal φSEL1B, the control signal φSEL2, the control signal φSH3A, and the control signal φSH3B so that the full-resolution image signal is output to the first vertical signal line 19 will be omitted. Further, detailed description of timings at which the vertical scanning circuit controls the control signal φSEL1A, the control signal φSEL1B, the control signal φSEL2, the control signal φSH3A, and the control signal φSH3B so that the reduced image signal is output to the second vertical signal line 29 will be omitted.

With these driving timings, in the third configuration example of the solid-state imaging device 1, the respective signal voltages according to the signal charges obtained by the two photoelectric conversion units (the photoelectric conversion unit 101a and the photoelectric conversion unit 101b) performing photoelectric conversion on incident light are read to the inter-substrate connection portions (the first inter-substrate connection portion 12a and the first inter-substrate connection portion 12b) corresponding to the two photoelectric conversion units. The signals after the noise removal process are held in the charge accumulation units (the first charge accumulation unit 110a and the first charge accumulation unit 110b) corresponding to the two respective photoelectric conversion units. Further, the signal at a reset level and the signal at an exposure level of the two photoelectric conversion units are separately selected by a multiplexer (the pixel selection transistor 115a and the pixel selection transistor 115b) and output to the second intersubstrate connection portion 22. The respective signal at a reset level and the signal at an exposure level of the two photoelectric conversion units are separately held in the charge accumulation unit (the second charge accumulation unit 220a, the second charge accumulation unit 220b, the second charge accumulation unit 221a, and the second charge accumulation unit 221b) corresponding to the two photoelectric conversion units by the demultiplexer (the pixel selection transistor 212a and the pixel selection transistor 212b). Thereafter, the signals held in the charge accumulation units (the second charge accumulation unit 220a and the second charge accumulation unit 220b) corresponding to the two photoelectric conversion units are separately averaged. In the solid-state imaging device 1, signal voltages according to the signals after the noise removal process accumulated in the respective charge accumulation units (the first charge accumulation unit 110a and the first charge accumulation unit 110b) are sequentially output to the first vertical signal line 19 as the full-resolution image signal, and the signal voltage according to the averaged signal at a reset level and the signal voltage according to the averaged signal at an exposure level are sequentially output to the second vertical signal line 29 as the reduced image signal.

Thus, in the third configuration example of the solid-state imaging device 1 of the embodiment, the signal charges of the photoelectric conversion unit 101a included in the pixel 100a are subjected to the noise removal process and held in the first charge accumulation unit 110a, and the signal charges of the photoelectric conversion unit 101b included in the pixel 100b are subjected to the noise removal process and held in the first charge accumulation unit 110b, similar to the solid-state imaging device 1 of the second configuration example. Further, in the third configuration example of the solid-state imaging device 1 of the embodiment, the signal voltage of the signal at a reset level of the photoelectric conversion unit 101a included in the pixel 100a is held in the second charge accumulation unit 220a, the signal voltage of the signal at a reset level of the photoelectric conversion unit 101b included in the pixel 100b is held in the second charge accumulation unit 220b, and then the respective signal charges are averaged and held in the second charge accumulation unit 220a and the second charge accumulation unit 220b. Further, in the third configuration example of the solid-state imaging device 1 of the embodiment, the signal voltage of the signal at an exposure level of the photoelectric conversion unit 101a included in the pixel 100a is held in the second charge accumulation unit 221a, the signal voltage of the signal at an exposure level of the photoelectric conversion unit 101b included in the pixel 100b is held in the second charge accumulation unit 221b, and then the respective signal charges are averaged and held in the second charge accumulation unit 221a and the second charge accumulation unit 221b. Accordingly, in the third configuration example of the solid-state imaging device 1 of the embodiment, both of the pixel signal (the full-resolution image signal) of all the pixels and the pixel signal (the reduced image signal) in which the number of pixels is reduced, that is, which is obtained by averaging (adding and averaging) the pixel signals of the respective pixels, can be output independently, similar to the solid-state imaging device 1 of the second configuration example. Therefore, in the third configuration example of the solid-state imaging device 1 of the embodiment, it is possible to obtain the same effects as those of the solid-state imaging device 1 of the first and second configuration examples. That is, an image having a smaller relative noise amount or a smaller moiré generation amount and better image quality can be generated from the pixel signal output in the third configuration example of the solid-state imaging device 1 of the embodiment. Further, in the third configuration example of the solid-state imaging device 1 of the embodiment, the full-resolution image and the reduced image can be generated in parallel.

Further, in the third configuration example of the solid-state imaging device 1 of the embodiment, the pixel signal at a reset level and the pixel signal at an exposure level obtained by averaging (adding and averaging) the pixel signals of the respective pixels are separately output. Therefore, in the imaging system on which the solid-state imaging device 1 of the third configuration example is mounted, the noise removal process can be performed in the imaging system on the basis of the averaged pixel signal at a reset level and the averaged pixel signal at an exposure level that are separately output, that is, the noise removal process can be performed as necessary outside the solid-state imaging device 1.

With this configuration, in the solid-state imaging device 1 of the embodiment, the respective pixels are exposed in the same exposure period, and in each pixel, the signal charges generated by the photoelectric conversion unit 101a are held in the first charge accumulation circuit 103a, the signal charges generated by the photoelectric conversion unit 101b are held in the first charge accumulation circuit 103b. Further, with this configuration, in the solid-state imaging device 1 of the embodiment, in each pixel, the signal charges (the signal charges in which the number of pixels is reduced) obtained by averaging the amounts of the respective signal charges are held in the second charge accumulation circuit 104. The solid-state imaging device 1 of the embodiment can separately output the pixel signals according to the signal charges held in the first charge accumulation circuit 103a and the first charge accumulation circuit 103b, and the pixel signal according to the signal charges held in the second charge accumulation circuit 104. That is, the solid-state imaging device 1 of the embodiment can separately and independently output the full-resolution image signal and the reduced image signal based on the signal charges obtained through the same single exposure.

The configuration of the solid-state imaging device 1 of the embodiment is not limited to the configuration shown in the first to third configuration examples, and may be a different configuration without departing from the spirit of the solid-state imaging device 1 of the embodiment.

In the first to third configuration examples of the solid-state imaging device 1 of the embodiment, the configuration in which the control signals input to the components corresponding to the pixel 100a and the pixel 100b are the same control signals between the pixel 100a and the pixel 100b, in addition to the control signal φSEL1A input to the first selection transistor 107a and the control signal φSEL1B input to the first selection transistor 107b has been described. A timing at which an operation of a global shutter function of simultaneously starting the exposures of the photoelectric conversion unit 101a included in the pixel 100a and the photoelectric conversion unit 101b included in the pixel 100b and simultaneously transferring the signal charges generated by the photoelectric conversion unit 101a and the photoelectric conversion unit 101b is performed at the driving timings of the first to third configuration examples of the solid-state imaging device 1 of the embodiment based on the above configuration has been described. However, the configuration or the driving timings of the solid-state imaging device 1 are not limited to the first to third configuration examples, and the control signals input to the respective components of the pixel 100a and the pixel 100b are different between the pixel 100a and the pixel 100b, such that the pixel 100a and the pixel 100b can be driven at different timings.

The solid-state imaging device 1 of the embodiment may be configured to include a circuit (an added charge accumulation circuit) that holds the added signal charges, in place of the second charge accumulation circuit 104 that holds the signal charges obtained by averaging the charge amounts of the respective signal charges generated by the photoelectric conversion unit 101a and the photoelectric conversion unit 101b included in each pixel, that is, the added and averaged signal charges as described above. That is, the solid-state imaging device 1 of the embodiment may be configured to hold the amount of signal charges obtained by adding the charge amounts of the signal charges generated by the photoelectric conversion unit 101a and the photoelectric conversion unit 101b, that is, the signal charges obtained by performing only the addition, using the added charge accumulation circuit.

In this case, a configuration in which the added charge accumulation circuit includes, for example, an amplifier circuit that adds two signal voltages and outputs a resultant signal, and this amplifier circuit adds respective signal voltages input from the first amplifying transistor 106a and the first amplifying transistor 106b via the corresponding inter-substrate connection portion can be considered. Accordingly, the solid-state imaging device 1 of the embodiment can be configured to hold the amount of the signal voltage obtained by adding the charge amounts of the respective signal charges generated by the photoelectric conversion unit 101a and the photoelectric conversion unit 101b.

Further, a configuration in which the added charge accumulation circuit includes, for example, an amplifier circuit that adds two signal voltages and outputs a resultant signal, and this amplifier circuit adds respective signal voltages subjected to the noise removal process held in the second charge accumulation unit 210a and the second charge accumulation unit 210b can be considered. Accordingly, the solid-state imaging device 1 of the embodiment can be configured to output the signal voltage according to the amount of signal charges obtained by adding charge amounts of the respective signal charges generated by the photoelectric conversion unit 101a and the photoelectric conversion unit 101b.

As described above, the solid-state imaging device 1 of the embodiment may be configured to include both of the second charge accumulation circuit 104 and the added charge accumulation circuit and hold, for example, both of signal charges obtained by adding and averaging the signal charges generated by the photoelectric conversion unit 101a and the photoelectric conversion unit 101b and signal charges obtained by adding the respective signal charges.

In the first to third configuration examples of the solid-state imaging device 1 of the embodiment, the configuration of the multilayer substrate including three substrates including the photoelectric conversion substrate 11, the first readout substrate 21, and the second readout substrate 31 has been described based on a minimal configuration of the solid-state imaging device 1 illustrated in FIG. 1. However, the configuration of the solid-state imaging device 1 is not limited to the configuration of the solid-state imaging device 1 of the embodiment. For example, the configuration may be a configuration in which signal charges obtained by averaging the signal charges corresponding to the pixel 100a and the pixel 100b held in the second charge accumulation circuit 104 are further averaged. For example, in the second charge accumulation circuit 104, the number of pixels is reduced in one stage, but it may be reduced in more stages. In this case, the solid-state imaging device 1 of the embodiment can be considered to be more multilayered. In the solid-state imaging device 1 of the embodiment, the number of stages in which the number of pixels is reduced is not particularly defined.

Figure 8:
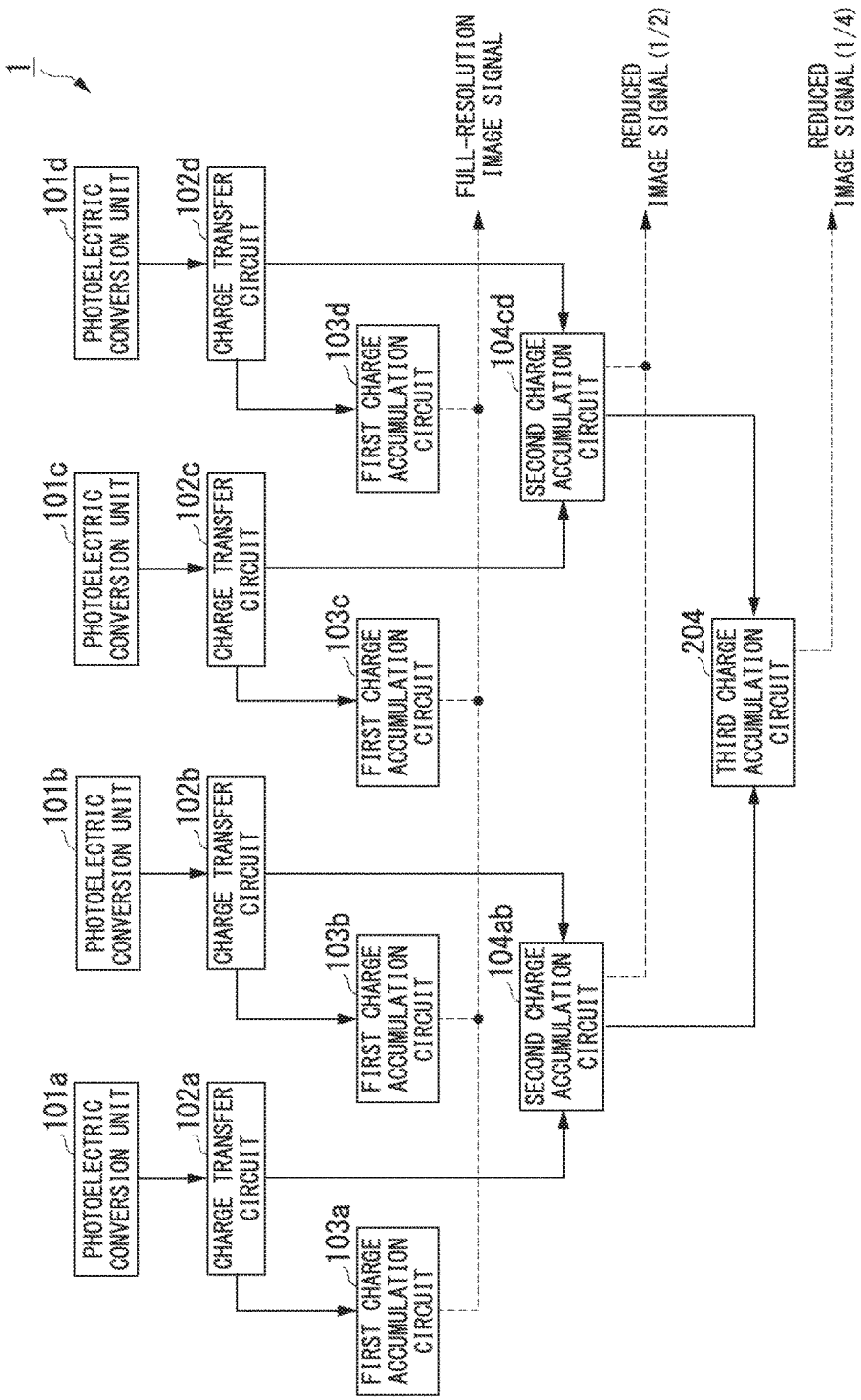
FIG. 8 is a block diagram illustrating a schematic configuration of a modification example of the solid-state imaging device of the embodiment of the present invention.

Here, a configuration example in which the number of pixels is reduced in one or more additional stages in the solid-state imaging device 1 of the embodiment in comparison with the solid-state imaging device 1 illustrated in FIG. 1 will be described. FIG. 8 is a block diagram illustrating a schematic configuration of a modification example of the solid-state imaging device 1 of the embodiment of the present invention. In the modification example of the solid-state imaging device 1 illustrated in FIG. 8, a case in which four pixels including the pixel 100a to 100d are arranged in the solid-state imaging device 1 is shown. In the solid-state imaging device 1 illustrated in FIG. 8, components such as a scanning circuit such as the vertical scanning circuit or the horizontal scanning circuit that drives components of each pixel according to control of the control device included in the imaging system on which the solid-state imaging device 1 is mounted, and an output amplifier for outputting a pixel signal to the outside of the solid-state imaging device 1 are omitted.

In the following description, a reference sign "a," "b," "c," or "d" indicating a corresponding pixel is added after the reference sign of each component in order to distinguish between the components corresponding to the respective pixels, that is, between the pixel 100a to 100d. More specifically, "a" is added after the reference sign of a component corresponding to the pixel 100a, "b" is added after the reference sign of a component corresponding to the pixel 100b "c" is added after the reference sign of a component corresponding to the pixel 100c, and "d" is added after the reference sign of a component corresponding to the pixel 100d. Further, reference signs "a" to "d" are not added to common components corresponding to the pixel 100a to 100d. Further, in the component corresponding to any one of the pixel 100a to 100d, when corresponding pixels at the time of description are not distinguished, the reference signs of the respective components are shown without the reference signs "a" to "d."

The solid-state imaging device 1 illustrated in FIG. 8 includes four photoelectric conversion unit 101a to 101d, four charge transfer circuit 102a to 102d, four first charge accumulation circuit 103a to 103d, and three charge accumulation circuit including a second charge accumulation circuit 104ab, a second charge accumulation circuit 104cd, and a third charge accumulation circuit 204.

The photoelectric conversion unit 101a to 101d, the charge transfer circuit 102a to 102d, and the first charge accumulation circuit 103a to 103d are the same components as the photoelectric conversion unit 101a and the photoelectric conversion unit 101b, the charge transfer circuit 102a and the charge transfer circuit 102b, and the first charge accumulation circuit 103a and the first charge accumulation circuit 103b of the solid-state imaging device 1 illustrated in FIG. 1. Therefore, detailed description of each of the components will be omitted.

Each of the second charge accumulation circuit 104ab and the second charge accumulation circuit 104cd is a circuit (averaged charge accumulation circuit) that holds (accumulates) the signal charges obtained by averaging the charge amounts of the respective signal charges generated by the corresponding photoelectric conversion unit 101, which are transferred by the two corresponding charge transfer circuit 102, similar to the second charge accumulation circuit 104 of the solid-state imaging device 1 illustrated in FIG. 1. In the solid-state imaging device 1 illustrated in FIG. 8, the second charge accumulation circuit 104ab corresponds to the charge transfer circuit 102a and the charge transfer circuit 102b, that is, the photoelectric conversion unit 101a and the photoelectric conversion unit 101b. In the solid-state imaging device 1 illustrated in FIG. 8, the second charge accumulation circuit 104cd corresponds to the charge transfer circuit 102c and the charge transfer circuit 102d, that is, the photoelectric conversion unit 101c and the photoelectric conversion unit 101d.

Further, each of the second charge accumulation circuit 104ab and the second charge accumulation circuit 104cd transfers the averaged signal charges in the third charge accumulation circuit 204. That is, each of the second charge accumulation circuit 104ab and the second charge accumulation circuit 104cd has the same function as the charge transfer circuit 102a or the charge transfer circuit 102b. More specifically, each of the second charge accumulation circuit 104ab and the second charge accumulation circuit 104cd has a function of transferring the held averaged signal charges to the third charge accumulation circuit 204 instead of the accumulated signal charges generated by the corresponding photoelectric conversion unit 101, which the charge transfer circuit 102 transfers to the first charge accumulation circuit 103 and the second charge accumulation circuit 104. The signal charges that each of the second charge accumulation circuit 104ab and the second charge accumulation circuit 104cd transfers to the third charge accumulation circuit 204 may not be the averaged signal charges, but may be respective signal charges generated by the corresponding photoelectric conversion unit 101, which are transferred from the two corresponding charge transfer circuit 102.

The third charge accumulation circuit 204 is a circuit (averaged charge accumulation circuit) that holds (accumulates) the signal charges obtained by averaging the charge amounts of the respective signal charges input from the second charge accumulation circuit 104ab and the second charge accumulation circuit 104cd. That is, the third charge accumulation circuit 204 is a circuit that holds the signal charges which are in a state in which the number of pixels of the solid-state imaging device 1 is reduced, similar to the second charge accumulation circuit 104 of the solid-state imaging device 1 illustrated in FIG. 1, or the second charge accumulation circuit 104ab and the second charge accumulation circuit 104cd. However, the third charge accumulation circuit 204 holds the signal charges that are in a state in which the number of pixels is reduced after each of the second charge accumulation circuit 104ab and the second charge accumulation circuit 104cd reduces the number of pixels of the solid-state imaging device 1. Further, the third charge accumulation circuit 204 is a circuit that outputs the signal voltage according to the held signal charges that are in a state in which the number of pixels is reduced, as a pixel signal.

The configuration of the third charge accumulation circuit 204 is configured using the same concept as in the second charge accumulation circuit 104 shown in the first to third configuration examples of the solid-state imaging device 1 of the embodiment. That is, a configuration including a third charge accumulation unit corresponding to the second charge accumulation unit (the second charge accumulation unit 210, the second charge accumulation unit 210a, the second charge accumulation unit 210b, the second charge accumulation unit 220a and the second charge accumulation unit 221a, or the second charge accumulation unit 220b and the second charge accumulation unit 221b) included in the second charge accumulation circuit 104 in the first to third configuration examples is considered.

According to the embodiment, the solid-state imaging device 1 in which a plurality of third charge accumulation circuits (the third charge accumulation circuit 204) that hold the signal charges based on the signal charges held in the plurality of second charge accumulation circuits (the second charge accumulation circuit 104ab and the second charge accumulation circuit 104cd) and output the signal voltage according to the held signal charges as third pixel signals in which the number of pixels is further reduced to the predetermined number (pixel signals in which the number of pixels is further reduced) are further included is configured.

Further, according to the embodiment, the solid-state imaging device 1 in which the third charge accumulation circuit 204 holds the amount of signal charges obtained by adding or averaging the respective signal charges held in the plurality of the second charge accumulation circuit 104ab and the second charge accumulation circuit 104cd corresponding thereto is configured.

Further, according to the embodiment, the solid-state imaging device 1 including the photoelectric conversion substrate (the photoelectric conversion substrate 11) on which a plurality of photoelectric conversion units (the photoelectric conversion unit 101) are arranged, the first substrate (the first readout substrate 21) on which one of the plurality of first charge accumulation circuit (the first charge accumulation circuit 103a to the first charge accumulation circuit 103d) and the plurality of second charge accumulation circuit (the second charge accumulation circuit 104ab and the second charge accumulation circuit 104cd) are arranged, the second substrate (the second readout substrate 31) on which the other of the plurality of first charge accumulation circuit (the first charge accumulation circuit 103a to the first charge accumulation circuit 103b) and the plurality of second charge accumulation circuit (the second charge accumulation circuit 104ab and the second charge accumulation circuit 104cd) are arranged, a third substrate on which a plurality of the third charge accumulation circuit 204 are arranged, the first connection portion (the first inter-substrate connection portion 12) that electrically connects the photoelectric conversion substrate 11 to the first substrate 21, the second connection portion (the second inter-substrate connection portion 22) that electrically connects the first substrate 21 to the second substrate 31, and a third connection portion (inter-substrate connection portion) that electrically connects the second readout substrate 31 and the third substrate is included is configured.

Further, according to the embodiment, the solid-state imaging device 1 in which the third connection portion is arranged between the second readout substrate 31 and the third substrate, corresponds to each of the third charge accumulation circuit 204 arranged on the third substrate, and electrically connects, between the second readout substrate 31 and the third substrate, the signal lines of the respective signal charges transferred from the second charge accumulation circuits (the second charge accumulation circuit 104ab and the second charge accumulation circuit 104cd) arranged on the second readout substrate 31 to the corresponding third charge accumulation circuit 204 arranged on the third substrate is configured.

With this configuration, in the solid-state imaging device 1 illustrated in FIG. 8, the respective pixels are exposed in the same exposure period, and the signal charges generated by the photoelectric conversion unit 101 are held in the first charge accumulation circuit 103 in each pixel. Further, with this configuration, in the solid-state imaging device 1 illustrated in FIG. 8, in each pixel, the signal charges obtained by averaging the respective signal charges (the signal charges obtained by reducing the number of pixels) are held in the second charge accumulation circuit 104, and signal charges obtained by further averaging the respective averaged signal charges (signal charges obtained by further reducing the number of pixels) are held in the third charge accumulation circuit 204. In the solid-state imaging device 1 illustrated in FIG. 8, each pixel signal according to the signal charges held in the first charge accumulation circuit 103, the pixel signal according to the signal charges held in the second charge accumulation circuit 104, and the pixel signal according to the signal charges held in the third charge accumulation circuit 204 can be separately output. That is, in the solid-state imaging device 1 illustrated in FIG. 8, the pixel signals of all the pixels, the pixel signal in which the number of pixels is reduced, and the pixel signal in which the number of pixels is further reduced can be separately output on the basis of the signal charges obtained through the same single exposure. More specifically, as illustrated in FIG. 8, the pixel signal of all the pixels (the full-resolution image signal), the pixel signal in which the number of pixels is reduced to ½ (the reduced image signal (½)), and the pixel signal in which the number of pixels is reduced to ¼ (the reduced image signal (¼)) can be separately output.

In the solid-state imaging device 1 illustrated in FIG. 8, the configuration in which signal charges obtained by averaging the charge amounts of the respective signal charges generated by the photoelectric conversion unit 101 included in the two corresponding pixels is held in the second charge accumulation circuit 104, and signal charges obtained by averaging the charge amounts of the respective signal charges generated by the photoelectric conversion unit 101 included in the respective pixels are held in the third charge accumulation circuit 204 is shown. However, the configuration of the solid-state imaging device 1 of the embodiment is not limited to the configuration illustrated in FIG. 8. For example, the solid-state imaging device 1 may be configured so that the third charge accumulation circuit 204 holds the amount of signal charges obtained by adding the charge amounts of the respective signal charges generated by the photoelectric conversion unit 101 included in the respective pixels. In this case, the solid-state imaging device 1 illustrated in FIG. 8 may be configured to include a circuit (added charge accumulation circuit) that holds the signal charges that are in a state in which the level of the signal charges rises while the number of pixels is reduced by adding the signal charges of the respective pixels included in the solid-state imaging device 1, instead of the third charge accumulation circuit 204. Further, for example, the solid-state imaging device 1 may be configured to hold both of the signal charges obtained by averaging the charge amounts of the respective signal charges generated by the photoelectric conversion unit 101 and signal charges of the amount obtained by adding the charge amounts of the respective signal charges.

In the solid-state imaging device 1 of the embodiment, two predetermined pixels are configured as one set, and the signal charges obtained by averaging charge amounts of the respective signal charges generated by the photoelectric conversion unit 101 included in the respective pixel are held is illustrated in FIGS. 1 and 8. However, in an actual solid-state imaging device, for example, color filters in a Bayer array are affixed, and each of the photoelectric conversion unit 101 performs photoelectric conversion on color corresponding to the affixed color filters included in the incident light to generate signal charges. Therefore, in the solid-state imaging device 1 of the embodiment, it is preferable to form a set of pixels so that a center of gravity of the color of the affixed color filters is not displaced and so that signal charges of different colors are not averaged or added.

Figure 9A:
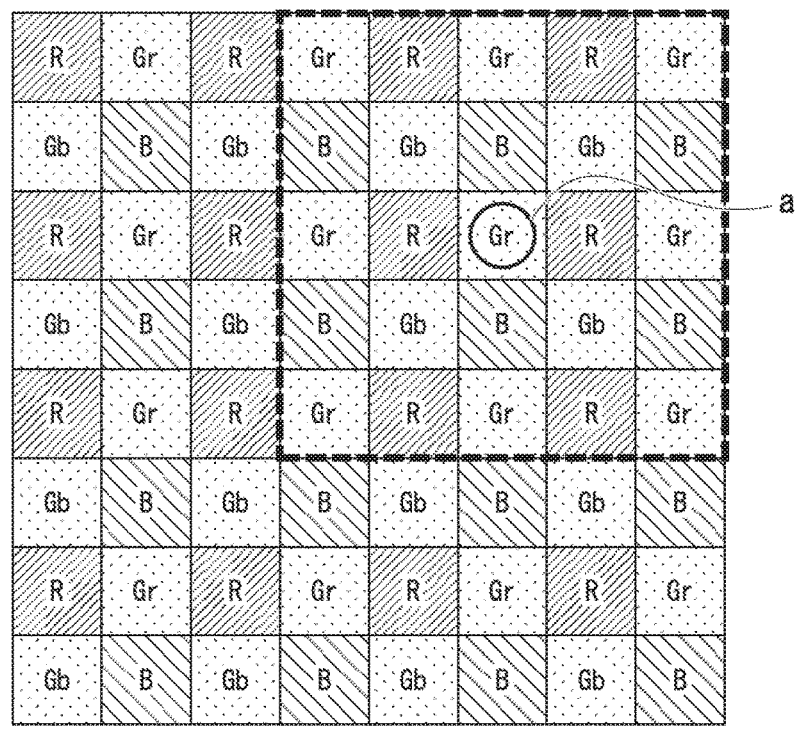
FIG. 9A is a diagram illustrating an example of an arrangement of a pixel array of the solid-state imaging device of the embodiment of the present invention.
Figure 9B:
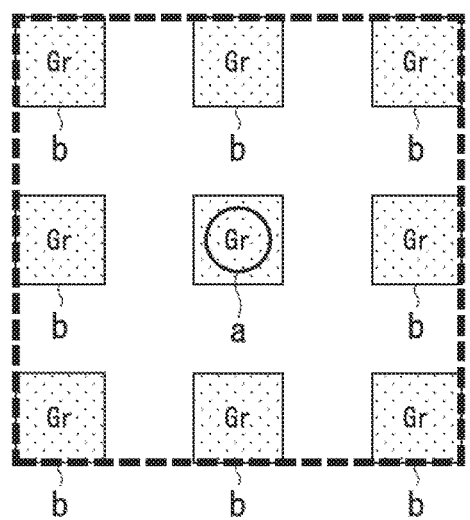
FIG. 9B is a diagram illustrating an example of an arrangement of a pixel array of the solid-state imaging device of the embodiment of the present invention.

An example of the arrangement of pixels configured as one set, in the solid-state imaging device 1 of the embodiment will be described. FIGS. 9A and 9B are diagrams illustrating an example of the arrangement of the pixel array of the solid-state imaging device 1 of the embodiment of the present invention. FIGS. 9A and 9B illustrate an example of a case in which color filters in a Bayer array are affixed to the solid-state imaging device 1.

As described above, when the color filters are affixed to the solid-state imaging device 1, it is preferable for the set of pixels in the solid-state imaging device 1 to be configured so that the center of gravity is not displaced between the same colors. FIG. 9B illustrates a case in which a Gr pixel 100a arranged in a third row and a sixth column in FIG. 9A is set as the center of gravity, and eight Gr pixel 100b of the same color arranged in a range of five rows and five columns around the Gr pixel 100a are configured as one set, that is, nine pixels are configured as one set.

By forming the set of pixels as illustrated in FIG. 9B, in the solid-state imaging device 1 having the configuration illustrated in FIG. 1, the pixel signal in which the number of pixels included in the pixel array is reduced to ⅓ in a row direction and ⅓ in a column direction, that is, the total number of pixels included in the pixel array is reduced to ⅑, can be output by the second charge accumulation circuit 104. Further, similarly, in the solid-state imaging device 1 having the configuration illustrated in FIG. 8, a pixel signal in which signal charges in which the total number of pixels reduced to ⅑ by the second charge accumulation circuit 104 is reduced to ⅓ in a row direction and ⅓ in a column direction, that is, the total number of pixels included in the pixel array is reduced to ¹⁄₈₁, can be output by the third charge accumulation circuit 204. It is possible to perform various processes in the imaging system by mounting the solid-state imaging device 1 of the embodiment on the imaging system.

The arrangement of the pixels as sets in the solid-state imaging device 1 of the embodiment is not limited to the example illustrated in FIGS. 9A and 9B. For example, pixels of the same color arranged in a range of 9 rows and 9 columns around a pixel serving as a center of gravity is a set. In this case, the signal charges in which the number of pixels included in the pixel array is reduced to ⅕ in a row direction and ⅕ in a column direction, that is, the total number of pixels included in the pixel array is reduced to ¹⁄₂₅, can be held in the second charge accumulation circuit 104.

In the solid-state imaging device 1 of the embodiment to which color filters are affixed, a multilayer substrate structure may be considered to be advantageous as compared to a monolithic structure. This is because an area in the solid-state imaging device 1 required by the second charge accumulation circuit 104 or the third charge accumulation circuit 204 for holding the reduced signal charges, a charge accumulation circuit that holds the signal charges in which the next stage is reduced, or the like is considered to increase according to an increase in the number of stages in which the number of pixels is reduced in the solid-state imaging device 1 of the embodiment. However, a monolithic structure and a multilayer substrate structure can be combined if necessary. For example, the first readout substrate 21 on which the first charge accumulation circuit 103 is formed, and the second readout substrate 31 on which the second charge accumulation circuit 104 is formed have a monolithic structure.

According to the embodiment, the solid-state imaging device 1 including the photoelectric conversion substrate (the photoelectric conversion substrate 11) on which a plurality of the photoelectric conversion unit 101a and the photoelectric conversion unit 101b are arranged, the first substrate (the first readout substrate 21) on which a plurality of the first charge accumulation circuit 103a, a plurality of the first charge accumulation circuit 103b, and a plurality of the second charge accumulation circuit 104 are arranged, and the first connection portion (the first inter-substrate connection portion 12a or the first inter-substrate connection portion 12b) that electrically connects the photoelectric conversion substrate 11 to the first readout substrate 21 is configured.

Further, according to the embodiment, the solid-state imaging device 1 in which the first inter-substrate connection portion 12a or the first inter-substrate connection portion 12b is arranged between the photoelectric conversion substrate 11 and the first readout substrate 21, corresponds to at least one of the first charge accumulation circuit 103a and the first charge accumulation circuit 103b, and the second charge accumulation circuit 104 arranged on the first readout substrate 21, and electrically connects, between the photoelectric conversion substrate 11 and the first readout substrate 21, respective signal lines of the signal charges transferred from each photoelectric conversion unit (the photoelectric conversion unit 101a or the photoelectric conversion unit 101b) arranged on the photoelectric conversion substrate 11 to at least one of the first charge accumulation circuit 103a and the first charge accumulation circuit 103b, and the second charge accumulation circuit 104 corresponding thereto arranged on the first readout substrate 21 is configured.

Further, according to the embodiment, the solid-state imaging device 1 including the photoelectric conversion substrate (the photoelectric conversion substrate 11) on which a plurality of photoelectric conversion units (the photoelectric conversion unit 101) are arranged, the first substrate (the first readout substrate 21) on which a plurality of first charge accumulation circuits (the first charge accumulation circuit 103a to the first charge accumulation circuit 103d), a plurality of second charge accumulation circuits (the second charge accumulation circuit 104ab and the second charge accumulation circuit 104cd), and a plurality of third charge accumulation circuit 204 are arranged, and the first connection portion (the first inter-substrate connection portion 12) that electrically connects the photoelectric conversion substrate 11 to the first readout substrate 21 is configured.

Next, an imaging system on which the solid-state imaging device 1 of the embodiment is mounted will be described. In the following description, the solid-state imaging device 1 mounted on the imaging system is the solid-state imaging device 1 having the configuration illustrated in FIG. 8 to which a color filter as illustrated in FIG. 9A is affixed. That is, the solid-state imaging device 1 mounted on the imaging system is the solid-state imaging device 1 in which a pixel signal of the total number of the pixels included in the pixel array (hereinafter referred to as a "full-resolution image signal"), the pixel signal in which the number of pixels is reduced to $1/9$ (hereinafter referred to as a "$1/9$ reduced image signal,") and the pixel signal in which the number of pixels is reduced to $1/81$ (hereinafter referred to as a "$1/81$ reduced image signal") are output separately.

As described above, in the solid-state imaging device 1 of the embodiment, each of the full-resolution image signal and reduced image signal can be output separately and independently through the same single exposure. Therefore, in the imaging system on which the solid-state imaging device 1 is mounted, the generation of the full-resolution image based on the full-resolution image signal and the generation of the reduced image based on the reduced image signal can be performed in parallel. In this case, for example, even when the output of the full-resolution image signal and the output of the reduced image signal start at the same time, the generation of the reduced image can be completed faster than the generation of full-resolution images since the output of the reduced image signal in which the number of pixels is reduced is completed faster than the output of the full-resolution image signal in which the number of pixels is not reduced.

More specifically, if frequencies of clocks for reading respective pixel signals from the solid-state imaging device 1 are the same frequencies, reading of the $1/9$ reduced image signal is completed in $1/9$ of the time required to read the full-resolution image signal, and reading of the $1/81$ reduced image signal is completed in $1/81$ of the time required to read the full-resolution image signal. The reading of the $1/81$ reduced image signal is completed in $1/9$ of the time to read the $1/9$ reduced image signal. Therefore, the reduced image (hereinafter referred to as a "$1/9$ reduced image") generated based on the $1/9$ reduced image signal can be generated nine times as fast as the full-resolution image generated based on the full-resolution image signal, and the reduced image (hereinafter referred to as a "$1/81$ reduced image") generated based on the $1/81$ reduced image signal can be generated 81 times as fast as the full-resolution image generated based on the full-resolution image signal. In other words, the frame rate of the $1/9$ reduced image is nine times as high as the frame rate of the full-resolution image, and the frame rate of the $1/81$ reduced images is 81 times as high as the frame rate of the full-resolution image.

In the imaging system on which the solid-state imaging device 1 of the embodiment is mounted, it is possible to rapidly acquire information necessary for, for example, analog processing performed on the full-resolution image signal output by the solid-state imaging device 1, such as confirmation of the dynamic range, and adjustment of an analog gain for the image signal or adjustment of a bias level, that is, analog front-end processing, using the fact that the reduced image signal can be rapidly read. Further, in the imaging system on which the solid-state imaging device 1 of the embodiment is mounted, it is possible to rapidly acquire information necessary for, for example, digital processing (image signal processing) when the full-resolution image is generated based on the full-resolution image signal output by the solid-state imaging device 1, such as AE processing, AWB processing, or flicker correction of a fluorescent lamp using the fact that the reduced image can be rapidly generated by rapidly reading the reduced image signal. Further, in the imaging system on which the solid-state imaging device 1 of the embodiment is mounted, it is possible to execute, in parallel, the display of a live view image and a process requiring high-speed processing (hereinafter referred to as a "tracking process") such as AF or subject tracking, using the fact that the plurality of reduced image signals obtained through the same exposure can be output separately and independently.

First System Example

Figure 10:
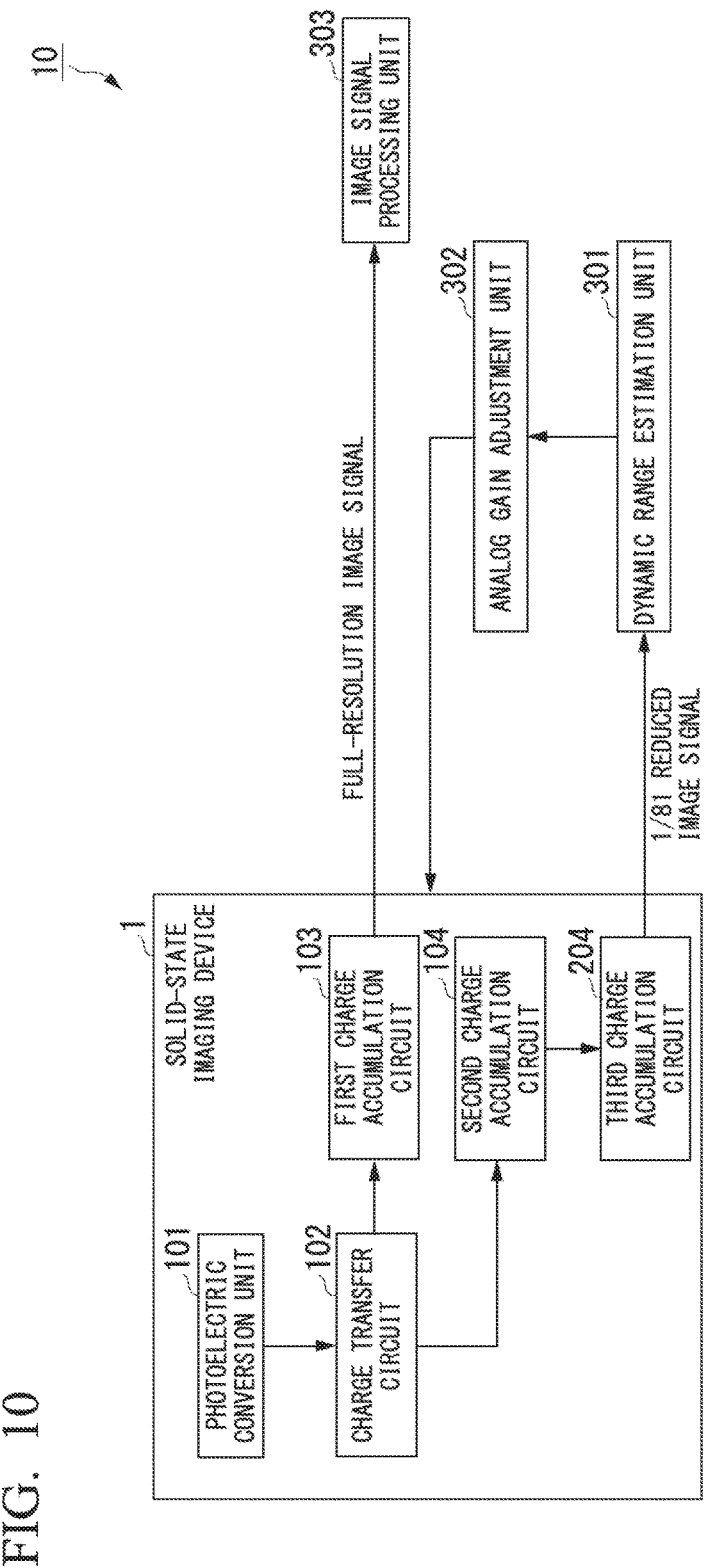
FIG. 10 is a block diagram illustrating a first system example of the imaging system on which the solid-state imaging device of the embodiment of the present invention is mounted.

FIG. 10 is a block diagram illustrating a first system example of the imaging system on which the solid-state imaging device 1 of the embodiment of the present invention is mounted. The first system example of the imaging system is a configuration example of the imaging system that first reads the 1/81 reduced image signal from the solid-state imaging device 1 and performs adjustment of the full-resolution image signal based on the read 1/81 reduced image signal. The imaging system 10 illustrated in FIG. 10 includes the solid-state imaging device 1, a dynamic range estimation unit 301, an analog gain adjustment unit 302, and an image signal processing unit 303. In FIG. 10, the photoelectric conversion unit 101 that performs photoelectric conversion, the charge transfer circuit 102 that transfers signal charges, the first charge accumulation circuit 103 that outputs the full-resolution image signal, the second charge accumulation circuit 104 that outputs the 1/9 reduced image signal, and the third charge accumulation circuit 204 that outputs the 1/81 reduced image signal, which are included in the solid-state imaging device 1, are also illustrated.

The dynamic range estimation unit 301 reads the 1/81 reduced image signal from the third charge accumulation circuit 204 included in the solid-state imaging device 1, and estimates an entire luminance distribution (dynamic range) in the full resolution image signal obtained through the same exposure based on the read 1/81 reduced image signal. The dynamic range estimation unit 301 outputs information on the estimated dynamic range to the analog gain adjustment unit 302.

The dynamic range estimation unit 301 may read the 1/9 reduced image signal from the second charge accumulation circuit 104 included in the solid-state imaging device 1 and estimate the dynamic range.

The analog gain adjustment unit 302 determines an adjustment value for an analog gain to be multiplied (adjusted) to the full-resolution image signal (analog signal) obtained through the same exposure based on the information on the dynamic range input from the dynamic range estimation unit 301, and outputs information on the determined analog gain adjustment value to the solid-state imaging device 1. Accordingly, in the solid-state imaging device 1, for example, the first charge accumulation circuit 103 adjusts the analog gain of each pixel signal based on the input information on the analog gain adjustment value and outputs the full-resolution image signal of which the analog gain has been adjusted.

The image signal processing unit 303 reads the full-resolution image signal after the analog gain is adjusted from the first charge accumulation circuit 103 included in the solid-state imaging device 1 and performs various types of predetermined image signal processing on the read full-resolution image signal.

Figure 11:
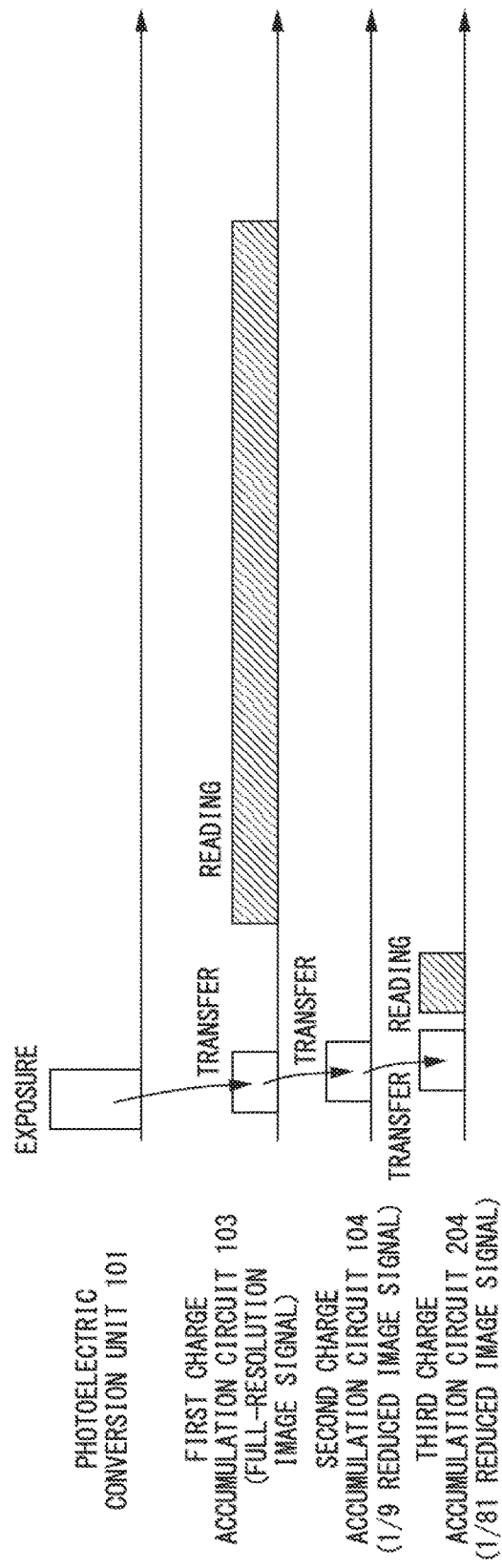
FIG. 11 is a timing chart illustrating a readout sequence of the pixel signals of the imaging system of the first system example on which the solid-state imaging device of the embodiment of the present invention is mounted.

Here, a timing when each pixel signal is read from the solid-state imaging device 1 in the first system example of the imaging system will be described. FIG. 11 is a timing chart illustrating a readout sequence of the pixel signals of the imaging system of the first system example on which the solid-state imaging device 1 of the embodiment of the present invention is mounted.

The imaging system 10 causes the charge transfer circuit 102 to transfer the signal charges exposed by the photoelectric conversion unit 101 to the first charge accumulation circuit 103 and to the second charge accumulation circuit 104, as illustrated in FIG. 11, using a control device (not illustrated) that controls the solid-state imaging device 1. The imaging system 10 causes the second charge accumulation circuit 104 to transfer the averaged signal charges to the third charge accumulation circuit 204.

Thereafter, the imaging system 10 first reads the 1/81 reduced image signal from the third charge accumulation circuit 204. In the imaging system 10, the process in the dynamic range estimation unit 301 and the analog gain adjustment unit 302 is completed, that is, the analog gain adjustment value for adjusting the full-resolution image signal is determined, and then the full-resolution image signal is read from the first charge accumulation circuit 103.

Further, as can be seen from the timing chart of FIG. 11, reading of the 1/9 reduced image signal from the second charge accumulation circuit 104 is not performed. This is because the process using the 1/9 reduced image signal is not performed in the process of the imaging system 10. Thus, in the solid-state imaging device 1, only the pixel signal used for the process may be read. Further, if the configuration of the solid-state imaging device 1 is a configuration capable of reading the 1/81 reduced image signal from the third charge accumulation circuit 204 even when the signal charges are not transferred to the second charge accumulation circuit 104, the transfer of signal charges to the second charge accumulation circuit 104 shown in the timing chart of FIG. 11 may not be performed.

According to the first system example, the imaging system (the imaging system 10) including the solid-state imaging device 1, the first reading unit (the image signal processing unit 303) that reads the first pixel signal (full-resolution image signal) from the first charge accumulation circuit 103a and the first charge accumulation circuit 103b included in the solid-state imaging device 1, and the second reading unit (the dynamic range estimation unit 301) that reads the second pixel signal (reduced image signal) from the second charge accumulation circuit 104 included in the solid-state imaging device 1 is configured.

Further, according to the first system example, the imaging system 10 in which performs reading of the reduced image signal in which the number of pixels is reduced by the dynamic range estimation unit 301 prior to the reading of the full-resolution image signal by the image signal processing unit 303 is configured.

Further, according to the first system example, the imaging system 10 in which performs reading of the second pixel signal (1/9 reduced image signal) in which the number of pixels is reduced by the second reading unit (for example, the dynamic range estimation unit 301) or reading of the third pixel signal (1/81 reduced image signal) in which the number of pixels is further reduced by the third reading unit (the dynamic range estimation unit 301), prior to reading of the full-resolution image signal by the image signal processing unit 303 is configured.

Thus, in the imaging system 10 of the first system example on which the solid-state imaging device 1 of the embodiment is mounted, it is possible to estimate the dynamic range and rapidly determine the analog gain adjustment value before the full-resolution image signal of the same exposure is read, by first reading the 1/81 reduced image signals. In the related art, since the dynamic range is estimated based on a pixel signal acquired through the exposure performed before the exposure for acquiring the full-resolution image signal, that is, a pixel signal of a previous frame, it is difficult to cope with an instantaneous change in luminance or illumination. On the other hand, in the imaging system 10 of the first system example on which the solid-state imaging device 1 of the embodiment is mounted, since the dynamic range is estimated based on the reduced image signal obtained through the same exposure, it is possible to cope with the instantaneous change in luminance or illumination. Further, in the imaging system 10 of the first system example on which the solid-state imaging device 1 of the embodiment is mounted, since the dynamic range is estimated based on the reduced image signal obtained through the same exposure, it is possible to determine the analog gain adjustment value as a value more suitable for the full-resolution image in comparison with an analog gain adjustment value according to the related art.

Bias level correction for adjusting a level of the full-resolution image signal to be read may be performed in a process of an analog stage by applying the same concept. That is, in the imaging system 10 of the first system example on which the solid-state imaging device 1 of the embodiment is mounted, information necessary for various types of analog processing may be rapidly acquired, in addition to the determination of the analog gain adjustment value described above, by first reading the 1/81 reduced image signals.

Second System Example

Figure 12:
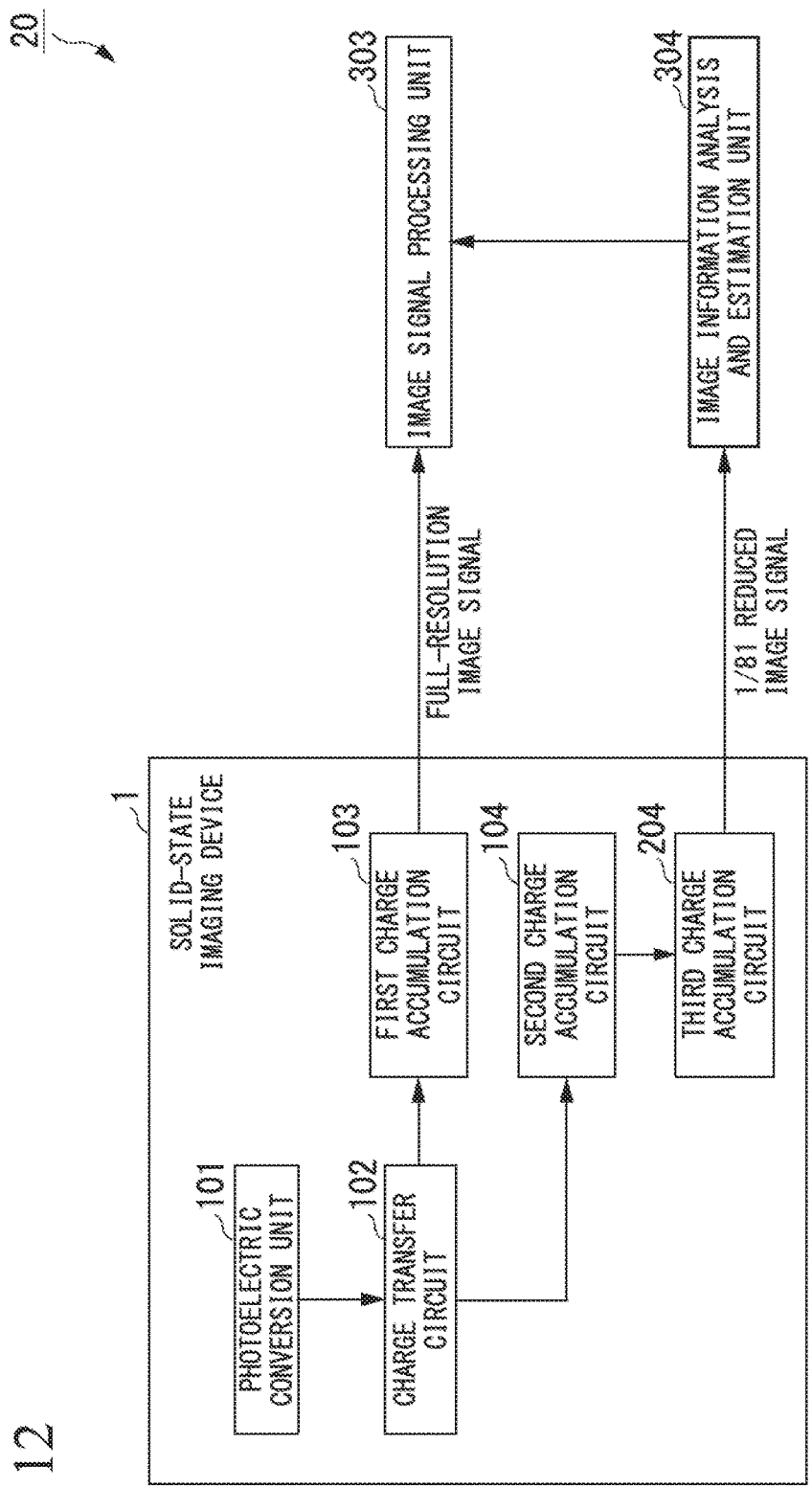
FIG. 12 is a block diagram illustrating a second system example of the imaging system on which the solid-state imaging device of the embodiment of the present invention is mounted.

FIG. 12 is a block diagram illustrating a second system example of the imaging system on which the solid-state imaging device 1 of the embodiment of the present invention is mounted. The second system example of the imaging system is a configuration example of the imaging system that performs image signal processing that is performed on the full-resolution image signal based on the 1/81 reduced image generated by first reading the 1/81 reduced image signal from the solid-state imaging device 1. The imaging system 20 illustrated in FIG. 12 includes the solid-state imaging device 1, an image information analysis and estimation unit 304, and the image signal processing unit 303. In FIG. 12, the photoelectric conversion unit 101 that performs photoelectric conversion, the charge transfer circuit 102 that transfers signal charges, the first charge accumulation circuit 103 that outputs the full-resolution image signal, the second charge accumulation circuit 104 that outputs the 1/9 reduced image signal, and the third charge accumulation circuit 204 that outputs the 1/81 reduced image signal, which are included in the solid-state imaging device 1, are also illustrated.

The image information analysis and estimation unit 304 reads the 1/81 reduced image signal from the third charge accumulation circuit 204 included in the solid-state imaging device 1 to generate the 1/81 reduced image. The image information analysis and estimation unit 304 analyzes the generated 1/81 reduced image, and the image signal processing unit 303 estimates information necessary for, for example, AE processing, AWB processing, or image signal processing such as luminance unevenness correction in a vertical direction due to flickering of a fluorescent lamp when generating the full-resolution image on the basis of the full-resolution image signal of the same exposure output by the solid-state imaging device 1. The image information analysis and estimation unit 304 outputs the estimated necessary information for image signal processing to the image signal processing unit 303.

The image information analysis and estimation unit 304 may be configured to read the 1/9 reduced image signal from the second charge accumulation circuit 104 included in the solid-state imaging device 1 to generate a 1/9 reduced image data, and estimate information necessary for image signal processing.

The image signal processing unit 303 reads the full-resolution image signal from the first charge accumulation circuit 103 included in the solid-state imaging device 1, and performs various types of predetermined image signal processing on the read full-resolution image signal based on the information necessary for image signal processing input from the image information analysis and estimation unit 304.

With this configuration, in the imaging system 20 of the second system example on which the solid-state imaging device 1 of the embodiment is mounted, it is possible to rapidly acquire information necessary for image signal processing for the full-resolution image signal before reading the full-resolution image signal of the same exposure by first reading the 1/81 reduced image signal and rapidly generating the 1/81 reduced image. In particular, in image signal processing for flicker correction of a fluorescent lamp for the full-resolution image signal, it is quite difficult to acquire pixel signals in which phases of periodic luminance unevenness are the same in the related art using different frames. On the other hand, in the imaging system 20 of the second system example on which the solid-state imaging device 1 of the embodiment is mounted, since the exposure is the same, that is, the frame is the same, it is possible to more precisely acquire the pixel signals in which phases of periodic luminance unevenness are the same, and the imaging system 20 is more preferable for image signal processing for flicker correction of a fluorescent lamp.

The readout sequence of the pixel signals in the second system example of the imaging system is the same as the readout sequence of the pixel signals in the imaging system 10 of the first system example illustrated in FIG. 11 except that the components in the imaging system that reads the pixel signals are different. Accordingly, detailed description of the readout sequence of the pixel signals in the second system example of the imaging system will be omitted.

Third System Example

Figure 13:
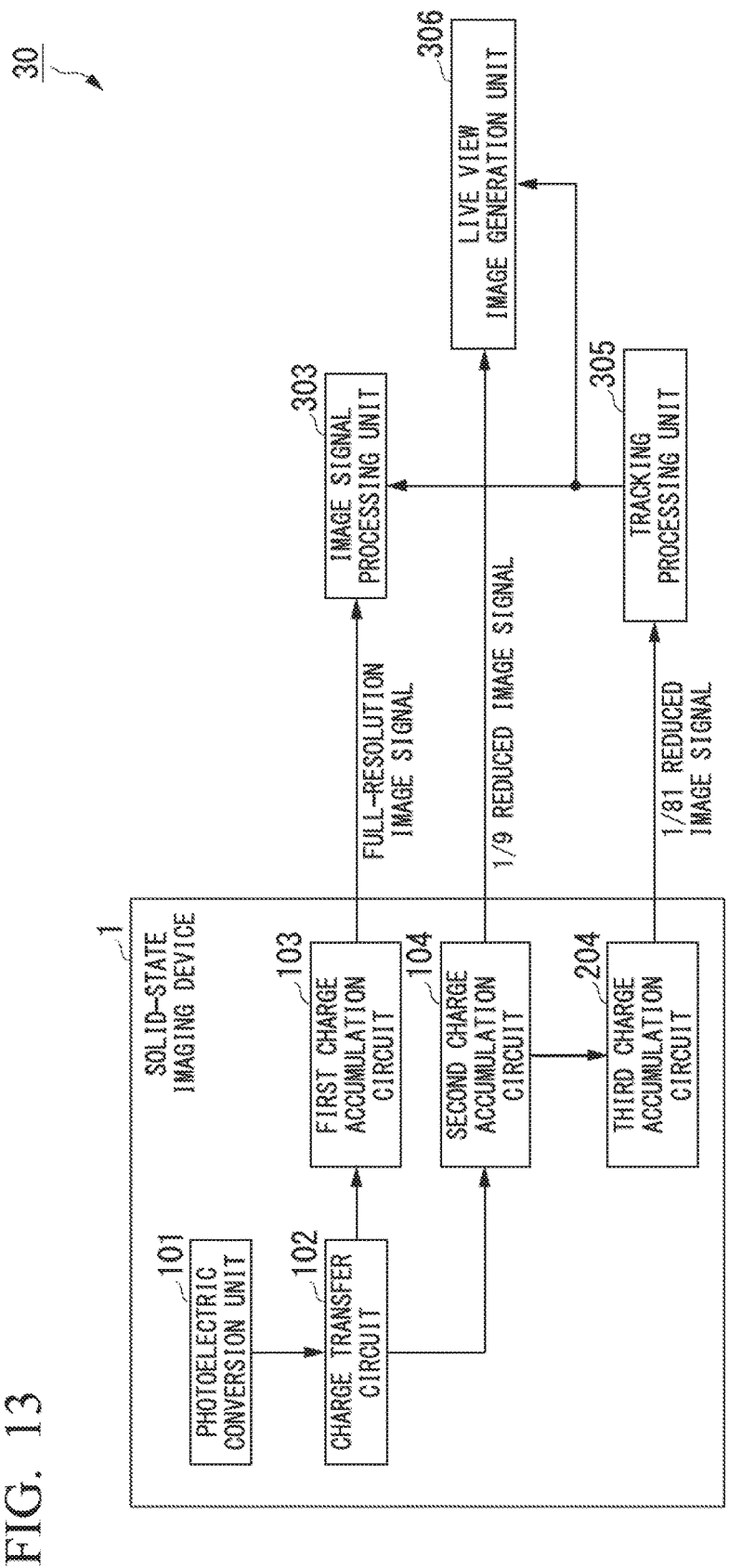
FIG. 13 is a block diagram illustrating a third system example of the imaging system on which the solid-state imaging device of the embodiment of the present invention is mounted.

FIG. 13 is a block diagram illustrating a third system example of the imaging system on which the solid-state imaging device 1 of the embodiment of the present invention is mounted. The third system example of the imaging system is a configuration example of the imaging system that generates a live view image on the basis of the 1/9 reduced image signal read from the solid-state imaging device 1 while generating the full-resolution image on the basis of the full-resolution image signal read from the solid-state imaging device 1 and performs a tracking process on the basis of the 1/81 reduced image signal read from the solid-state imaging device 1. The imaging system 30 illustrated in FIG. 13 includes the solid-state imaging device 1, a tracking processing unit 305, a live view image generation unit 306, and the image signal processing unit 303. In FIG. 13, the photoelectric conversion unit 101 that performs photoelectric conversion, the charge transfer circuit 102 that transfers signal charges, the first charge accumulation circuit 103 that outputs the full-resolution image signal, the second charge accumulation circuit 104 that outputs the 1/9 reduced image signal, and the third charge accumulation circuit 204 that outputs the 1/81 reduced image signal, which are included in the solid-state imaging device 1, are also illustrated.

The tracking processing unit 305 reads the 1/81 reduced image signal from the third charge accumulation circuit 204 included in the solid-state imaging device 1 to generate a 1/81 reduced image. The tracking processing unit 305 analyzes the generated 1/81 reduced image to acquire information necessary for a tracking process, and performs a tracking process in the imaging system 30. Further, the tracking processing unit 305, estimates the information necessary for the live view image generation process by the live view image generation unit 306 to generating the 1/9 reduced image on the basis of the 1/9 reduced image signal of the same exposure output by the solid-state imaging device 1 and outputs the estimated information necessary for the live view image generation process to the live view image generation unit 306. Further, the tracking processing unit 305, estimates the information necessary for image signal processing by the image signal processing unit 303 to generating the full-resolution image on the basis of the full-resolution image signal of the same exposure output by the solid-state imaging device 1 and outputs the estimated information necessary for image signal processing to the image signal processing unit 303.

The live view image generation unit 306 reads the 1/9 reduced image signal from the second charge accumulation circuit 104 included in the solid-state imaging device 1, and generates a 1/9 reduced image from the read 1/9 reduced image signal based on the information necessary for the live view image generation process input from the tracking processing unit 305. The live view image generation unit 306 outputs the generated 1/9 reduced image as the live view image.

When the imaging system 30 captures a moving image, the live view image generation unit 306 may generate a moving image to be recorded, instead of generating the live view image on the basis of the 1/9 reduced image signal read from the solid-state imaging device 1. Further, a configuration in which a moving image generation unit that generates the moving image to be recorded may be included in the imaging system 30 in place of the live view image generation unit 306 may be adopted. In this case, since the process of the moving image generation unit can be considered similarly to the live view image generation process in the live view image generation unit 306 described above, detailed description thereof will be omitted.

The image signal processing unit 303 reads the full-resolution image signal from the first charge accumulation circuit 103 included in the solid-state imaging device 1 and performs various types of predetermined image signal processing on the read full-resolution image signal based on the information necessary for image signal processing input from the tracking processing unit 305 to generate the full-resolution image.

Figure 14:
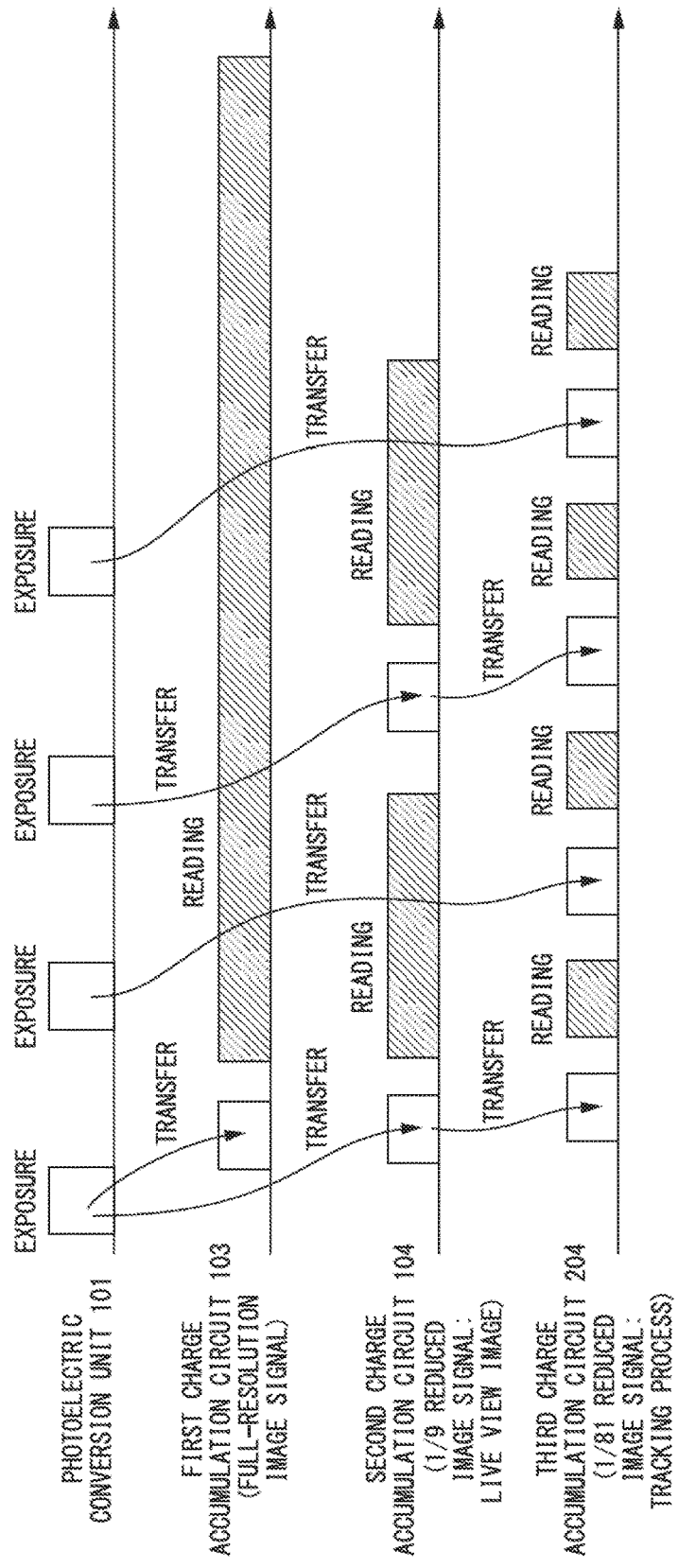
FIG. 14 is a timing chart illustrating a readout sequence of the pixel signals of the imaging system of the third system example on which the solid-state imaging device of the embodiment of the present invention is mounted.

Here, a timing when each pixel signal is read from the solid-state imaging device 1 in the third system example of the imaging system will be described. FIG. 14 is a timing chart illustrating a readout sequence of the pixel signals of the imaging system 30 of the third system example on which the solid-state imaging device 1 of the embodiment of the present invention is mounted.

The imaging system 30 causes the charge transfer circuit 102 to transfer the signal charges exposed by the photoelectric conversion unit 101 to the first charge accumulation circuit 103 and to the second charge accumulation circuit 104, as illustrated in FIG. 14, using a control device (not illustrated) that controls the solid-state imaging device 1. The imaging system 30 causes the second charge accumulation circuit 104 to transfer the averaged signal charges to the third charge accumulation circuit 204.

Thereafter, in the imaging system 30, the full-resolution image signal from the first charge accumulation circuit 103, the 1/9 reduced image signal from the second charge accumulation circuit 104, and the 1/81 reduced image signal from the third charge accumulation circuit 204 are read. Accordingly, the tracking processing unit 305, the live view image generation unit 306, and the image signal processing unit 303 perform processing based on the corresponding pixel signals.

Further, in the imaging system 30, after the transfer of the averaged signal charges to the third charge accumulation circuit 204 ends, the photoelectric conversion unit 101 starts a next exposure. Accordingly, the photoelectric conversion unit 101 generates and accumulates the signal charges obtained by performing the photoelectric conversion on the incident light.

Thereafter, in the imaging system 30, after the reading of the 1/81 reduced image signal from the third charge accumulation circuit 204 ends, the charge transfer circuit 102 is caused to transfer the signal charges obtained by the photoelectric conversion unit 101 performing current exposure to the second charge accumulation circuit 104, and the second charge accumulation circuit 104 is caused to transfer the averaged signal charges to the third charge accumulation circuit 204.

In this case, the transfer of the signal charges obtained through the current exposure to a charge accumulation circuit in which the reading of the signal charges that have been previously transferred does not end is not performed. In the timing chart illustrated in FIG. 14, a case in which the signal charges obtained through the second and fourth exposures are transferred to only the third charge accumulation circuit 204, and the signal charges obtained through the third exposures are transferred to the second charge accumulation circuit 104 and the third charge accumulation circuit 204 is shown. This is because reading of the 1/9 reduced image signal from the second charge accumulation circuit 104 does not end at a timing at which the signal charges obtained through the second and fourth exposures are transferred. An operation of maintaining the signal charges without performing the reading of the full-resolution image signal and the 1/9 reduced image signal while performing reading of the 1/81 reduced image signal can be performed by performing control so that the first sample and hold transistor 108a and the first clamping transistor 109a are not operated when the charges are transferred to the second charge accumulation unit 210, 210a. 221a, and 220a in the solid-state imaging device 1 illustrated in FIGS. 2, 4, and 6, that is, the control signal φTX2 and the control signal φRST2 are set to an "L" level, and accordingly, the charges held in the first charge accumulation unit 110a are maintained in a previous state and reading is performed when necessary. That is, the pixel signal can be transferred to the second charge accumulation circuit 104 or the third charge accumulation circuit 204 without affecting the first charge accumulation unit 110a (the same applies to the configuration corresponding to the pixel 100b).

Thus, in the imaging system 30, if the transfer of the signal charges to the respective charge accumulation circuits ends, the next exposure starts and the signal charges obtained by the photoelectric conversion unit 101 performing photoelectric conversion through current exposure are transferred to the charge accumulation circuit in which previous reading of the signal charges has ended. That is, in the imaging system 30, photographing is performed in a period of a timing at which a 1/81 reduced image of which the frame rate is highest is generated regardless of whether or not the reading of the pixel signal in the second charge accumulation circuit 104 and the first charge accumulation circuit 103 ends. In other words, a frequency at which the 1/81 reduced image signal used for AF or a tracking process such as subject tracking, which is required to be processed at a high speed, that is, which is required to be preferentially read, is read from the third charge accumulation circuit 204 increases.

According to the third system example, the imaging system (the imaging system 30) in which first reads the second pixel signal (the reduced image signal) of which an update frequency is high among the first pixel signal (full-resolution image signal) and the reduced image signal using the second reading unit (the tracking processing unit 305) is configured.

Further, according to the third system example, the imaging system (the imaging system 30) including the solid-state imaging device 1, the first reading unit (the image signal processing unit 303) that reads the first pixel signal (full-resolution image) from the first charge accumulation circuit 103a and the first charge accumulation circuit 103b included in the solid-state imaging device 1, the second reading unit (the live view image generation unit 306) that reads the second pixel signal (for example, the 1/9 reduced image signal) from the second charge accumulation circuit 104 included in the solid-state imaging device 1, and the third reading unit (the tracking processing unit 305) that reads the third pixel signal (for example, the 1/81 reduced image signal) from the third charge accumulation circuit (the third charge accumulation circuit 204) included in the solid-state imaging device 1 is configured.

Further, according to the third system example, the imaging system (the imaging system 30) in which first reads the second pixel signal (for example, the 1/9 reduced image signal) or the third pixel signal (for example, the 1/81 reduced image signal) of which the update frequency is high among the full-resolution image signal, the second pixel signal (for example, the 1/9 reduced image signal), and the third pixel signal (for example, the 1/81 reduced image signal) using the live view image generation unit 306 or the tracking processing unit 305 corresponding thereto is configured.

Thus, in the imaging system 30 of the third system example on which the solid-state imaging device 1 of the embodiment is mounted, the exposure is performed in a period in which the frame rate is highest and generation of images based on the respective pixel signals are performed in parallel. Accordingly, in the imaging system 30 of the third system example on which the solid-state imaging device 1 of the embodiment is mounted, it is possible to generate the live view image while generating the full-resolution image and to perform the tracking process. Further, in the imaging system 30 of the third system example on which the solid-state imaging device 1 of the embodiment is mounted, the live view image is generated based on the 1/9 reduced image signal obtained by averaging (adding and averaging) the respective signal charges, instead of being generated based on the pixel signal obtained by decimating the pixels for each row as in the related art. Therefore, in the imaging system 30 of the third system example on which the solid-state imaging device 1 of the embodiment is mounted, it is possible to generate the live view image having a smaller relative noise amount or a smaller moiré generation amount and better image quality.

Further, the imaging system 30 of the third system example on which the solid-state imaging device 1 of the embodiment is mounted, the tracking process is performed on the basis of the 1/81 reduced image signal in which the number of pixels is further reduced in comparison with the 1/9 reduced image signal for generating the live view image. That is, the tracking process is performed on the basis of the 1/81 reduced image of which the frame rate is higher than that of the live view image. Therefore, in the imaging system 30 of the third system example on which the solid-state imaging device 1 of the embodiment is mounted, it is possible to perform the tracking process at a higher speed. Further, in the imaging system 30 of the third system example on which the solid-state imaging device 1 of the embodiment is mounted, the tracking process is performed on the basis of the 1/81 reduced image signal obtained by further averaging (adding and averaging) the signal charges in comparison with the 1/9 reduced image signal for generating the live view image. Since, in this 1/81 reduced image signal, the number of pixels to be added and averaged is large, the 1/81 reduced image signal is a pixel signal of which signal/noise (S/N) is high. Therefore, when the imaging system is used in an environment in which the exposure amount is small, an imaging system of the related art requires, for example, a countermeasure for obtaining an image that can withstand the tracking process, such as turning on an auxiliary light, whereas, in the imaging system 30 of the third system example on which the solid-state imaging device 1 of the embodiment is mounted the need for, for example, a countermeasure for obtaining an image used for the tracking process, such as decreasing the amount of the auxiliary light or turning off the auxiliary light, is reduced or eliminated. This leads to reduction of power consumption in the imaging system and is advantageous. Further, for example, even when adjustment for applying a gain to the 1/81 reduced image signal is performed, it is possible to generate a good image with less noise. That is, in the imaging system 30 of the third system example, it is possible to perform three photographing modes including still image capturing, high-quality live view capturing, and tracking at low exposure conditions in parallel, and a generation process and a tracking process for the live view image are not interrupted while the pixel signal is being transferred after still image capturing.

Figure 15:
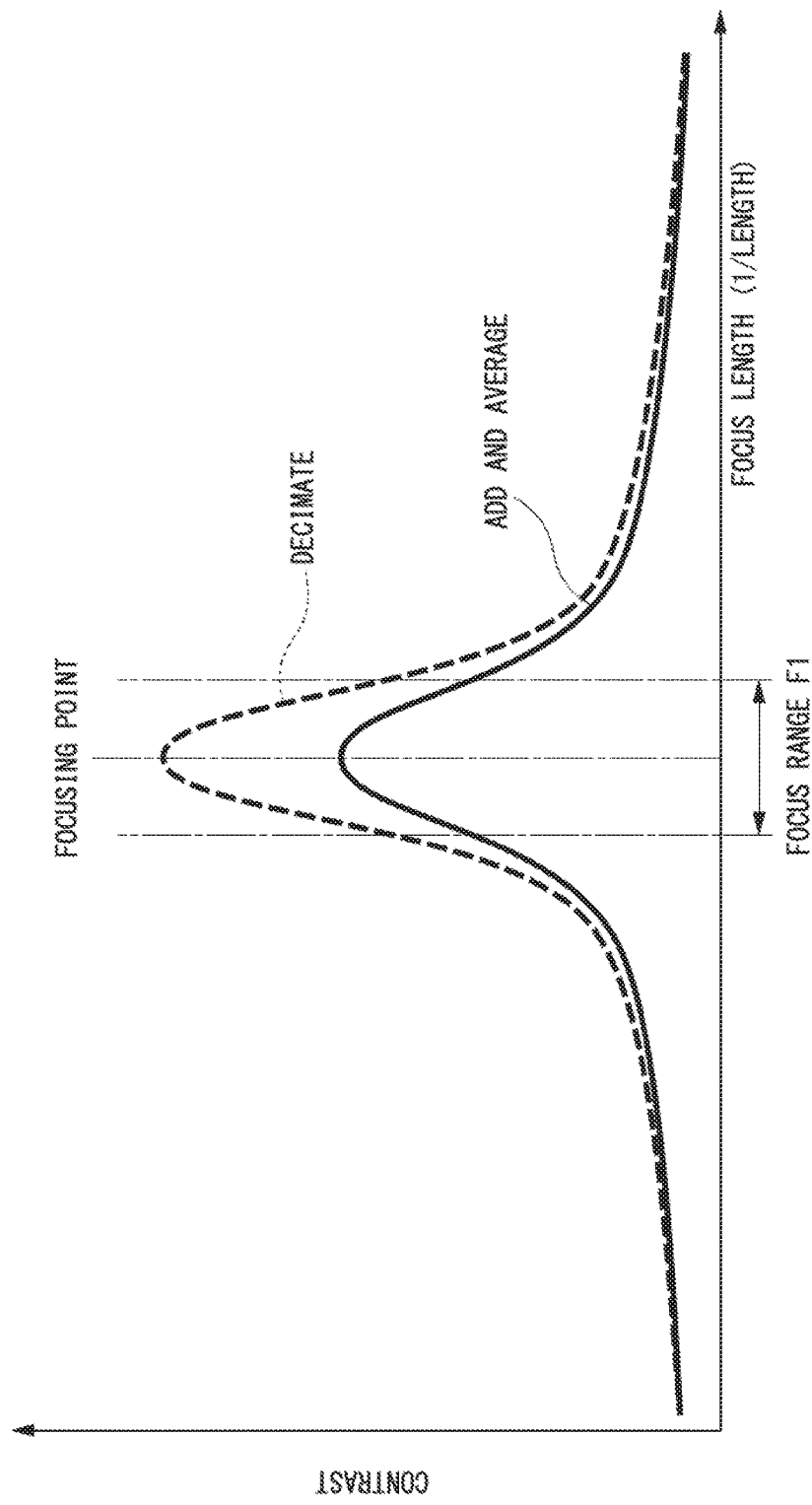
FIG. 15 is a diagram illustrating an example of a relationship between a focus length and a contrast of AF processing of the imaging system.

Incidentally, in the AF processing in the tracking process, processing based on the image generated from the pixel signal obtained by decimating the pixels may be advantageous in comparison with processing based on the image generated from the pixel signal obtained by adding and averaging the signal charges of the pixels. For example, when a current focus position of the optical lens included in the imaging system is near a final focusing point, a contrast of the image generated from the pixel signal obtained by decimating the pixels may be higher than that of the image generated from the pixel signal obtained by adding and averaging the signal charges of the pixels (see FIG. 15). Therefore, if the AF processing is performed based on the image generated from the pixel signal obtained by decimating the pixels, the focus position of the optical lens may be able to be controlled with higher accuracy. More specifically, if the focus length (1/length) is, for example, in the focus range F1, since the contrast of the image generated from the pixel signal obtained by decimating the pixels is higher than that of the image generated from the pixel signal obtained by adding and averaging the signal charges of the pixels as illustrated in FIG. 15, a focus length at which the contrast reaches a peak is easily determined, and accurate AF processing can be completed more rapidly. Conversely, since the added and averaged pixel signal is less susceptible to noise, the added and averaged pixel signal is suitable for a determination of a focus direction (a direction in which the lens is moved in control) when a contrast value is low (out of focus).

Therefore, the solid-state imaging device 1 of the embodiment may be configured to separately and independently output the pixel signal obtained by decimating a predetermined pixel among all the pixels, in addition to the full-resolution image signal and the reduced image signal. The pixel signal obtained by decimating the predetermined pixels is the pixel signal in which the number of pixels is reduced, that is, a reduced image signal. However, in the following description, the reduced image signal obtaining by decimating the pixels is referred to as a "decimated image signal" in order to distinguish between the reduced image signal obtained by adding and averaging the signal charges of the pixels and the reduced image signal obtained by decimating the pixels. Further, the reduced image generated on the basis of the decimated image signal is referred to as a "decimated image."

Figure 16:
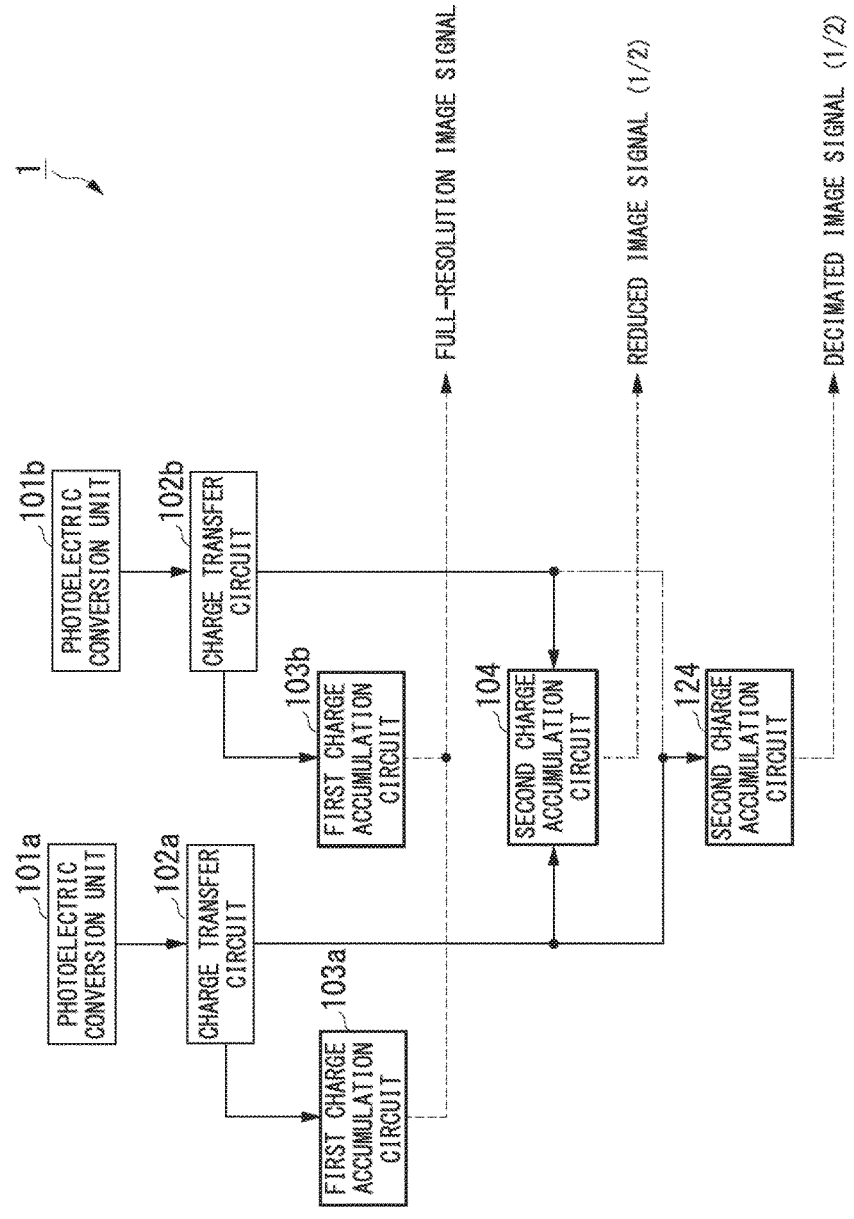
FIG. 16 is a block diagram illustrating a schematic configuration of another modification example of the solid-state imaging device of the embodiment of the present invention.

FIG. 16 is a block diagram illustrating a schematic configuration of another modification example of the solid-state imaging device 1 of the embodiment of the present invention. In another modification example of the solid-state imaging device 1 illustrated in FIG. 16, two pixels including the pixel 100a and the pixel 100b are arranged in the solid-state imaging device 1, similar to the solid-state imaging device 1 illustrated in FIG. 1. In the solid-state imaging device 1 illustrated in FIG. 16, components such as a scanning circuit such as the vertical scanning circuit or the horizontal scanning circuit that drives components of each pixel according to control of the control device included in the imaging system on which the solid-state imaging device 1 is mounted, and an output amplifier for outputting a pixel signal to the outside of the solid-state imaging device 1 are omitted.

The solid-state imaging device 1 illustrated in FIG. 16 includes the photoelectric conversion unit 101a and the photoelectric conversion unit 101b, the charge transfer circuit 102a and the charge transfer circuit 102b, the first charge accumulation circuit 103a and the first charge accumulation circuit 103b, the second charge accumulation circuit 104 and a second charge accumulation circuit 124.

The photoelectric conversion unit 101a and the photoelectric conversion unit 101b, the charge transfer circuit 102a and the charge transfer circuit 102b, the first charge accumulation circuit 103a and the first charge accumulation circuit 103b, and the second charge accumulation circuit 104 are the same components as the respective components corresponding thereto of the solid-state imaging device 1 illustrated in FIG. 1. Therefore, detailed description of each of the components will be omitted. However, either the charge transfer circuit 102a or the charge transfer circuit 102b also transfers the signal charges generated and accumulated by the photoelectric conversion unit 101a or the photoelectric conversion unit 101b corresponding thereto to the second charge accumulation circuit 124.

The second charge accumulation circuit 124 is a circuit that holds (accumulates) the signal charges generated by any one of the photoelectric conversion unit 101a and the photoelectric conversion unit 101b corresponding thereto, which are transferred from any one of the charge transfer circuit 102a and the charge transfer circuit 102b corresponding thereto. Further, the second charge accumulation circuit 124 is also a circuit that outputs a signal voltage according to the held signal charges as a pixel signal.

The configuration of the second charge accumulation circuit 124 is configured using the same concept as the configuration corresponding to one pixel in the second charge accumulation circuit 104 shown in the first to third configuration examples of the solid-state imaging device 1 of the embodiment. That is, a configuration including a third charge accumulation unit corresponding to the second charge accumulation unit (the second charge accumulation unit 210, the second charge accumulation unit 2100a or the second charge accumulation unit 210b, the second charge accumulation unit 220a and the second charge accumulation unit 221a, or the second charge accumulation unit 220b and the second charge accumulation unit 221b) included in the second charge accumulation circuit 104 in the first to third configuration examples is considered.

With this configuration, in the solid-state imaging device 1 illustrated in FIG. 16, the respective pixels are exposed in the same exposure period, and the signal charges generated by the photoelectric conversion unit 101 are held in the first charge accumulation circuit 103 in each pixel. Further, with this configuration, in the solid-state imaging device 1 illustrated in FIG. 16, in each pixel, the signal charges obtained by averaging the respective signal charges (the signal charges obtained by reducing the number of pixels) are held in the second charge accumulation circuit 104, and any one of the signal charges (signal charges obtained by decimating the pixels) is held in the second charge accumulation circuit 124. In the solid-state imaging device 1 illustrated in FIG. 16, each pixel signal according to the signal charges held in the first charge accumulation circuit 103, the pixel signal according to the signal charges held in the second charge accumulation circuit 104, and the pixel signal according to the signal charges held in the second charge accumulation circuit 124 can be separately output. That is, in the solid-state imaging device 1 illustrated in FIG. 16, the pixel signal of all the pixels, the pixel signal in which the number of pixels is reduced, and the pixel signal in which the pixels are decimated can be separately output on the basis of the signal charges obtained through the same single exposure. More specifically, as illustrated in FIG. 16, the pixel signals of all the pixels (the full-resolution image signal), the pixel signal in which the number of pixels is reduced to ½ (the reduced image signal (½)), and the pixel signal in which the pixels are decimated to ½ (the decimated image signal (½)) can be separately output.

In the solid-state imaging device 1 illustrated in FIG. 16, the configuration in which signal charges obtained by averaging the charge amounts of the respective signal charges generated by the photoelectric conversion unit 101 included in the two corresponding pixels are held in the second charge accumulation circuit 104, and the signal charges generated by the photoelectric conversion unit 101 included in any one of pixels are held in the second charge accumulation circuit 124 is shown. However, the configuration of the solid-state imaging device 1 of the embodiment is not limited to the configuration illustrated in FIG. 16. That is, as described above, the configuration may be a configuration in which an added charge accumulation circuit is included in place of the second charge accumulation circuit 104 or a configuration in which the second charge accumulation circuit 124 is included in place of the third charge accumulation circuit 204 included in the solid-state imaging device 1 illustrated in FIG. 8.

Fourth Configuration Example

Here, an example of a configuration of the solid-state imaging device 1 of the embodiment illustrated in FIG. 16 will be described. The solid-state imaging device 1 of the fourth configuration example is the solid-state imaging device 1 having a multilayer substrate structure in which the second charge accumulation circuit 124 is added to the solid-state imaging device 1 of the second configuration example illustrated in FIG. 4, and the respective components are distributed on four substrates including a photoelectric conversion substrate, a first readout substrate, a second readout substrate, and a third readout substrate.

The solid-state imaging device 1 of the fourth configuration example also includes the same components as the solid-state imaging device 1 of the second configuration example. Therefore, among the components of the solid-state imaging device 1 of the fourth configuration example, the same components as the components of the solid-state imaging device 1 of the second configuration example are denoted with the same reference signs, and detailed description of the respective components will be omitted.

Figure 17:
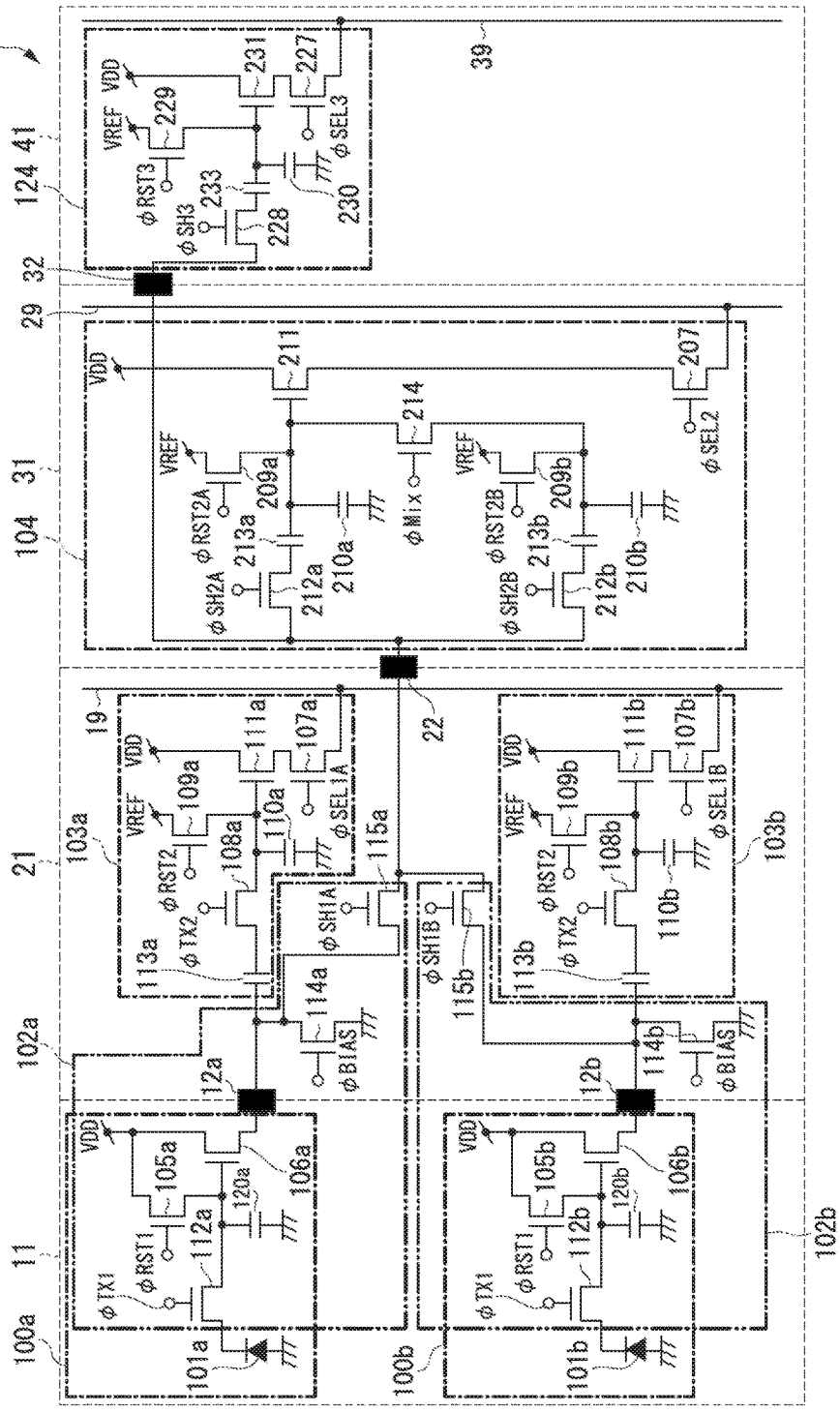
FIG. 17 is a circuit diagram illustrating a fourth configuration example of the solid-state imaging device of the embodiment of the present invention.

FIG. 17 is a circuit diagram illustrating a fourth configuration example of the solid-state imaging device 1 of the embodiment of the present invention. In FIG. 17, in the fourth configuration example of the solid-state imaging device 1, photoelectric conversion unit 101a and 101b, pixel reset transistor 105a and 105b, first amplifying transistor 106a and 106b, and charge transfer transistor 112a and 112b are formed in the photoelectric conversion substrate 111. In FIG. 17, each of the node capacitance 120a and the node capacitance 120b is shown by a symbol of a capacitor, as in the photoelectric conversion substrate 11 of the second configuration example. The pixel 100a includes the photoelectric conversion unit 101a, the pixel reset transistor 105a, the first amplifying transistor 106a, the charge transfer transistor 112a, and the node capacitance 120a. The pixel 100b includes the photoelectric conversion unit 101b, the pixel reset transistor 105b, the first amplifying transistor 106b, the charge transfer transistor 112b, and the node capacitance 120b. The photoelectric conversion substrate 11 is the same as the photoelectric conversion substrate 11 of the second configuration example.

Further, in FIG. 17, in the fourth configuration example of the solid-state imaging device 1, first clamping transistor 109a and 109b, first sample and hold transistor 108a and 108b, second amplifying transistor 111a and 111b, first selection transistor 107a and 107b, first charge accumulation units 110a and 100b, pixel load transistor 114a and 114b, and first noise suppression elements 113a and 113b are formed in the first readout substrate 21. Further, in the fourth configuration example of the solid-state imaging device 1, the multiplexer including the pixel selection transistor 115a and the pixel selection transistor 115b is formed in the first readout substrate 21. The charge transfer circuit 102a includes the pixel reset transistor 105a, the first amplifying transistor 106a, the charge transfer transistor 112a, the node capacitance 120a, the pixel load transistor 114a, and the pixel selection transistor 115a. The charge transfer circuit 102b includes the pixel reset transistor 105b, the first amplifying transistor 106b, the charge transfer transistor 112b, the node capacitance 120b, the pixel load transistor 114b, and the pixel selection transistor 115b. The first charge accumulation circuit 103a includes the first clamping transistor 109a, the first sample and hold transistor 108a, the second amplifying transistor 111a, the first selection transistor 107a, the first charge accumulation unit 110a, and the first noise suppression element 113a. The first charge accumulation circuit 103b includes the first clamping transistor 109b, the first sample and hold transistor 108b, the second amplifying transistor 111b, the first selection transistor 107b, the first charge accumulation unit 110b, and the first noise suppression element 113b. The first readout substrate 21 is the same as the first readout substrate 21 of the second configuration example.

Further, in FIG. 17, in the fourth configuration example of the solid-state imaging device 1, the second charge accumulation circuit 104 including the second clamping transistor 209a, the second charge accumulation unit 210a, the second noise suppression element 213a, and the pixel selection transistor 212a corresponding to the pixel 100a, the second clamping transistor 209b, the second charge accumulation unit 210b, the second noise suppression element 213b, and the pixel selection transistor 212b corresponding to the pixel 100b, the third amplifying transistor 211, the second selection transistor 207, and the averaging switch transistor 214 is formed in the second readout substrate 31. In the second readout substrate 31, the pixel selection transistor 212a and the pixel selection transistor 212b constitute a demultiplexer corresponding to the multiplexer formed in the first readout substrate 21. Further, in the second readout substrate 31, a path that directly outputs input signal charges is provided.

Further, in FIG. 17, in the fourth configuration example of the solid-state imaging device 1, the second charge accumulation circuit 124 including a second clamping transistor 229, a second charge accumulation unit 230, a second noise suppression element 233, and a decimated signal sample and hold transistor 228 corresponding to the pixel 100a or the pixel 100b, a third amplifying transistor 231, and a second selection transistor 227 is formed in a third readout substrate 41.

The photoelectric conversion substrate 11 and the first readout substrate 21 are connected by the first inter-substrate connection portion 12a and the first inter-substrate connection portion 12b, the first readout substrate 21 and the second readout substrate 31 are connected by the second inter-substrate connection portion 22, and the second readout substrate 31 and the third readout substrate 41 are connected by a third inter-substrate connection portion 32.

In the fourth configuration example of the solid-state imaging device 1 of the embodiment, a structure of the first inter-substrate connection portion 12a and the first inter-substrate connection portion 12b electrically connecting the photoelectric conversion substrate 11 to the first readout substrate 21 is not particularly defined, similar to the second configuration example of the solid-state imaging device 1. Further, in the fourth configuration example of the solid-state imaging device 1 of the embodiment, a structure of the second inter-substrate connection portion 22 electrically connecting the first readout substrate 21 to the second readout substrate 31 is not particularly defined, similar to the second configuration example of the solid-state imaging device 1. Further, in the fourth configuration example of the solid-state imaging device 1 of the embodiment, a structure of the third inter-substrate connection portion 32 electrically connecting the second readout substrate 31 to the third readout substrate 41 is not particularly defined, similar to the second configuration example of the solid-state imaging device 1.

The decimated signal sample and hold transistor 228 outputs the signal voltage input via the second inter-substrate connection portion 22 and the third inter-substrate connection portion 32 to the second noise suppression element 233 so that the signal voltage is held, according to the control signal φSH3 input from the vertical scanning circuit (not illustrated). That is, in the solid-state imaging device 1 of the fourth configuration example, the decimated signal sample and hold transistor 228 operates as a selection circuit that outputs any one of the input signal voltages to the second noise suppression element 233. Accordingly, the signal voltage according to the signal charges generated by any one of the photoelectric conversion unit 101a and the photoelectric conversion unit 101b included in each pixel is held in the second noise suppression element 233.

The second noise suppression element 233 is a capacitor that holds (accumulates) the signal voltage output from the decimated signal sample and hold transistor 228.

The second clamping transistor 229 clamps each of the second charge accumulation unit 230 and the second noise suppression element 233 to a fixed potential VREF according to a control signal ϕRST3 input from the vertical scanning circuit (not illustrated). Accordingly, each of the second charge accumulation unit 230 and the second noise suppression element 233 holds the clamped fixed potential VREF.

The second charge accumulation unit 230 is a capacitor that holds (accumulates) the signal voltage held in the second noise suppression element 233 (the signal subjected to the noise removal process in the second charge accumulation circuit 124).

In the second charge accumulation circuit 124 in the fourth configuration example, through the configuration of the second clamping transistor 229, the second charge accumulation unit 230, and the second noise suppression element 233, a noise removal process is performed on a leak current (dark current) in the pixel 100a or the pixel 100b within the second charge accumulation circuit 124. The second charge accumulation unit 230 holds the signal subjected to the noise removal process.

It is more preferable to use MIM capacitor or MOS capacitor that is a capacitor in which a leak current (dark current) per unit area is small, as the second charge accumulation unit 230, similar to the second charge accumulation unit 210a and the second charge accumulation unit 210b of the second configuration example. Accordingly, it is possible to improve resistance to noise and obtain a high-quality signal.

The third amplifying transistor 231 outputs a signal voltage according to the voltage of the gate terminal, that is, the signal subjected to the noise removal process held in the second charge accumulation unit 230.

The second selection transistor 227 outputs the signal voltage output from the third amplifying transistor 231 to a third vertical signal line 39 as a pixel signal of a predetermined pixel included in the solid-state imaging device 1, that is, a pixel signal obtained by decimating any one of the pixel 100a and the pixel 100b according to a control signal ϕSEL3 input from the vertical scanning circuit (not illustrated). Accordingly, the pixel signal according to the signal charges obtained by decimating the signal charges generated by any one of the photoelectric conversion unit 101a and the photoelectric conversion unit 101b included in each pixel is read to the third vertical signal line 39.

With this configuration, in the fourth configuration example of the solid-state imaging device 1, the respective signal voltages according to the signal charges obtained by the two photoelectric conversion units (the photoelectric conversion unit 101a and the photoelectric conversion unit 101b) performing photoelectric conversion on incident light are read via the inter-substrate connection portions (the first inter-substrate connection portion 12a and the first inter-substrate connection portion 12b) corresponding to the two photoelectric conversion units. The signals after the noise removal process are held in the charge accumulation units (the first charge accumulation unit 110 and the first charge accumulation unit 110b) corresponding to the two respective photoelectric conversion units. Further, in the fourth configuration example of the solid-state imaging device 1, the respective signal voltages according to the signal charges subjected to the photoelectric conversion by the two photoelectric conversion units are selected by the multiplexer (the pixel selection transistor 115a and the pixel selection transistor 115b) and output to the second inter-substrate connection portion 22. The respective signal voltages according to the respective signal charges subjected to the photoelectric conversion by the two photoelectric conversion units are separated by the demultiplexer (the pixel selection transistor 212a and the pixel selection transistor 212b). The signals after the noise removal process are held in the charge accumulation units (the second charge accumulation unit 210a and the second charge accumulation unit 210b) corresponding to the two photoelectric conversion units. Thereafter, the signals held in the charge accumulation units (the second charge accumulation unit 210a and the second charge accumulation unit 210b) corresponding to the two photoelectric conversion units are averaged. Further, in the fourth configuration example of the solid-state imaging device 1, the signal voltage according to any one of the signal charges subjected to the photoelectric conversion by the two photoelectric conversion units, which are selected by the multiplexer (the pixel selection transistor 115a and the pixel selection transistor 115b) and input via the second inter-substrate connection portion 22 and the third inter-substrate connection portion 32, is selected by the selection circuit (the decimated signal sample and hold transistor 228). The signal after the noise removal process is held in the charge accumulation unit (the second charge accumulation unit 230). Thereafter, in the solid-state imaging device 1, signal voltages according to the signals after the noise removal process accumulated in the respective charge accumulation units (the first charge accumulation unit 110a and the first charge accumulation unit 110b), the averaged signal voltage, and the decimated signal voltage are sequentially read to the first vertical signal line 19, the second vertical signal line 29, and the third vertical signal line 39 as the pixel signals.

In the fourth configuration example of the solid-state imaging device 1 illustrated in FIG. 17, the example of the configuration in which the pixel 100a including the respective components including the photoelectric conversion unit 101a and the pixel 100b including the respective components including the photoelectric conversion unit 101b form a set is shown, but the set of pixels arranged in the solid-state imaging device 1 is not limited to the configuration illustrated in FIG. 17, similar to the solid-state imaging device 1 of the second configuration example. That is, one set may be configured with more pixels than in the configuration illustrated in FIG. 17. A pixel array included in the solid-state imaging device 1 may be formed by arranging a plurality of sets of the pixels.

Figure 18:
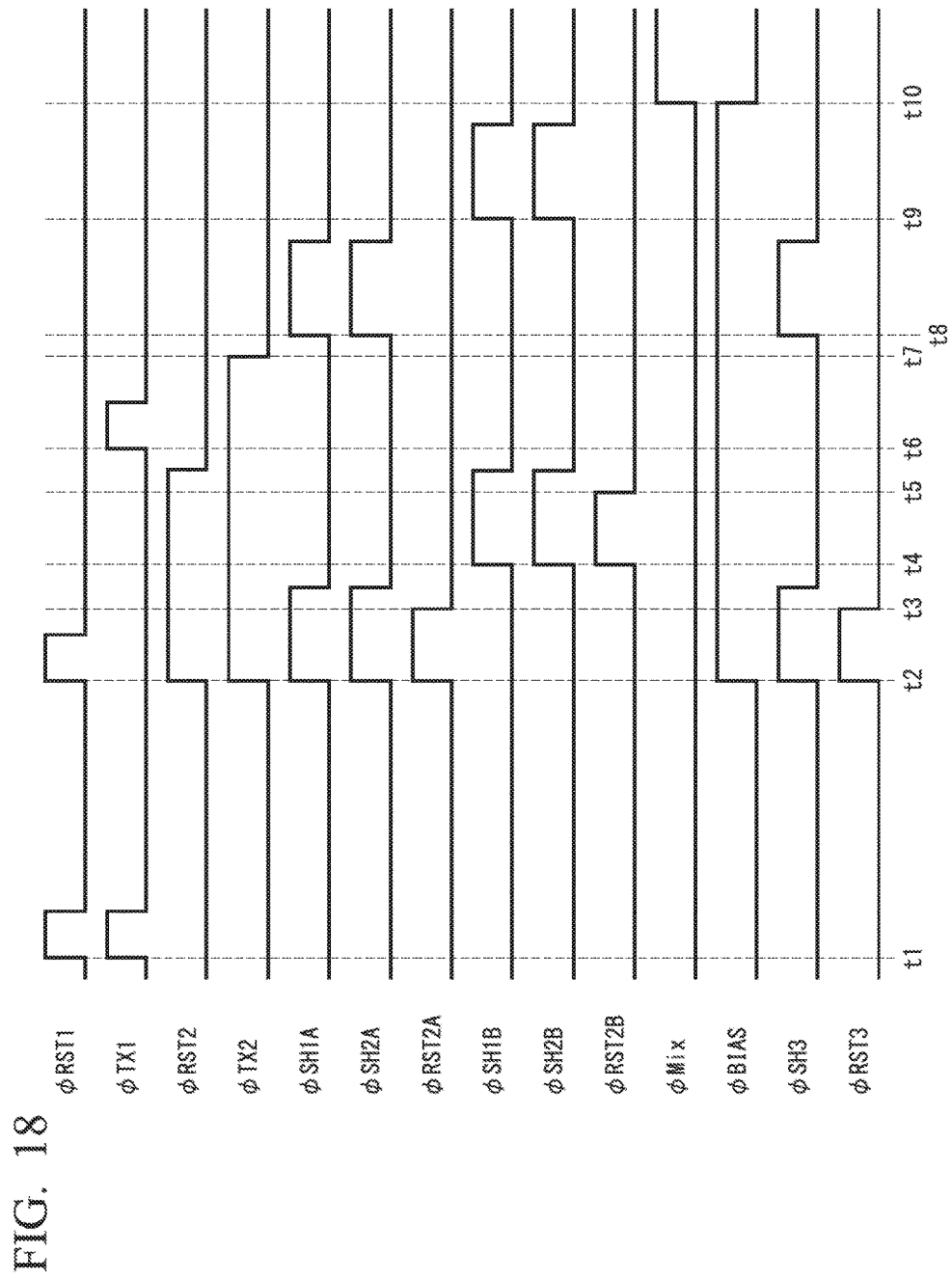
FIG. 18 is a timing chart illustrating timings of driving the fourth configuration example of the solid-state imaging device of the embodiment of the present invention.

Next, driving timings of the fourth configuration example in the solid-state imaging device 1 of the embodiment will be described. FIG. 18 is a timing chart illustrating timings of driving the fourth configuration example of the solid-state imaging device 1 of the embodiment of the present invention. The timing chart illustrated in FIG. 18 shows timings that are controlled by the vertical scanning circuit (not illustrated) in an operation of the fourth configuration example of the solid-state imaging device 1 in which the pixel 100a and the pixel 100b are simultaneously exposed, the pixel signal of the pixel 100a and the pixel signal of the pixel 100b are sequentially output to the first vertical signal line 19, a pixel signal obtained by averaging the pixel signal of the pixel 100a and the pixel signal of the pixel 100b is output to the second vertical signal line 29, and the pixel signal of the pixel 100a is output to the third vertical signal line 39.

In the fourth configuration example of the solid-state imaging device 1, two pixels including the pixel 100a and the pixel 100b are configured as one set, as illustrated in FIG. 17. In the fourth configuration example of the solid-state imaging device 1, two of the first charge accumulation circuit 103a (including the first charge accumulation unit 110a) and the first charge accumulation circuit 103b (including the first charge accumulation unit 110b) respectively corresponding to two of the photoelectric conversion unit 101a and the photoelectric conversion unit 101b, and the second charge accumulation circuit 104 (including the second charge accumulation unit 210a and the second charge accumulation unit 210b) that is common to the two photoelectric conversion units including the photoelectric conversion unit 101a and the photoelectric conversion unit 101b, and the second charge accumulation circuit 124 (including the second charge accumulation unit 230) are included. Therefore, in the timing chart illustrated in FIG. 18, timings of holding the signal charges generated by each of the photoelectric conversion unit 101a and the photoelectric conversion unit 101b, in the first charge accumulation unit 110a and the first charge accumulation unit 110b, and the second charge accumulation unit 210a and the second charge accumulation unit 210b, and holding the signal charges generated by the photoelectric conversion unit 101a in the second charge accumulation unit 230 are illustrated.

First, at time t1, all of the pixels (the pixel 100a and the pixel 100b) are reset. More specifically, at time t1, the vertical scanning circuit (not illustrated) simultaneously sets the control signal φTX1 and the control signal φRST1 to an "H" level to cause the charge transfer transistor 112a, the charge transfer transistor 12b, the pixel reset transistor 105a, and the pixel reset transistor 105b to be in an ON state. Accordingly, the photoelectric conversion unit 101a and the photoelectric conversion unit 101b, and the node capacitance 120a and the node capacitance 120b, included in the pixel 100a and the pixel 100b are reset.

Then, the vertical scanning circuit (not illustrated) simultaneously sets the control signal φTX1 and the control signal φRST1 to an "L" level to release the reset of the pixel 100a and the pixel 100b. Accordingly, the pixel 100a and the pixel 100b simultaneously start the exposure. That is, the photoelectric conversion unit 101a included in the pixel 100a and the photoelectric conversion unit 101b included in the pixel 100b start accumulation of signal charges obtained by performing photoelectric conversion on incident light.

Subsequently, from time t2 after a certain period of time elapses, that is, after any exposure time elapses, each of the charge transfer circuit 102a and the charge transfer circuit 102b performs readout of the signal at a reset level and the signal at an exposure level of the photoelectric conversion unit 101a or the photoelectric conversion unit 101b corresponding thereto, to the first inter-substrate connection portion 12a or the first inter-substrate connection portion 12b corresponding thereto. The first charge accumulation circuit 103a and the first charge accumulation circuit 103b perform a noise removal process of obtaining a difference between the signal at a reset level and the signal at an exposure level of the photoelectric conversion unit 101a or the photoelectric conversion unit 101b corresponding thereto. From time t2, each of the charge transfer circuit 102a and the charge transfer circuit 102b sequentially performs readout of the signal at a reset level and the signal at an exposure level of the photoelectric conversion unit 101a or the photoelectric conversion unit 101b corresponding thereto, to the second inter-substrate connection portion 22. Further, the second charge accumulation circuit 104 sequentially performs a noise removal process of obtaining a difference of the signal at a reset level and the signal at an exposure level of the pixel 100a, and a noise removal process of obtaining a difference of the signal at a reset level and the signal at an exposure level of the pixel 100b. Further, the second charge accumulation circuit 124 performs a noise removal process of obtaining a difference between the signal at a reset level and the signal at an exposure level of the pixel 100a.

More specifically, at time t2, the vertical scanning circuit (not illustrated) controls the control signal φBIAS to operate the pixel load transistor 114a as a load of the corresponding first amplifying transistor 106a and operate the pixel load transistor 114b as a load of the corresponding first amplifying transistor 106b.

Further, the vertical scanning circuit (not illustrated) sets the control signal φRST1 to an "H" level to cause the pixel reset transistor 105a and the pixel reset transistor 105b to be in an ON state, and resets the node capacitance 120a and the node capacitance 120b. Accordingly, the signal voltage at a reset level of the photoelectric conversion unit 101a from the first amplifying transistor 106a is output to the first noise suppression element 113a via the first inter-substrate connection portion 12a, and is output to the pixel selection transistor 115a. Further, the signal voltage at a reset level of the photoelectric conversion unit 101b from the first amplifying transistor 106b is output to the first noise suppression element 113b via the first inter-substrate connection portion 12b, and is output to the pixel selection transistor 115b.

Further, the vertical scanning circuit (not illustrated) sets the control signal φSH1A, the control signal φSH2A, and the control signal φSH3 to an "H" level to cause the pixel selection transistor 115a, the pixel selection transistor 212a, and the decimated signal sample and hold transistor 228 to be in an ON state. Accordingly, the signal voltage at a reset level of the photoelectric conversion unit 101a, output from the first amplifying transistor 106a to the pixel selection transistor 115a via the first inter-substrate connection portion 12a is selected, and output to the second noise suppression element 213a via the pixel selection transistor 115a, the second inter-substrate connection portion 22, and the pixel selection transistor 212a. Further, the selected signal voltage at a reset level of the photoelectric conversion unit 101a is output to the second noise suppression element 233 via the third inter-substrate connection portion 32 and the decimated signal sample and hold transistor 228.

Further, the vertical scanning circuit (not illustrated) sets the control signal φRST2 and the control signal φTX2 to an "H" level to cause the first clamping transistor 109a and the first clamping transistor 109b, and the first sample and hold transistor 108a and the first sample and hold transistor 108b to be in an ON state. Accordingly, each of the first charge accumulation unit 110a and the first charge accumulation unit 110b, and the first noise suppression element 113a and the first noise suppression element 113b are clamped. Further, the vertical scanning circuit (not illustrated) sets the control signal φRST2A to an "H" level to cause the second clamping transistor 209a to be in an ON state. Accordingly, each of the second charge accumulation unit 210a and the second noise suppression element 213a is clamped. Further, the vertical scanning circuit (not illustrated) sets the control signal φRST3 to an "H" level to cause the second clamping transistor 229 to be in an ON state. Accordingly, each of the second charge accumulation unit 230 and the second noise suppression element 233 is clamped.

Then, the vertical scanning circuit (not illustrated) sets the control signal ϕRST1 to an "L" level to release the reset of the node capacitance 120a and the node capacitance 120b. Subsequently, at time t3, the vertical scanning circuit (not illustrated) sets the control signal ϕRST2A to an "L" level to release the clamp of the second charge accumulation unit 210a. Further, the vertical scanning circuit (not illustrated) sets the control signal ϕRST3 to an "L" level to release the clamp of the second charge accumulation unit 230. Then, the vertical scanning circuit (not illustrated) sets the control signal ϕSH1A, the control signal ϕSH2A, and the control signal ϕSH3 to an "L" level to cause the pixel selection transistor 115a, the pixel selection transistor 212a, and the decimated signal sample and hold transistor 228 to be in an OFF state, and release the section of the signal voltage at a reset level of the photoelectric conversion unit 101a.

Subsequently, at time t4, the vertical scanning circuit (not illustrated) sets the control signal ϕSH1B and the control signal ϕSH2B to an "H" level to cause the pixel selection transistor 115b and the pixel selection transistor 212b to be in an ON state. Accordingly, the signal voltage at a reset level of the photoelectric conversion unit 101b output from the first amplifying transistor 106b to the pixel selection transistor 115b via the first inter-substrate connection portion 12b is selected, and output to the second noise suppression element 213b via the pixel selection transistor 115b, the second inter-substrate connection portion 22, and the pixel selection transistor 212b. Further, the vertical scanning circuit (not illustrated) sets the control signal ϕRST2B to an "H" level to cause the second clamping transistor 209b to be in an ON state. Accordingly, each of the second charge accumulation unit 210b and the second noise suppression element 213b is clamped.

Subsequently, at time t5, the vertical scanning circuit (not illustrated) sets the control signal ϕRST2B to an "L" level to release the clamp of the second charge accumulation unit 210b. Then, the vertical scanning circuit (not illustrated) sets the control signal ϕSH1B and the control signal ϕSH2B to an "L" level to cause the pixel selection transistor 115b and the pixel selection transistor 212b to be in an OFF state, and release the selection of the signal voltage at a reset level of the photoelectric conversion unit 101b. Further, the vertical scanning circuit (not illustrated) sets the control signal ϕRST2 to an "L" level to release the clamp of the first charge accumulation unit 110a and the first charge accumulation unit 110b.

Subsequently, at time t6, the vertical scanning circuit (not illustrated) sets the control signal ϕTX1 to an "H" level to cause the charge transfer transistor 112a and the charge transfer transistor 112b to be in an ON state, and transfer the signal charges accumulated in the photoelectric conversion unit 101a to the gate terminal of the first amplifying transistor 106a, and transfer the signal charges accumulated in the photoelectric conversion unit 101b to the gate terminal of the first amplifying transistor 106b. In this case, the signal charges transferred by the charge transfer transistor 112a are accumulated in the node capacitance 120a, and the signal charges transferred by the charge transfer transistor 112b are accumulated in the node capacitance 120b. Accordingly, a signal voltage (signal at an exposure level) according to the signal charges generated by the photoelectric conversion unit 101a, that is, the signal charges accumulated in the node capacitance 120a, is output from the first amplifying transistor 106a to the first noise suppression element 113a via the first inter-substrate connection portion 12a, and output to the pixel selection transistor 115a. Further, a signal voltage (signal at an exposure level) according to the signal charges generated by the photoelectric conversion unit 101b, that is, the signal charges accumulated in the node capacitance 120b, is output from the first amplifying transistor 106b to the first noise suppression element 113b via the first inter-substrate connection portion 12b, and output to the pixel selection transistor 115b.

The first noise suppression element 113a outputs a voltage of a difference between the signal voltage at a reset level and the signal voltage at an exposure level of the photoelectric conversion unit 101a, that is, a signal voltage subjected to the noise removal process. Further, similarly, the first noise suppression element 113b outputs a signal voltage subjected to the noise removal process of the photoelectric conversion unit 101b.

Then, the vertical scanning circuit (not illustrated) sets the control signal ϕTX1 to an "L" level to stop transfer to the gate terminal of the first amplifying transistor 106a of the signal charges accumulated in the photoelectric conversion unit 101a and transfer to the gate terminal of the first amplifying transistor 106b of the signal charges accumulated in the photoelectric conversion unit 101b.

Subsequently, at time t7, the vertical scanning circuit (not illustrated) sets the control signal ϕTX2 to an "L" level to stop sample and hold of the first charge accumulation unit 110a, and sample and hold of the first charge accumulation unit 110b. Accordingly, the first charge accumulation unit 110a holds the signal voltage subjected to the noise removal process output by the first noise suppression element 113a, and the first charge accumulation unit 110b holds the signal voltage subjected to the noise removal process output by the first noise suppression element 113b.

Up to this point, the signal charges generated by the photoelectric conversion unit 101a included in the pixel 100a are subjected to a noise removal process and held in the first charge accumulation unit 110a, and the signal charges generated by the photoelectric conversion unit 101b included in the pixel 100b are subjected to the noise removal process and held (accumulated) in the first charge accumulation unit 110b.

Subsequently, at time t8, the vertical scanning circuit (not illustrated) sets the control signal ϕSH1A, the control signal ϕSH2A, and the control signal ϕSH3 to an "H" level to cause the pixel selection transistor 115a, the pixel selection transistor 212a, and the decimated signal sample and hold transistor 228 to be in an ON state. Accordingly, the signal charges generated by the photoelectric conversion unit 101a, which is output from the first amplifying transistor 106a to the pixel selection transistor 115a via the first inter-substrate connection portion 12a, that is, the signal voltage (the signal at an exposure level) according to the signal charges accumulated in the node capacitance 120a is selected, and output to the second noise suppression element 213a via the pixel selection transistor 115a, the second inter-substrate connection portion 22, and the pixel selection transistor 212a. Further, the selected signal voltage (the signal at an exposure level) according to the signal charges accumulated in the node capacitance 120a of the photoelectric conversion unit 101a is output to the second noise suppression element 233 via the third inter-substrate connection portion 32 and the decimated signal sample and hold transistor 228.

The second noise suppression element 213a outputs a voltage of a difference between the signal voltage at a reset level and the signal voltage at an exposure level of the photoelectric conversion unit 101a, that is, a signal voltage subjected to the noise removal process. Further, the second noise suppression element 233 outputs a voltage of a difference between the signal voltage at a reset level and the signal voltage at an exposure level of the photoelectric conversion unit 101a, that is, a signal voltage subjected to the noise removal process.

Then, the vertical scanning circuit (not illustrated) sets the control signal ϕSH1A, the control signal ϕSH2A, and the control signal ϕSH3 to an "L" level to cause the pixel selection transistor 115a the pixel selection transistor 212a, and the decimated signal sample and hold transistor 228 to be in an OFF state, and release the section of the signal voltage according to the signal charges generated by the photoelectric conversion unit 101a.

Up to this point, the signal charges generated by the photoelectric conversion unit 101a included in the pixel 100a are subjected to a noise removal process and held (accumulated) in the second charge accumulation unit 210a and the second charge accumulation unit 230.

Subsequently, at time t9, the vertical scanning circuit (not illustrated) sets the control signal ϕSH1B and the control signal ϕSH2B to an "H" level to cause the pixel selection transistor 115b and the pixel selection transistor 212b to be in an ON state. Accordingly, the signal charges generated by the photoelectric conversion unit 101b, which is output from the first amplifying transistor 106b to the pixel selection transistor 115b via the first inter-substrate connection portion 12b, that is, the signal voltage (the signal at an exposure level) according to the signal charges accumulated in the node capacitance 120b is selected, and output to the second noise suppression element 213b via the pixel selection transistor 115b, the second inter-substrate connection portion 22, and the pixel selection transistor 212b.

The second noise suppression element 213b outputs a voltage of a difference between the signal voltage at a reset level and the signal voltage at an exposure level of the photoelectric conversion unit 101b, that is, a signal voltage subjected to the noise removal process.

Then, the vertical scanning circuit (not illustrated) sets the control signal ϕSH1B and the control signal ϕSH2B to an "L" level to cause the pixel selection transistor 115b and the pixel selection transistor 212b to be in an OFF state, and release the selection of the signal voltage according to the signal charges generated by the photoelectric conversion unit 101b.

Up to this point, the signal charges generated by the photoelectric conversion unit 101b included in the pixel 100b are subjected to the noise removal process and held (accumulated) in the second charge accumulation unit 210b.

Subsequently, at time t10, the second charge accumulation circuit 104 performs a process of averaging the signal voltage subjected to the noise removal process held in the second charge accumulation unit 210a and the signal voltage subjected to the noise removal process held in the second charge accumulation unit 210b. More specifically, at time t10, the vertical scanning circuit (not illustrated) sets the control signal ϕMix to an "H" level to cause the averaging switch transistor 214 to be in an ON state. Accordingly, the second charge accumulation unit 210a and the second charge accumulation unit 210b are short-circuited, and each of the second charge accumulation unit 210a and the second charge accumulation unit 210b holds an intermediate signal voltage between the respective held signal voltages subjected to the noise removal process, that is, the averaged signal voltage.

Further, at time t10, the vertical scanning circuit (not illustrated) controls the control signal ϕBIAS to stop an operation as a load of the first amplifying transistor 106a or the first amplifying transistor 106b corresponding thereto, of each of the pixel load transistor 114a and the pixel load transistor 114b.

Then, the vertical scanning circuit (not illustrated) sequentially controls the control signal ϕSEL1A and the control signal ϕSEL1B to sequentially output the respective signal voltages subjected to the noise removal process held in the first charge accumulation unit 110a and the first charge accumulation unit 110b as pixel signals of the respective pixels to the first vertical signal line 19. Further, the vertical scanning circuit (not illustrated) controls the control signal ϕSEL2 to output the averaged signal voltage subjected to the noise removal process held in the second charge accumulation unit 210a and the second charge accumulation unit 210b as a pixel signal of which the number of pixels is reduced to the second vertical signal line 29. Further, the vertical scanning circuit (not illustrated) controls the control signal ϕSEL3 to cause the signal voltage according to the signal charges generated by the photoelectric conversion unit 101a and subjected to the noise removal process, which are held in the second charge accumulation unit 230, to be output to the third vertical signal line 39 as the pixel signal obtained by decimating the pixels.

Although the timing at which the signal charges generated by the photoelectric conversion unit 101a is held in the second charge accumulation unit 230 is shown in the timing chart illustrated in FIG. 18, the signal charges generated by the photoelectric conversion unit 101b may be held in the second charge accumulation unit 230 by changing the timing at which the second charge accumulation circuit 124 is controlled. More specifically, the control signal ϕSH3 controlled together with the control signal ϕSH1A and the control signal ϕSH2A at time t2 (including time t3) and time t8 is controlled together with the control signal ϕSH1B and the control signal (SH2B at time t4 (including time t5) and time t9. Further, the control signal ϕRST3 controlled together with the control signal ϕRST2A at time t2 and time t3 is controlled together with the control signal ϕRST2B at time t4 and time t5. By changing the driving timing, the signal charges generated by the photoelectric conversion unit 101b included in the pixel 100b are subjected to the noise removal process and held (accumulated) in the second charge accumulation unit 210b and the second charge accumulation unit 230.

In the fourth configuration example of the solid-state imaging device 1 illustrated in FIG. 17, the vertical scanning circuit (not illustrated) may set the control signal Mix to an "L" level to release a short-circuit between the second charge accumulation unit 210a and the second charge accumulation unit 210b and then output the averaged signal voltage subjected to the noise removal process held in the second charge accumulation unit 210a to the second vertical signal line 29 as the pixel signal (the reduced image signal) in which the number of pixels is reduced, similar to the solid-state imaging device 1 of the second configuration example. Further, in the fourth configuration example of the solid-state imaging device 1 illustrated in FIG. 17, the vertical scanning circuit (not illustrated) may set the control signal Mix to an "H" level and control the control signal ϕSEL2 to cause the averaged signal voltage to be output to the second vertical signal line 29 as the pixel signal of the pixel 100a before the averaged signal voltage is held in each of the second charge accumulation unit 210a and the second charge accumulation unit 210b, similar to the solid-state imaging device 1 of the second configuration example. In the timing chart illustrated in FIG. 18, since the signal charges generated by the photoelectric conversion unit 101a are held in the second charge accumulation unit 230, the pixel signal of the pixel 100a that can be output to the second vertical signal line 29 is the same pixel signal as the pixel signal obtained by decimating the pixels held in the second charge accumulation unit 230 and output to the third vertical signal line 39, that is, the pixel signal obtained by decimating the pixel 100b.

Further, in the fourth configuration example of the solid-state imaging device 1, an output order of the full-resolution image signal, the reduced image signal, and the decimated image signal, or whether to output the respective pixel signals is not particularly defined, similar to the second configuration example of the solid-state imaging device 1. Therefore, detailed description of timings at which the vertical scanning circuit (not illustrated) controls the control signal φSEL1A, the control signal φSEL1B, the control signal φSEL2, and the control signal φSEL3 so that the full-resolution image signal is output to the first vertical signal line 19 will be omitted. Further, detailed description of timings at which the vertical scanning circuit controls the control signal φSEL1A, the control signal φSEL1B, the control signal φSEL2, and the control signal φSEL3 so that the reduced image signal is output to the second vertical signal line 29 will be omitted. Further, detailed description of timings at which the vertical scanning circuit controls the control signal φSEL1A, the control signal φSEL1B, the control signal φSEL2, and the control signal φSEL3 so that the decimated image signal is output to the third vertical signal line 39 will be omitted.

With these driving timings, in the fourth configuration example of the solid-state imaging device 1, the respective signal voltages according to the signal charges obtained by the two photoelectric conversion units (the photoelectric conversion unit 101a and the photoelectric conversion unit 101b) performing photoelectric conversion on incident light are read to the inter-substrate connection portions (the first inter-substrate connection portion 12a and the first inter-substrate connection portion 12b) corresponding to the two photoelectric conversion units. The signals after the noise removal process are held in the charge accumulation units (the first charge accumulation unit 110a and the first charge accumulation unit 110b) corresponding to the two respective photoelectric conversion units. Further, in the driving timing of the fourth configuration example of the solid-state imaging device 1, the respective signal voltages according to the signal charges subjected to the photoelectric conversion by the two photoelectric conversion units are selected by the multiplexer (the pixel selection transistor 115a and the pixel selection transistor 115b) and output to the second inter-substrate connection portion 22. The respective signal voltages according to the respective signal charges subjected to the photoelectric conversion by the two photoelectric conversion units are separated by the demultiplexer (the pixel selection transistor 212a and the pixel selection transistor 212b). The signals after the noise removal process are held in the charge accumulation units (the second charge accumulation unit 210a and the second charge accumulation unit 210b) corresponding to the two photoelectric conversion units. Thereafter, the signals held in the charge accumulation units (the second charge accumulation unit 210a and the second charge accumulation unit 210b) corresponding to the two photoelectric conversion units are averaged. Further, in the driving timing of the fourth configuration example of the solid-state imaging device 1, the signal voltage according to any one of the signal charges subjected to the photoelectric conversion by the two photoelectric conversion units, which is selected by the multiplexer (the pixel selection transistor 115a and the pixel selection transistor 115b) and input via the second inter-substrate connection portion 22 and the third inter-substrate connection portion 32, is selected by the selection circuit (the decimated signal sample and hold transistor 228). The signal after the noise removal process is held in the charge accumulation unit (the second charge accumulation unit 230). In the solid-state imaging device 1, signal voltages according to the signals after the noise removal process accumulated in the respective charge accumulation units (the first charge accumulation unit 110a and the first charge accumulation unit 110b) are output to the first vertical signal line 19 as the full-resolution image signal, the averaged signal voltage is output to the second vertical signal line 29 as the reduced image signal, and any one of the signal voltages after the noise removal process accumulated in the charge accumulation unit (the second charge accumulation unit 230) is output to the third vertical signal line 39 as the decimated image signal.

Thus, in the fourth configuration example of the solid-state imaging device 1 of the embodiment, the signal charges of the photoelectric conversion unit 101a included in the pixel 100a are subjected to the noise removal process and held in the first charge accumulation unit 110a, and the signal charges of the photoelectric conversion unit 101b included in the pixel 100b are subjected to the noise removal process and held in the first charge accumulation unit 110b, similar to the solid-state imaging device 1 of the second configuration example. Further, in the fourth configuration example of the solid-state imaging device 1 of the embodiment, the signal charges of the photoelectric conversion unit 101a included in the pixel 100a are subjected to the noise removal process and held in the second charge accumulation unit 210a, the signal charges of the photoelectric conversion unit 101b included in the pixel 100b are subjected to the noise removal process and held in the second charge accumulation unit 210b, and then the respective signal charges are averaged and held in the second charge accumulation unit 210a and the second charge accumulation unit 210b, similar to the solid-state imaging device 1 of the second configuration example. Accordingly, in the fourth configuration example of the solid-state imaging device 1 of the embodiment, both of the pixel signal (the full-resolution image signal) of all the pixels and the pixel signal (the reduced image signal) in which the number of pixels is reduced, that is, which is obtained by averaging (adding and averaging) the pixel signals of the respective pixels, can be output independently, similar to the solid-state imaging device 1 of the second configuration example. Therefore, in the fourth configuration example of the solid-state imaging device 1 of the embodiment, it is possible to obtain the same effects as those of the solid-state imaging device 1 of the second configuration example. That is, an image having a smaller relative noise amount or a smaller moiré generation amount and better image quality can be generated from the pixel signal output in the fourth configuration example of the solid-state imaging device 1 of the embodiment. Further, in the fourth configuration example of the solid-state imaging device 1 of the embodiment, the full-resolution image and the reduced image can be generated in parallel.

Further, in the fourth configuration example of the solid-state imaging device 1 of the embodiment, any one of the signal charges of the photoelectric conversion unit 101a included in the pixel 100a and the signal charges of the photoelectric conversion unit 101b included in the pixel 100b are subjected to the noise removal process and held in the second charge accumulation unit 230. Accordingly, in the fourth configuration example of the solid-state imaging device 1 of the embodiment, the pixel signal obtained by decimating a predetermined pixel (a decimated image signal) can be output separately and independently in addition to the full-resolution image signal and the reduced image signal. Accordingly, in the imaging system on which the solid-state imaging device 1 of the fourth configuration example is mounted, a low-resolution image (the decimated image) based on the decimated image signal output from the solid-state imaging device 1 can be generated in parallel. Therefore, in the imaging system on which the solid-state imaging device 1 of the fourth configuration example is mounted, an optimal process can be performed based on each of the full-resolution image signal, the reduced image signal, and the decimated image signal that have been separately output.

Here, an imaging system on which the solid-state imaging device 1 of the embodiment is mounted illustrated in FIG. 16 will be described. In the following description, the solid-state imaging device 1 mounted on the imaging system is the solid-state imaging device 1 having the configuration illustrated in FIG. 16 to which color filters in an R/G/B Bayer array as illustrated in FIG. 9A are affixed. That is, the solid-state imaging device 1 mounted on the imaging system is the solid-state imaging device 1 in which the full-resolution image signal, the ⅑ reduced image signal of pixel adding and averaging, and a pixel signal obtained by decimating the pixels included in the pixel array to ⅑ (hereinafter referred to as a "⅑ decimated image signal") are output separately.

In the solid-state imaging device 1 of the embodiment illustrated in FIG. 16, the full-resolution image signal, the ⅑ reduced image signal, and the ⅑ decimated image signal can be output separately and independently through the same single exposure. Therefore, in the imaging system on which the solid-state imaging device 1 is mounted, the generation of the full-resolution image based on the full-resolution image signal, the generation of the ⅑ reduced image based on the ⅑ reduced image signal of pixel adding and averaging, and the generation of the decimated image based on the ⅑ decimated image signal (hereinafter referred to as a "⅑ decimated image") can be generated in parallel. In this case, for example, since the outputs of the ⅑ reduced image signal and the ⅑ decimated image signal are completed faster than the output of the full-resolution image signal even when outputs of the full-resolution image signal, the ⅑ reduced image signal, and the ⅑ decimated image signal start simultaneously, the generation of the ⅑ reduced image signal and the generation of the ⅑ decimated image signal are completed faster than the generation of the full-resolution image signal. It is possible to simultaneously complete the generation of the ⅑ reduced image and the generation of the ⅑ decimated image.

In the imaging system on which the solid-state imaging device 1 of the embodiment is mounted illustrated in FIG. 16, it is possible to execute the AF processing using the ⅑ decimated image while generating the ⅑ reduced image (live view image) using the fact that the ⅑ reduced image signal and the ⅑ decimated image signal obtained through the same exposure can be simultaneously read faster than the full-resolution image signal. Further, in the imaging system on which the solid-state imaging device 1 of the embodiment is mounted illustrated in FIG. 16, it is possible to switch between AF processing using the ⅑ reduced image and AF processing using the ⅑ decimated image using the fact that the ⅑ reduced image signal and the ⅑ decimated image signal obtained through the same exposure can be simultaneously read. Further, in the imaging system on which the solid-state imaging device 1 of the embodiment is mounted illustrated in FIG. 16, it is possible to switch a method of performing focus control automatically or manually using the fact that the ⅑ reduced image signal and the ⅑ decimated image signal obtained through the same exposure can be simultaneously read.

Fourth System Example

Figure 19:
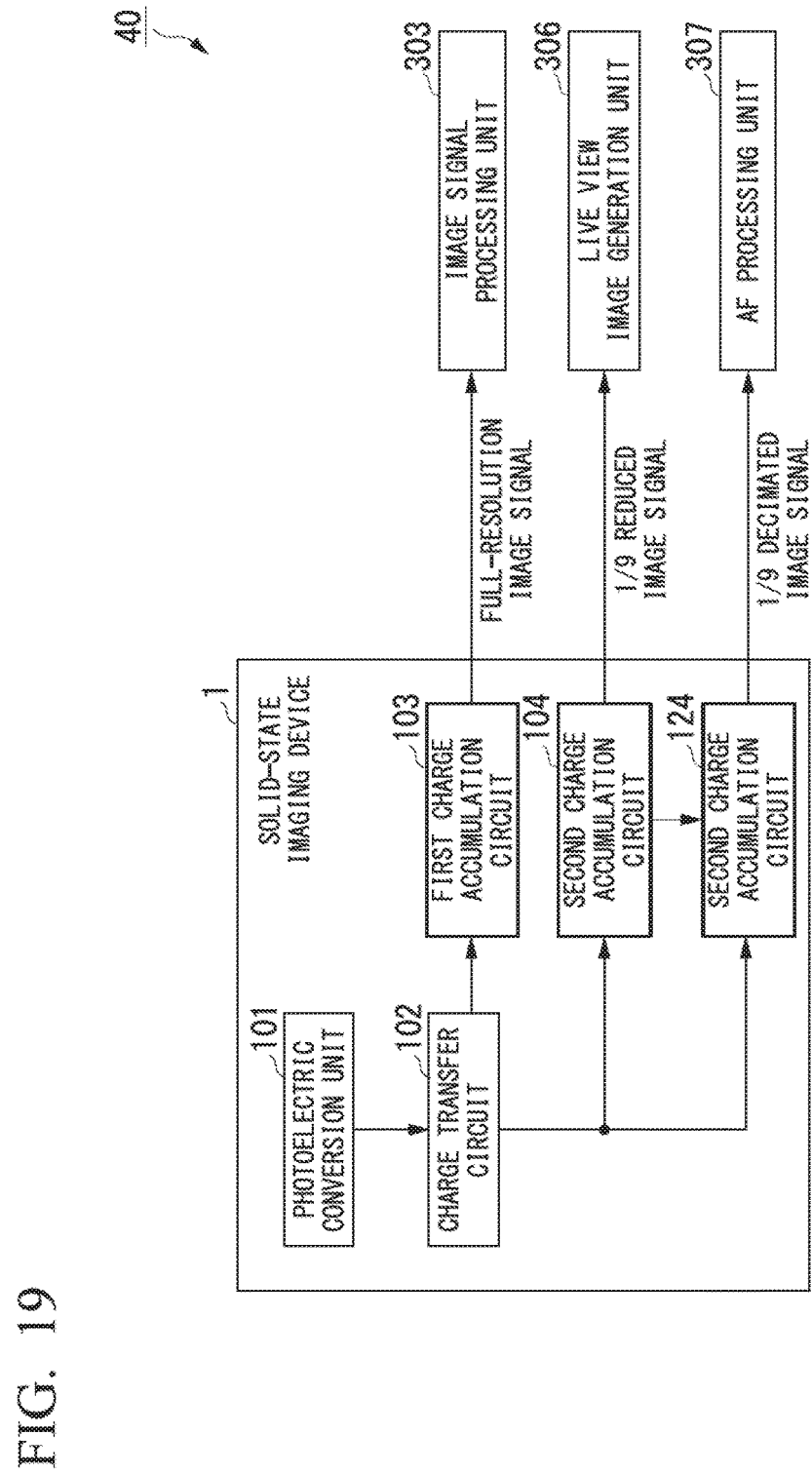
FIG. 19 is a block diagram illustrating a fourth system example of the imaging system on which the solid-state imaging device of the embodiment of the present invention is mounted.

FIG. 19 is a block diagram illustrating a fourth system example of the imaging system on which the solid-state imaging device 1 of the embodiment of the present invention is mounted. The fourth system example of the imaging system is a configuration example of an imaging system in which AF processing is performed based on the ⅑ decimated image signal read from the solid-state imaging device 1 while generating the full-resolution image based on the full-resolution image signal read from the solid-state imaging device 1 and the live view image based on the ⅑ reduced image signal read from the solid-state imaging device 1. The imaging system 40 illustrated in FIG. 19 includes the solid-state imaging device 1, an AF processing unit 307, the live view image generation unit 306, and the image signal processing unit 303. In FIG. 19, the photoelectric conversion unit 101 that performs photoelectric conversion, the charge transfer circuit 102 that transfers signal charges, the first charge accumulation circuit 103 that outputs the full-resolution image signal, the second charge accumulation circuit 104 that outputs the ⅑ reduced image signal, and the second charge accumulation circuit 124 that outputs the ⅑ decimated image signal, which are included in the solid-state imaging device 1, are also illustrated.

The AF processing unit 307 reads the ⅑ decimated image signal from the second charge accumulation circuit 124 included in the solid-state imaging device 1 to generate the ⅑ decimated image. The AF processing unit 307 analyzes the generated ⅑ decimated image to acquire information necessary for AF processing, and performs the AF processing in the imaging system 40. The AF processing unit 307 may be configured to estimate information necessary for the live view image generation process in the live view image generation unit 306 or image signal processing of generating a full-resolution image in the image signal processing unit 303 and output the information to the live view image generation unit 306 or the image signal processing unit 303.

The live view image generation unit 306 reads the ⅑ reduced image signal from the second charge accumulation circuit 104 included in the solid-state imaging device 1, and generates a ⅑ reduced image as the live view image based on the read ⅑ reduced image signal.

The image signal processing unit 303 reads the full-resolution image signal from the first charge accumulation circuit 103 included in the solid-state imaging device 1, and performs various types of predetermined image signal processing on the read full-resolution image signal to generate the full-resolution image.

With this configuration, in the imaging system 40 of the fourth system example on which the solid-state imaging device 1 of the embodiment is mounted, the live view image of good image quality can be generated based on the ⅑ reduced image signal obtained by averaging (adding and averaging) respective signal charges of the pixels included in the pixel array, and control of the focus position (AF processing) can be performed with high accuracy based on the ⅑ decimated image signal obtained by decimating the pixels included in the pixel array to ⅑. In this case, in the imaging system 40 of the fourth system example on which the solid-state imaging device 1 of the embodiment is mounted, since the ⅕ reduced image signal and the ⅕ decimated image signal are output separately and independently, it is possible to perform the AF processing with higher accuracy without limiting a bandwidth for displaying the live view image. Further, since the full-resolution image signal and the ⅕ decimated image signal are output separately and independently, a sorting process for returning an order of the pixel signal necessary when the decimated image signal is output in the related art to an original order is not necessary, and image signal processing of generating the full-resolution image is advantageous. Further, in the imaging system 40 of the fourth system example, it is possible to perform reading of the ⅕ reduced image signal or reading of the ⅕ decimated image signal while reading of the full-resolution image signal is being performed, and the process of generating the live view image and the AF processing are not interrupted, similar to the imaging system 30 in the third system example.

Fifth System Example

Figure 20:
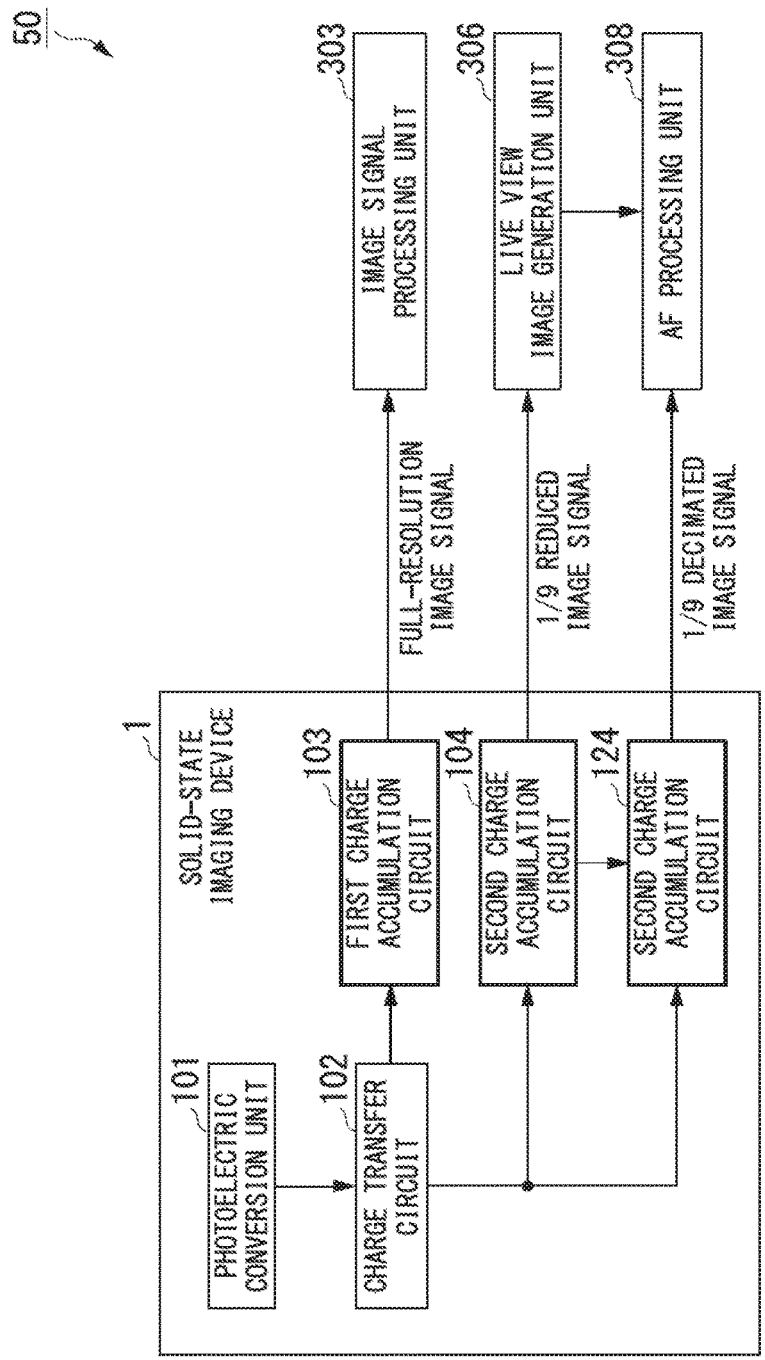
FIG. 20 is a block diagram illustrating a fifth system example of the imaging system on which the solid-state imaging device of the embodiment of the present invention is mounted.

FIG. 20 is a block diagram illustrating a fourth system example of the imaging system on which the solid-state imaging device 1 of the embodiment of the present invention is mounted. The fifth system example of the imaging system is a configuration example of an imaging system in which the AF processing unit switches between the live view image and the ⅕ decimated image generated on the basis of the ⅕ decimated image signal read from the solid-state imaging device 1 and performs AF processing while generating the full-resolution image based on the full-resolution image signal read from the solid-state imaging device 1 and the live view image based on the ⅕ reduced image signal read from the solid-state imaging device 1. The imaging system 50 illustrated in FIG. 20 includes the solid-state imaging device 1, an AF processing unit 308, the live view image generation unit 306, and the image signal processing unit 303. In FIG. 20, the photoelectric conversion unit 101 that performs photoelectric conversion, the charge transfer circuit 102 that transfers signal charges, the first charge accumulation circuit 103 that outputs the full-resolution image signal, the second charge accumulation circuit 104 that outputs the ⅕ reduced image signal, and the second charge accumulation circuit 124 that outputs the ⅕ decimated image signal, which are included in the solid-state imaging device 1, are also illustrated.

The live view image generation unit 306 reads the ⅕ reduced image signal from the second charge accumulation circuit 104 included in the solid-state imaging device 1, and generates the ⅕ reduced image as the live view image on the basis of the read ⅕ reduced image signal. The live view image generation unit 306 outputs the generated live view image to the AF processing unit 308.

The AF processing unit 308 reads the ⅕ decimated image signal from the second charge accumulation circuit 124 included in the solid-state imaging device 1 and generates the ⅕ decimated image. Further, the AF processing unit 308 performs control so that a focus position of the optical lens included in the imaging system 50 becomes a focusing point. In this case, the AF processing unit 308 selects any one of the generated ⅕ decimated image and the live view image input from the live view image generation unit 306 as an image used for control of the optical lens according to the current focus position of the optical lens, and controls the optical lens based on the selected image. More specifically, for example, in a relationship between a focus length and a contrast in the AF processing of the imaging system illustrated in FIG. 15, the AF processing unit 308 selects the generated ⅕ decimated image when the current focus position of the optical lens is in the focus range F1, and selects the live view image when the current focus position of the optical lens is outside the focus range F1, then controls the optical lens. Accordingly, the AF processing unit 308 can perform AF control based on the ⅕ decimated image signal of which the contrast is high when a current focus position of the optical lens is in a focus range F1 and perform the AF control based on the ⅕ reduced image signal of which the S/N ratio is high when the current focus position is outside the focus range F1.

Since the image signal processing unit 303 is the same as that in the fourth system example of the imaging system on which the solid-state imaging device 1 of the embodiment is mounted, detailed description thereof will be omitted.

With this configuration, in the imaging system 50 of the fifth system example on which the solid-state imaging device 1 of the embodiment is mounted, switching between the live view image generated based on the ⅕ reduced image signal in which S/N is high and the ⅕ decimated image generated based on the ⅕ decimated image signal in which contrast is high is performed and AF control is performed. Accordingly, in the imaging system 50 of the fifth system example on which the solid-state imaging device 1 of the embodiment is mounted, when the current focus position of the optical lens is separated from the focusing point, blurring of lens control due to an influence of noise of the image used for AF processing is reduced, and if the current focus position of the optical lens is close to the focusing point, the lens control can be performed more rapidly.

Although the configuration in which the image used for AF processing is switched based on the current focus position of the optical lens has been described in the fifth system example including the solid-state imaging device 1 of the embodiment, a determination as to switching of the image used for AF processing is not limited to the determination based on the current focus position of the optical lens. For example, a configuration in which the image used for AF processing is switched according to the brightness (illumination) of the subject may be adopted. In this case, in the case of low illuminance in which a subject is dark, stability of the AF control is improved by selecting the live view image generated based on the ⅕ reduced image signal of which the S/N is high in order to suppress an influence of noise in the image, and in the case of high illuminance in which the subject is bright, accuracy of the AF control is improved by selecting the ⅕ decimated image generated based on the ⅕ decimated image signal of which the contrast is high since the influence of the noise in the image is considered to be small.

Incidentally, the AF processing includes a phase difference AF in which AF processing is performed based on the phase difference in an incidence direction (light beam direction) of the light incident on the solid-state imaging device, in addition to the AF processing based on the contrast of the image as described above, a contrast AF. The phase difference AF is a process of detecting a positional deviation (phase difference) between the same subjects included in the respective images captured through the incident light in different light beam directions, and controlling the focus position of the optical lens based on information on the detected phase difference. That is, the phase difference AF is a process of controlling the focus position of the optical lens based on the phase difference between the pixel corresponding to a right eye and a pixel corresponding to a left eye.

When the solid-state imaging device 1 of the embodiment copes with the phase difference AF, respective microlenses causing light to be incident on the respective photoelectric conversion unit 101 included in the pixel array are arranged so that light in different beam directions is incident on two adjacent pixel 100 in one group (pair) (hereinafter referred to as a "pixel pair") in order to detect the phase difference. That is, the solid-state imaging device 1 of the embodiment has a configuration in which the light in different light beam directions is incident on the two photoelectric conversion unit 101 constituting the pixel pair, rather than a configuration in which one microlens causes light to be incident on one photoelectric conversion unit 101. This configuration is a configuration in which light is incident on both of a pixel corresponding to a right eye and a pixel corresponding to a left eye.

In the solid-state imaging device 1 of the embodiment, the second charge accumulation circuit 104 holds signal charges obtained by averaging the charge amounts of the respective signal charges generated by the photoelectric conversion unit 101 of a plurality of pixel pairs arranged in a predetermined direction, that is, the added and averaged signal charges. In this case, the second charge accumulation circuit 104 adds and averages the signal charges of the same color of the color filter attached to the solid-state imaging device 1. The solid-state imaging device 1 of the embodiment outputs the pixel signal according to the signal charges held in the second charge accumulation circuit 104, as a pixel signal for detecting the phase difference (hereinafter referred to as a "phase difference image signal"), separately from the pixel signal (full-resolution image signal) according to the signal charges held in each of the first charge accumulation circuit 103.

Figure 21A:
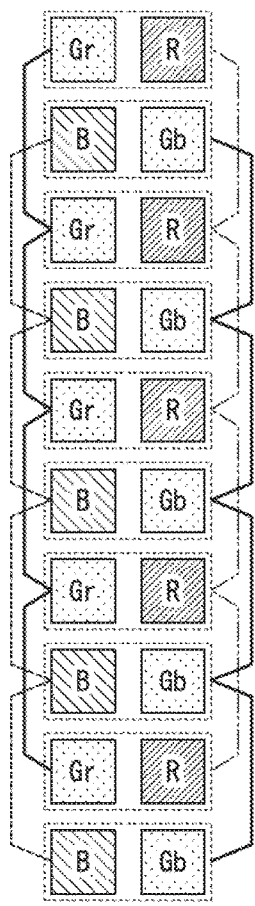
FIG. 21A is a diagram illustrating an example of an arrangement of a pixel array of the solid-state imaging device of the embodiment of the present invention.
Figure 21B:
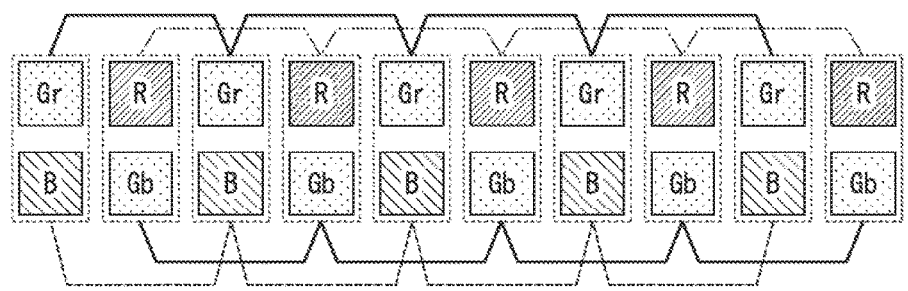
FIG. 21B is a diagram illustrating an example of an arrangement of a pixel array of the solid-state imaging device of the embodiment of the present invention.

Here, an arrangement of a plurality of pixel pairs added and averaged by the second charge accumulation circuit 104 in the solid-state imaging device 1 of the embodiment will be described. FIGS. 21A and 21B are diagrams illustrating an example of the arrangement of the pixel array of the solid-state imaging device 1 of the embodiment of the present invention. FIGS. 21A and 21B illustrate an example of a case in which color filters in a Bayer array are affixed to the solid-state imaging device 1 and ten pixel pairs are arranged in a predetermined direction.

As described above, when the solid-state imaging device 1 copes with the phase difference AF, the second charge accumulation circuit 104 holds the signal charges obtained by adding and averaging the signal charges generated by the photoelectric conversion unit 101 of the plurality of pixel pairs arranged in a predetermined direction. More specifically, when the phase difference in a row direction (a horizontal direction) is detected in the process of the phase difference AF, the second charge accumulation circuit 104 holds the signal charges obtained by adding and averaging the signal charges of the plurality of pixel pairs arranged in a column direction (a vertical direction) perpendicular to the horizontal direction in which the phase difference is detected.

FIG. 21A illustrates a case in which the signal charges of the same color of the respective pixel pairs is added, averaged, and held in a case in which 10 pixel pairs that detect a phase difference in the horizontal direction are arranged in the vertical direction perpendicular to the horizontal direction. More specifically. FIG. 21A illustrates a case in which, when a total of 10 pixel pairs including five pixel pairs of Gr pixel 100 and R pixel 100 and five pixel pairs of B pixel 100 and Gb pixel 100, which detect the phase difference in the horizontal direction, are arranged in a vertical direction, the signal charges of the Gr pixel 100, the R pixel 100, the B pixel 100, and the Gb pixel 100s constituting the respective pixel pairs are added, averaged, and held. The second charge accumulation circuit 104 outputs pixel signals according to the held signal charges of the Gr pixel 100, the R pixel 100, the B pixel 100, and the Gb pixel 100s as a phase difference image signal for detecting the phase difference in the horizontal direction.

Further, when the phase difference in the vertical direction is detected in the process of the phase difference AF, the second charge accumulation circuit 104 holds the signal charges obtained by adding and averaging the signal charges of the plurality of pixel pairs arranged in the horizontal direction perpendicular to the vertical direction in which the phase difference is detected.

FIG. 21B illustrates a case in which the signal charges of the same color of the respective pixel pairs are added, averaged, and held in a case in which 10 pixel pairs that detect a phase difference in the vertical direction are arranged in the horizontal direction perpendicular to the vertical direction. More specifically, FIG. 21B illustrates a case in which, when a total of 10 pixel pairs including five pixel pairs of Gr pixel 100 and B pixel 100 and five pixel pairs of R pixel 100 and Gb pixel 100, which detect the phase difference in the vertical direction, are arranged in the horizontal direction, the signal charges of the Gr pixel 100, the B pixel 100, the R pixel 100, and the Gb pixel 100 constituting the respective pixel pairs are added, averaged, and held. The second charge accumulation circuit 104 outputs pixel signals according to the held signal charges of the Gr pixel 100, the B pixel 100, the R pixel 100, and the Gb pixel 100 as phase difference image signals for detecting the phase difference in the vertical direction.

As illustrated in FIGS. 21A and 21B, in the solid-state imaging device 1 coping with the phase difference AF, signal charges of the same color in a direction perpendicular to a direction in which the two photoelectric conversion unit 101 constituting the pixel pair for detecting a phase difference are arranged are added and averaged. Accordingly, in the solid-state imaging device 1, it is possible to suppress interfering noise in a process of the phase difference AF by adding and averaging a plurality of signal charges even when noise is included in the signal charges generated by the respective photoelectric conversion unit 101 constituting the pixel pair. Accordingly, it is possible to improve accuracy of control of the phase difference AF even in low illumination in which a subject is dark or when a frame rate of the full-resolution image signal is increased.

Further, in the solid-state imaging device 1 coping with the phase difference AF, the pixel signal according to the signal charges held in each of the first charge accumulation circuit 103 and the pixel signal according to the signal charges held in the second charge accumulation circuit 104 can be separately output, as described above. That is, in the solid-state imaging device 1 of the embodiment coping with the phase difference AF, the pixel signals of all the pixels (the full-resolution image signal) and the pixel signal for performing phase difference AF processing (the phase difference image signal subjected to the noise removal process) can be separately output on the basis of the signal charges obtained through the same single exposure.

In the solid-state imaging device 1 of the embodiment, even when coping with the phase difference AF, a particular pixel for outputting the phase difference image signal is not arranged in the pixel array. This is a configuration that is advantageous for a solid-state imaging device of the related art coping with the phase difference AF.

More specifically, in the solid-state imaging device of the related art coping with the phase difference AF, since a particular pixel for detecting a phase difference (a phase difference detection pixel) is arranged in a partial area in the pixel array, a pixel for generating a still image or a moving image (a normal pixel) cannot be arranged in the area in which the phase difference detection pixel is arranged, and a pixel signal is missing. Therefore, in the solid-state imaging device of the related art coping with the phase difference AF, a pixel in the area in which the pixel signal is missing is treated as, for example, a defective pixel, the pixel signal is complemented through image processing such as defective pixel correction, and accordingly, it is necessary to generate an image in which there is no missing pixel. However, the complementing of the defective pixel signal causes degradation of image quality of a generated image. This is because the defective pixel signal cannot be complemented when an area in which the phase difference detection pixel is arranged is widened.

On the other hand, in the solid-state imaging device 1 of the embodiment, the phase difference image signal is output using a configuration in which microlenses are arranged so that light in different beam directions is incident on the respective photoelectric conversion unit 101 constituting the pixel pair without arranging (separate) dedicated phase difference detection pixels in the pixel array. Accordingly, in the solid-state imaging device 1 of the embodiment, it is possible to generate a good-quality image without loss of the pixel signal of the area of the pixels for detecting the phase difference, that is, without complementing the pixel signal. In this case, in the solid-state imaging device 1 of the embodiment, all the photoelectric conversion unit 101 included in the pixel array may be the photoelectric conversion unit 101 constituting any one of the pixel pairs. With this configuration, in the imaging system on which the solid-state imaging device 1 of the embodiment is mounted, it is possible to generate a still image or a moving image. Further, with this configuration, in an imaging system on which the solid-state imaging device 1 of the embodiment is mounted, for example, it is possible to easily realize a multipoint AF function of detecting a focusing point at a plurality of positions.

Further, in the solid-state imaging device of the related art coping with the phase difference AF, a pixel signal from the phase difference detection pixel is read in a process of reading a pixel signal from the pixels for generating a still image or a moving image, that is, in the solid-state imaging device of the related art, a phase difference image signal is read as some of the pixel signals of all the pixels included in the solid-state imaging device. Therefore, in the solid-state imaging device of the related art, the phase difference AF processing can be performed only after the reading of the pixel signals of all the pixels is completed. In the solid-state imaging device of the related art, after the reading of the pixel signals of all the pixels is completed, the pixel signals in the direction perpendicular to the direction in which the phase difference is detected are added, and then the phase difference is detected. Therefore, in an imaging system on which the solid-state imaging device of the related art is mounted, control of the focus position of an optical lens cannot be performed at a rate higher than the frame rate at which the pixel signal is output (at a high speed).

On the other hand, in the solid-state imaging device 1 of the embodiment, it is possible to separately output the full-resolution image signal and the phase difference image signal. The phase difference image signal output by the solid-state imaging device 1 of the embodiment is a signal in which the signal charges of the same color in a direction perpendicular to the direction in which the phase difference is detected have already been added and averaged. Further, in the solid-state imaging device 1 of the embodiment, the output of the phase difference image signal is completed faster than the output of the full-resolution image signal. Therefore, in the imaging system on which the solid-state imaging device 1 of the embodiment is mounted, generation of a still image or a moving image and phase difference AF processing can be executed in parallel, and the control of the focus position of the optical lens can be performed at a high speed.

In the example illustrated in FIGS. 21A and 21B, the case in which the plurality of pixel pairs are arranged in the direction perpendicular to the direction in which the phase difference is detected to constitute the set of pixel pairs has been described. However, in the solid-state imaging device 1 of the embodiment, a plurality of sets of pluralities of pixel pairs are also arranged in the direction in which the phase difference is detected. In this case, the second charge accumulation circuit 104 may be configured to add, average, and hold the signal charges of the same color for each set of pixel pairs, and output the respective phase difference image signals of the respective sets of pixel pairs. Further, the second charge accumulation circuit 104 may be configured to add, average, and hold the signal charges of the same color over the plurality of sets of pixel pairs, and output the signal charges as one phase difference image signal. In this case, the direction in which the second charge accumulation circuit 104 adds and averages the signal charges of the same color is a direction perpendicular to the direction in which the phase difference is detected.

Figure 22:
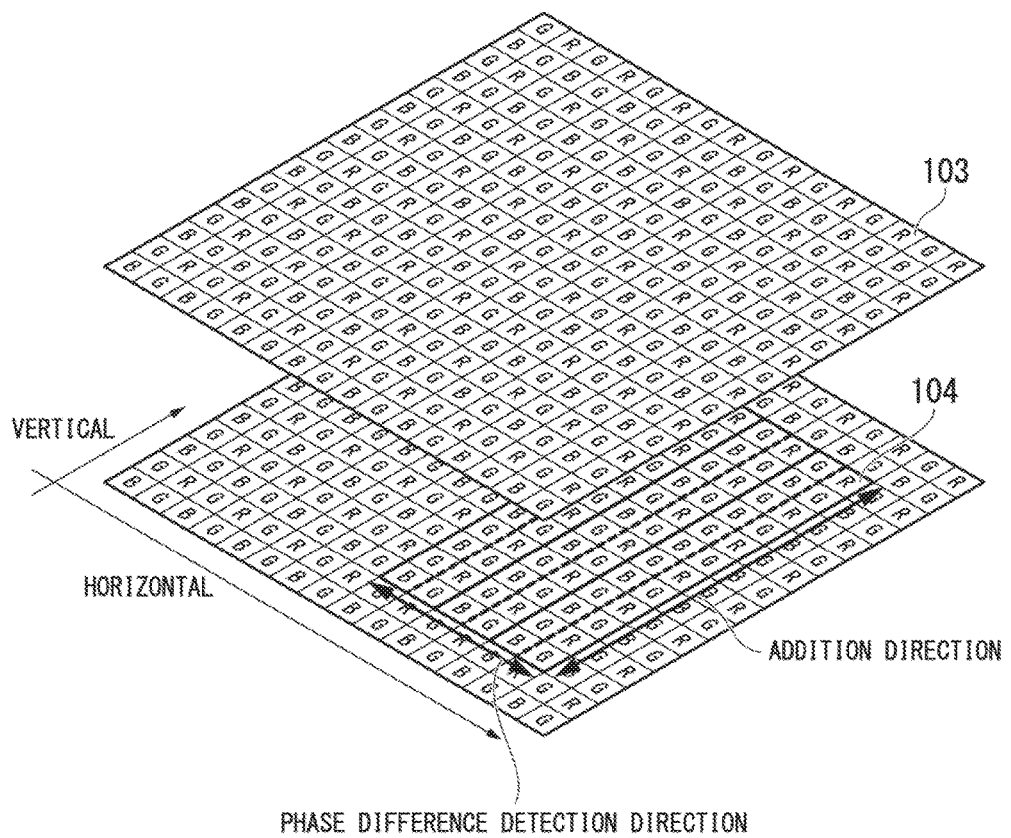
FIG. 22 is a diagram illustrating a relationship between a detection direction of a phase difference and a direction in which the signal charges are added and averaged of the solid-state imaging device of the embodiment of the present invention.

FIG. 22 is a diagram illustrating a relationship between a detection direction of a phase difference and a direction in which the signal charges are added and averaged of the solid-state imaging device 1 of the embodiment of the present invention. FIG. 22 illustrates an example of an area of pixels to which the first charge accumulation circuit 103 outputting the full-resolution image signal corresponds and an area of pixels to which the second charge accumulation circuit 104 outputting the phase difference image signal corresponds in a case in which color filters in a Bayer array are affixed to the solid-state imaging device 1. Further, FIG. 22 illustrates a relationship between a detection direction of the phase difference (a phase difference detection direction) in an area of pixels for detecting a phase difference and a direction in which the second charge accumulation circuit 104 adds and averages the signal charges (addition direction). More specifically. FIG. 22 illustrates an area of pixels for detecting a phase difference in a horizontal direction in which three sets of 12 pixel pairs arranged in a vertical direction are arranged in a horizontal direction, and a relationship between the phase difference detection direction and the addition direction in this area of pixels. As illustrated in FIG. 22, the phase difference detection direction and the addition direction have a relationship of orthogonal directions.

According to the embodiment, the solid-state imaging device 1 in which the area in which a plurality of pixel 100 are arranged in a matrix includes an area in which a plurality of pixel groups (pixel pairs) are arranged, the pixel group (pixel pairs) including at least two adjacent pixel 100 in which light (incident light) in different directions (an incidence direction and a light beam direction) is incident on the photoelectric conversion unit 101, and the second charge accumulation circuit 104 holds the amount of the signal charges obtained by adding or averaging the respective signal charges generated by the respective photoelectric conversion unit 101 in the plurality of corresponding pixel 100, the respective signal charges being obtained by photoelectrically converting the light in the same direction (incident light in a light beam direction) incident on the different pixel pairs in the area in which the plurality of pixel pairs are arranged is configured.

Further, according to the embodiment, the solid-state imaging device 1 in which, in the area in which a plurality of pixel pairs are arranged, the plurality of pixel pairs are arranged in a direction perpendicular to the direction (a predetermined direction) in which the pixel 100 constituting the pixel pair are adjacent to each other is configured.

Further, according to the embodiment, the solid-state imaging device 1 in which, in the pixel pair, the pixel 100 constituting the pixel pair are adjacent to each other at least in a row direction (horizontal direction) or a column direction (vertical direction), and in an area in which a plurality of pixel pairs are arranged, the plurality of pixel pairs are arranged at least in the column direction (the vertical direction) or the row direction (the horizontal direction) is configured.

Sixth System Example

Here, an imaging system on which the solid-state imaging device 1 coping with the phase difference AF is mounted will be described. A configuration of the solid-state imaging device 1 coping with the phase difference AF is the same as a minimum configuration of the solid-state imaging device 1 illustrated in FIG. 1, and a specific circuit configuration and a driving timing are the same as the circuit configuration and the driving timing of the first to third configuration examples illustrated in FIGS. 2 to 7.

However, the photoelectric conversion unit 101a and the photoelectric conversion unit 101b in the solid-state imaging device 1 in the first to third configuration examples illustrated in FIGS. 1, 2, 4, and 6 are the photoelectric conversion unit 101 included in the pixel of the same color corresponding to light in any one light beam direction incident on a different pixel pair. The second charge accumulation circuit 104 included in the solid-state imaging device 1 in the first to third configuration examples illustrated in FIGS. 1, 2, 4, and 6 is configured to add, average, and hold the signal charges generated by the photoelectric conversion unit 101a and the photoelectric conversion unit 101b that perform photoelectric conversion on the light of the same color in the different pixel pair.

Figure 23:
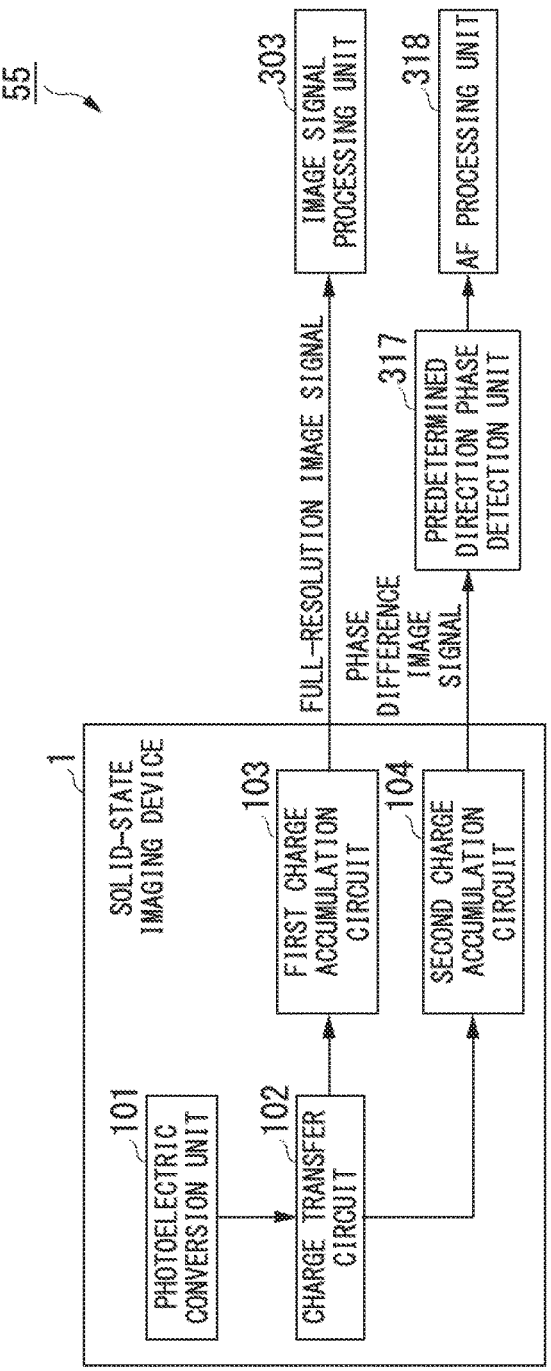
FIG. 23 is a block diagram illustrating a sixth system example of the imaging system on which the solid-state imaging device of the embodiment of the present invention is mounted.

FIG. 23 is a block diagram illustrating a sixth system example of the imaging system on which the solid-state imaging device 1 of the embodiment of the present invention is mounted. The sixth system example of the imaging system is a configuration example of an imaging system in which AF processing is performed on the basis of the phase difference image signal read from the solid-state imaging device 1 while generating the full-resolution image based on the full-resolution image signal read from the solid-state imaging device 1 coping with phase difference AF. An imaging system 55 illustrated in FIG. 23 includes the solid-state imaging device 1, a predetermined direction phase detection unit 317, an AF processing unit 318, and the image signal processing unit 303. In FIG. 23, the photoelectric conversion unit 101 that performs photoelectric conversion, the charge transfer circuit 102 that transfers signal charges, the first charge accumulation circuit 103 that outputs the full-resolution image signal, and the second charge accumulation circuit 104 that outputs the phase difference image signal, which are included in the solid-state imaging device 1, are also illustrated.

The predetermined direction phase detection unit 317 reads the phase difference image signal from the second charge accumulation circuit 104 included in the solid-state imaging device 1 and generates an image for detecting the phase difference (hereinafter referred to as a "phase difference image"). The predetermined direction phase detection unit 317 analyzes the generated phase difference image to detect a positional deviation with respect to a predetermined direction between the same subjects (a phase difference), and outputs information on the detected phase difference to the AF processing unit 318. For example, when the solid-state imaging device 1 is configured to cope with the detection of the phase difference in the horizontal direction as illustrated in FIG. 22, the predetermined direction phase detection unit 317 detects a phase difference in the horizontal direction of the same subjects included in the phase difference image generated based on the phase difference image signal read from the second charge accumulation circuit 104, and outputs information on the phase difference in the horizontal direction to the AF processing unit 318.

The AF processing unit 318 performs control so that a focus position of the optical lens included in the imaging system 55 becomes a focusing point, that is, performs the phase difference AF processing in the imaging system 55 on the basis of the information on the phase difference output from the predetermined direction phase detection unit 317. The AF processing unit 318 may be configured to estimate information necessary for image signal processing of generating the full-resolution image in the image signal processing unit 303 and output the information to the image signal processing unit 303.

The image signal processing unit 303 reads the full-resolution image signal from the first charge accumulation circuit 103 included in the solid-state imaging device 1, and performs various types of predetermined image signal processing on the read full-resolution image signal to generate the full-resolution image. As described above, in the solid-state imaging device 1 coping with the phase difference AF, a microlens is configured to be arranged so that light in different beam directions is incident on the photoelectric conversion unit 101 constituting the pixel pair. Therefore, the image signal processing unit 303 performs image signal processing in consideration of the configuration of the microlens in the solid-state imaging device 1 on the full-resolution image signal read from the first charge accumulation circuit 103, to generate the full-resolution image. In this case, when the microlenses in the solid-state imaging device 1 are configured to be arranged so that light in different light beam directions is incident on all of the photoelectric conversion unit 101 included in the pixel array, that is, when each of the photoelectric conversion unit 101 constitutes one of the pixel pairs, the image signal processing unit 303 may perform, for example, image signal processing for generating a three-dimensional full-resolution image on the full-resolution image signal read from the first charge accumulation circuit 103. Since existing technology can be used for the image signal processing in consideration of the configuration of the microlenses that is performed by the image signal processing unit 303, detailed description thereof will be omitted.

Figure 24:
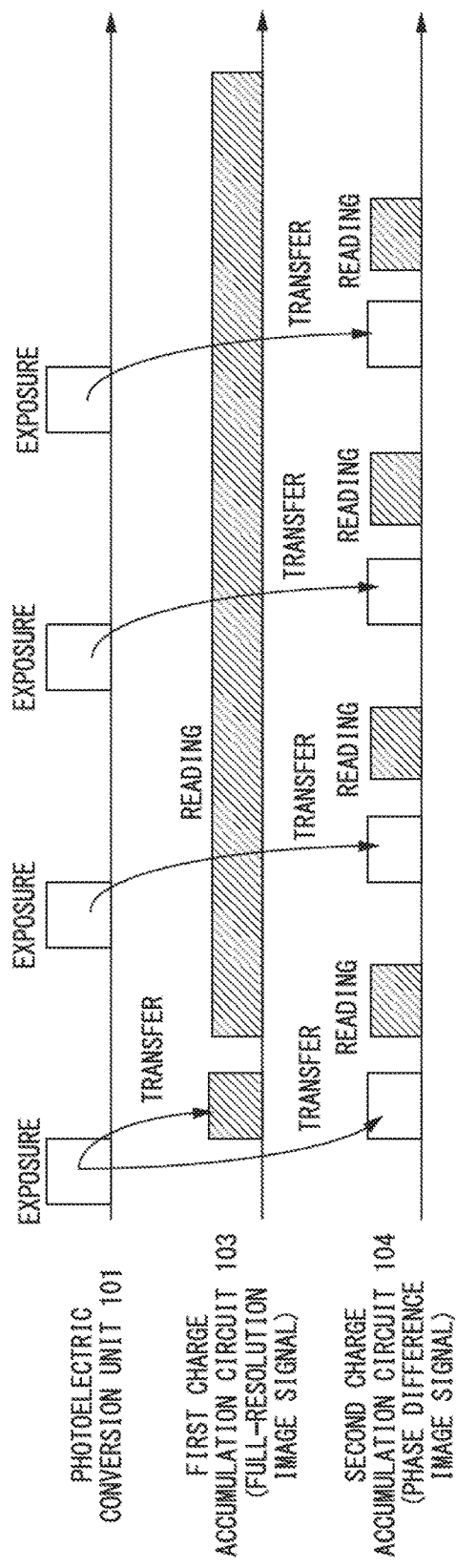
FIG. 24 is a timing chart illustrating a readout sequence of the pixel signals of the imaging system of the sixth system example on which the solid-state imaging device of the embodiment of the present invention is mounted.

Here, a timing when each pixel signal is read from the solid-state imaging device 1 coping with the phase difference AF in the sixth system example of the imaging system will be described. FIG. 24 is a timing chart illustrating a readout sequence of the pixel signals of the imaging system 55 of the sixth system example on which the solid-state imaging device 1 of the embodiment of the present invention is mounted.

The imaging system 55 causes the charge transfer circuit 102 to transfer the signal charges exposed by the photoelectric conversion unit 101 to the first charge accumulation circuit 103 and to the second charge accumulation circuit 104, as illustrated in FIG. 24, using a control device (not illustrated) that controls the solid-state imaging device 1.

Thereafter, in the imaging system 55, the full-resolution image signal from the first charge accumulation circuit 103 and the phase difference image signal from the second charge accumulation circuit 104 are read. Accordingly, the predetermined direction phase detection unit 317, the AF processing unit 318, and the image signal processing unit 303 perform processing based on the corresponding pixel signals.

In the imaging system 55, the predetermined direction phase detection unit 317 and the AF processing unit 318 may perform phase difference AF processing to perform the control of the focus position of the optical lens, and start next exposure in the photoelectric conversion unit 101. In this case, the photoelectric conversion unit 101 generates and accumulates the signal charges obtained by performing the photoelectric conversion on the incident light. The signal charges exposed by the photoelectric conversion unit 101 are transferred to the second charge accumulation circuit 104. Accordingly, the predetermined direction phase detection unit 317 and the AF processing unit 318 can perform next phase difference AF processing based on the phase difference image signal obtained through current exposure.

In this case, the transfer of the signal charges obtained through the current exposure to the first charge accumulation circuit 103 in which the reading of the signal charges that have been previously transferred does not end is not performed. In the timing chart illustrated in FIG. 24, a case in which only signal charges obtained through the first exposure are transferred to the first charge accumulation circuit 103, and signal charges obtained through the second, third, and fourth exposures are transferred to the second charge accumulation circuit 104 is shown. This is because reading of the full-resolution image signal from the first charge accumulation circuit 103 does not end at timings at which the signal charges obtained through the second, third, and fourth exposures are transferred. An operation of maintaining the signal charges without performing the reading of the full-resolution image signal while performing reading of the phase difference image signal can be performed by performing control so that the first sample and hold transistor 108a and the first clamping transistor 109a are not operated when the charges are transferred to the second charge accumulation unit 210, 210a, 221 a, and 220a in the solid-state imaging device 1 illustrated in FIGS. 2, 4, and 6, that is, the control signal φTX2 and the control signal φRST2 are set to an "L" level, and accordingly, the charges held in the first charge accumulation unit 110a are maintained in a previous state and reading is performed when necessary. That is, the pixel signal can be transferred to the second charge accumulation circuit 104 without affecting the first charge accumulation unit 110a (the same applies to the configuration corresponding to the pixel 100b).

Thus, in the imaging system 55 of the sixth system example on which the solid-state imaging device 1 coping with the phase difference AF is mounted, the phase difference AF processing can be performed on the basis of the phase difference image signal. In this case, in the imaging system 55 of the sixth system example, since the full-resolution image signal and the phase difference image signal are separately and independently output, next phase difference AF processing can be performed even in a state in which reading of the full-resolution image signal is not completed. That is, in the imaging system 55 of the sixth system example, the control of the focus position of the optical lens can be rapidly completed without waiting for the start of the phase difference AF processing until reading of the pixel signals of all the pixels is completed as in the solid-state imaging device of the related art. Accordingly, in the imaging system 55 of the sixth system example, it is possible to perform next photographing focusing on the subject at an early timing after the reading of the full-resolution image signal from the first charge accumulation circuit 103 is completed.

The directions in which the phase difference is detected in the phase difference AF processing include two directions, a horizontal direction and a vertical direction, as described above. Therefore, the solid-state imaging device 1 coping with the phase difference AF may be configured to simultaneously detect the phase differences in the two directions.

Figure 25:
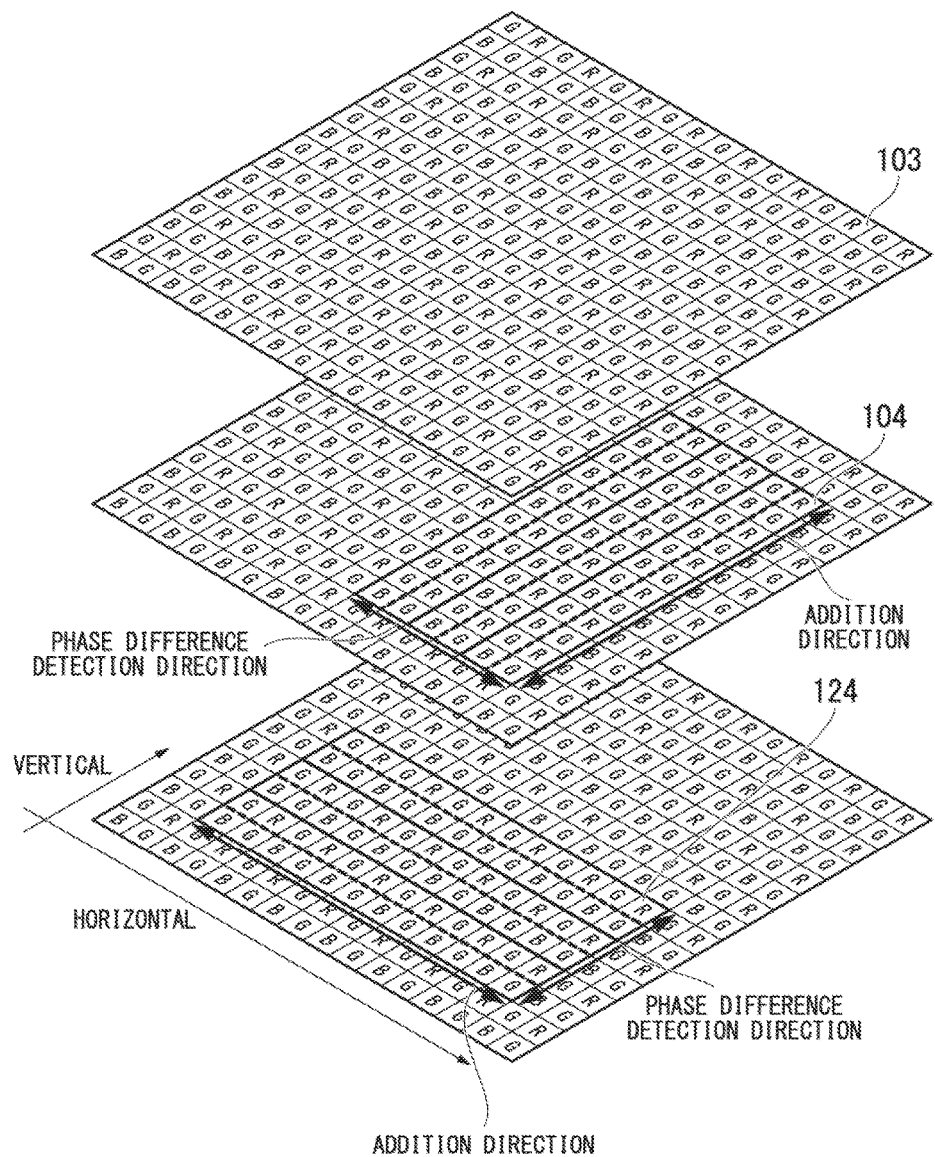
FIG. 25 is a diagram illustrating a relationship between a detection direction of a phase difference and a direction in which the signal charges are added and averaged of the solid-state imaging device of the embodiment of the present invention.

A configuration for simultaneously detecting the phase differences in the two directions in the solid-state imaging device 1 of the embodiment will be described herein. FIG. 25 is a diagram illustrating a relationship between a detection direction of a phase difference and a direction in which the signal charges are added and averaged of the solid-state imaging device 1 of the embodiment of the present invention. FIG. 25 illustrates an example of an area of pixels in a case in which the second charge accumulation circuit 104 outputs a phase difference image signal for detecting the phase difference in the horizontal direction (hereinafter referred to as a "horizontal phase difference image signal") and the second charge accumulation circuit 124 outputs the phase difference image signal for detecting the phase difference in the vertical direction (hereinafter referred to as a "vertical phase difference image signal") by causing the solid-state imaging device 1 to have the same configuration as another modification example of the solid-state imaging device 1 illustrated in FIG. 16.

FIG. 25 illustrates an example of an area of pixels to which the first charge accumulation circuit 103 outputting the full-resolution image signal corresponds, an area of pixels to which the second charge accumulation circuit 104 outputting the horizontal phase difference image signal corresponds, and an area of pixels to which the second charge accumulation circuit 124 outputting the vertical phase difference image signal corresponds in a case in which color filters in a Bayer array are affixed to the solid-state imaging device 1, similar to the example illustrated in FIG. 22. Further, FIG. 25 illustrates a relationship between a detection direction of the phase difference (a phase difference detection direction) in an area of pixels for detecting a phase difference and a direction in which the second charge accumulation circuit 104 and the second charge accumulation circuit 124 adds and average the signal charges (addition direction), similar to the example illustrated in FIG. 22.

More specifically, FIG. 25 illustrates an area of pixels for detecting a phase difference in a horizontal direction in which three sets of 12 pixel pairs arranged in a vertical direction are arranged in a horizontal direction, and a relationship between the phase difference detection direction and the addition direction of the second charge accumulation circuit 104 corresponding to this area of pixels. Further, FIG. 25 illustrates an area of pixels for detecting a phase difference in a vertical direction in which three sets of 12 pixel pairs arranged in a horizontal direction are arranged in a vertical direction, and a relationship between the phase difference detection direction and the addition direction of the second charge accumulation circuit 124 corresponding to this area of pixels. As illustrated in FIG. 25, regardless of the direction in which the phase difference is detected, the phase difference detection direction and the addition direction have a relationship of orthogonal directions.

Seventh System Example

Next, an imaging system on which the solid-state imaging device 1 coping with phase difference AF in two directions is mounted will be described. A configuration of the solid-state imaging device 1 coping with phase difference AF in two directions can be similarly considered by causing the second charge accumulation circuit 124 to have the same configuration as the second charge accumulation circuit 104, that is, causing the second charge accumulation circuit 124 to be configured to add, average, and hold the respective signal charges generated by the photoelectric conversion unit 101a and the photoelectric conversion unit 101b in the configuration of another modification example of the solid-state imaging device 1 illustrated in FIG. 16. Further, a specific circuit configuration and driving timings of the solid-state imaging device 1 coping with the phase difference AF in two directions can be similarly considered by causing the circuit configuration and the driving timings of the second charge accumulation circuit 124 to be the same circuit configuration and driving timings as the circuit configuration and the driving timings of the second charge accumulation circuit 104 in the circuit configuration and the driving timings of the fourth configuration example illustrated in FIGS. 17 and 18.

However, the second charge accumulation circuit 104 in the solid-state imaging device 1 illustrated in FIGS. 16 and 17 is configured to add, average, and hold the signal charges generated by the photoelectric conversion unit 101a and the photoelectric conversion unit 101b that perform photoelectric conversion on the light of the same color in different pixel pairs arranged in the addition direction (vertical direction). Further, the second charge accumulation circuit 124 in the solid-state imaging device 1 illustrated in FIGS. 16 and 17 is configured to add, average, and hold the signal charges generated by the photoelectric conversion unit 101a and the photoelectric conversion unit 101b that perform photoelectric conversion on the light of the same color in different pixel pairs arranged in the addition direction (horizontal direction). That is, although the photoelectric conversion unit 101a and the photoelectric conversion unit 101b are illustrated in FIG. 16, the photoelectric conversion unit 101a and the photoelectric conversion unit 101b for which the second charge accumulation circuit 104 adds and averages the signal charges, and the photoelectric conversion unit 101a and the photoelectric conversion unit 101b for which the second charge accumulation circuit 124 adds and averages the signal charges are a different photoelectric conversion unit 101a and photoelectric conversion unit 101b.

For example, in the relationship between the phase difference detection direction and the addition direction illustrated in FIG. 25, a G pixel 100 located on a lower right side of the area of the respective pixels is a reference, and the photoelectric conversion unit 101 of this G pixel 100 is considered as the photoelectric conversion unit 101a illustrated in FIG. 16. In this case, the G pixel 100 corresponding to the photoelectric conversion unit 101b added and averaged by the second charge accumulation circuit 104 is a G pixel 100 at a position after skipping the R pixel 100 adjacent in the addition direction (vertical direction). On the other hand, the G pixel 100 corresponding to the photoelectric conversion unit 101b added and averaged by the second charge accumulation circuit 124 is a G pixel 100 at a position after skipping the B pixel 100 adjacent in the addition direction (horizontal direction). Thus, although not represented in another modification example of the solid-state imaging device 1 illustrated in FIG. 16, the photoelectric conversion unit 101a and the photoelectric conversion unit 101b that add and average the signal charges are different in the second charge accumulation circuit 104 and the second charge accumulation circuit 124.

Figure 26:
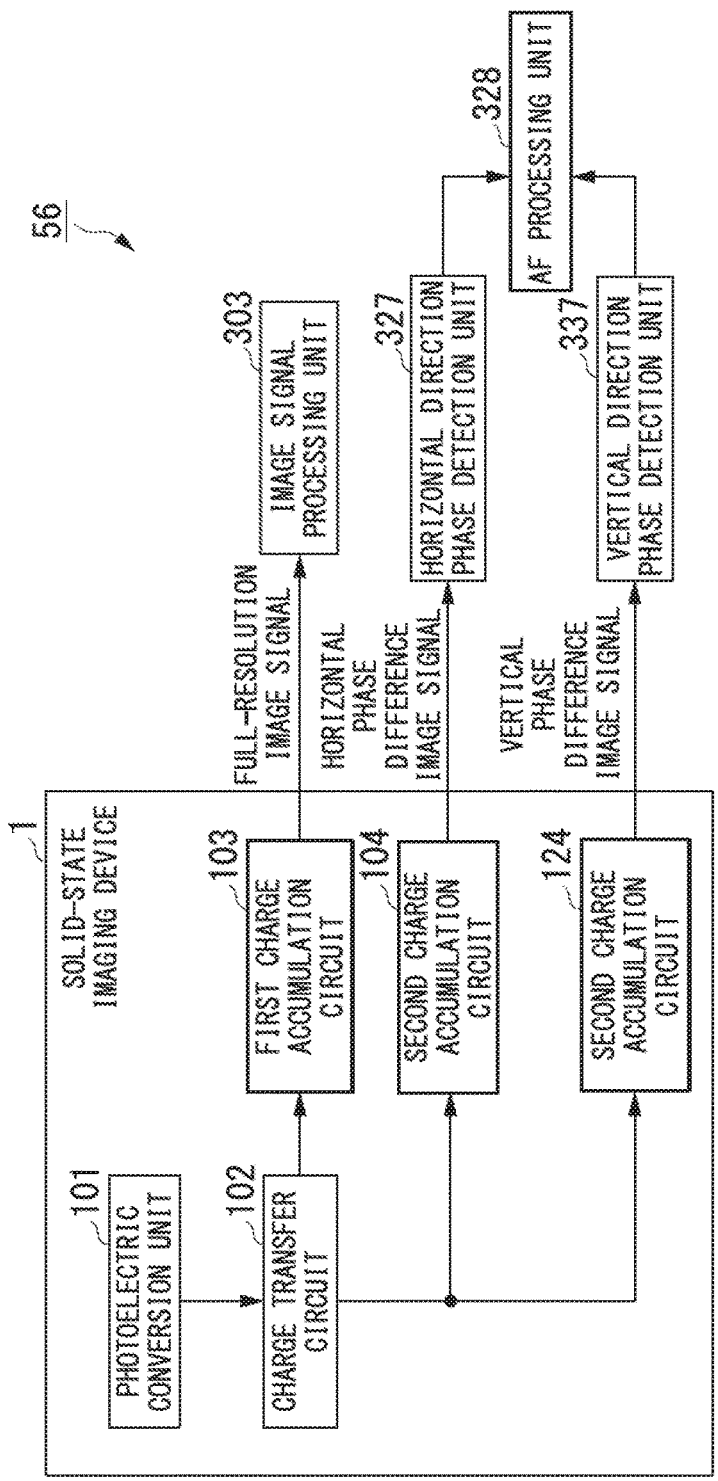
FIG. 26 is a block diagram illustrating a seventh system example of the imaging system on which the solid-state imaging device of the embodiment of the present invention is mounted.

FIG. 26 is a block diagram illustrating a seventh system example of the imaging system on which the solid-state imaging device 1 of the embodiment of the present invention is mounted. The seventh system example of the imaging system is a configuration example of an imaging system in which processing of a phase difference AF in the horizontal direction based on the horizontal phase difference image signal read from the solid-state imaging device 1 and processing of a phase difference AF in the vertical direction based on the vertical phase difference image signal read from the solid-state imaging device 1 are simultaneously performed while generating the full-resolution image based on the full-resolution image signal read from the solid-state imaging device 1 coping with the phase difference AF in two directions. An imaging system 56 illustrated in FIG. 26 includes the solid-state imaging device 1, a horizontal direction phase detection unit 327, a vertical direction phase detection unit 337, an AF processing unit 328, and the image signal processing unit 303. In FIG. 26, the photoelectric conversion unit 101 that performs photoelectric conversion, the charge transfer circuit 102 that transfers signal charges, the first charge accumulation circuit 103 that outputs the full-resolution image signal, the second charge accumulation circuit 104 that outputs the horizontal phase difference image signal, and the second charge accumulation circuit 124 that outputs the vertical phase difference image signal, which are included in the solid-state imaging device 1, are also illustrated.

The horizontal direction phase detection unit 327 reads the horizontal phase difference image signal from the second charge accumulation circuit 104 included in the solid-state imaging device 1 and generates an image for detecting the phase difference in the horizontal direction (hereinafter referred to as a "horizontal phase difference image"). The horizontal direction phase detection unit 327 analyzes the generated horizontal phase difference image to detect a positional deviation with respect to the horizontal direction between the same subjects (a phase difference in the horizontal direction), and outputs information on the detected phase difference in the horizontal direction to the AF processing unit 328. For example, when the solid-state imaging device 1 has the configuration illustrated in FIG. 25, the horizontal direction phase detection unit 327 detects the phase difference in the horizontal direction of the same subjects included in the horizontal phase difference image generated on the basis of the horizontal phase difference image signal read from the second charge accumulation circuit 104, and outputs information on the phase difference in the horizontal direction to the AF processing unit 328.

The vertical direction phase detection unit 337 reads the vertical phase difference image signal from the second charge accumulation circuit 124 included in the solid-state imaging device 1 and generates an image for detecting the phase difference in the vertical direction (hereinafter referred to as a "vertical phase difference image"). The vertical direction phase detection unit 337 analyzes the generated vertical phase difference image to detect a positional deviation with respect to the vertical direction between the same subjects (a phase difference in the vertical direction), and outputs information on the detected phase difference in the vertical direction to the AF processing unit 328. For example, when the solid-state imaging device 1 has the configuration illustrated in FIG. 25, the vertical direction phase detection unit 337 detects the phase difference in the vertical direction of the same subjects included in the vertical phase difference image generated on the basis of the vertical phase difference image signal read from the second charge accumulation circuit 124, and outputs information on the phase difference in the vertical direction to the AF processing unit 328.

The AF processing unit 328 performs control so that a focus position of the optical lens included in the imaging system 56 becomes a focusing point, that is, performs the phase difference AF processing for the two directions detected in the imaging system 56 on the basis of the information on the phase difference in the horizontal direction output from the horizontal direction phase detection unit 327 and the information on the phase difference in the vertical direction output from the vertical direction phase detection unit 337. The AF processing unit 328 may be configured to estimate information necessary for image signal processing of generating the full-resolution image in the image signal processing unit 303 and output the information to the image signal processing unit 303.

Since the image signal processing unit 303 is the same as the sixth system example of the imaging system on which the solid-state imaging device 1 is mounted, which corresponds to the phase difference AF, detailed description thereof will be omitted.

With this configuration, in the imaging system 56 of the seventh system example on which the solid-state imaging device 1 coping with the phase difference AF in two directions is mounted, the phase difference AF processing in two directions can be simultaneously performed on the basis of the horizontal phase difference image signal and the vertical phase difference image signal. In this case, in the imaging system 56 of the seventh system example, since the full-resolution image signal, the horizontal phase difference image signal, and the vertical phase difference image signal are output separately and independently, similar to the imaging system 55 of the sixth system example, next phase difference AF processing can be performed even in a state in which reading of the full-resolution image signal is not completed. Accordingly, in the imaging system 56 of the seventh system example, it is possible to obtain the same effects as those of the imaging system 55 of the sixth system example. That is, in the imaging system 56 of the seventh system example, the control of the focus position of the optical lens can be rapidly completed without waiting for the start of the phase difference AF processing until reading of the pixel signals of all the pixels is completed as in the solid-state imaging device of the related art, and it is possible to perform next photographing focusing on the subject at an early timing after the reading of the full-resolution image signal from the first charge accumulation circuit 103 is completed. Further, in the imaging system 56 of the seventh system example, since the phase differences in two directions can be simultaneously detected and the phase difference AF processing can be performed, it is possible to control the focus position of the optical lens with higher accuracy than in the imaging system 55 of the sixth system example.

The readout sequence of the pixel signals in the imaging system 56 of the seventh system example can be similarly considered only by using the phase difference image signal read from the second charge accumulation circuit 104 instead of the horizontal phase difference image signal and adding the reading of the vertical phase difference image signal from the second charge accumulation circuit 124 in the readout sequence of the pixel signals in the imaging system 55 in the sixth system example illustrated in FIG. 24. Therefore, detailed description of the readout sequence of the pixel signals in the imaging system 56 of the seventh system example will be omitted.

The configuration in which the solid-state imaging device 1 copes with the phase difference AF in two directions is not limited to the configuration in which the second charge accumulation circuit 124 having the same configuration as the second charge accumulation circuit 104 as illustrated in FIG. 25 is included. For example, the second charge accumulation circuit 104 may be configured to output a phase difference image signal in two directions including a horizontal direction and a vertical direction.

Figure 27:
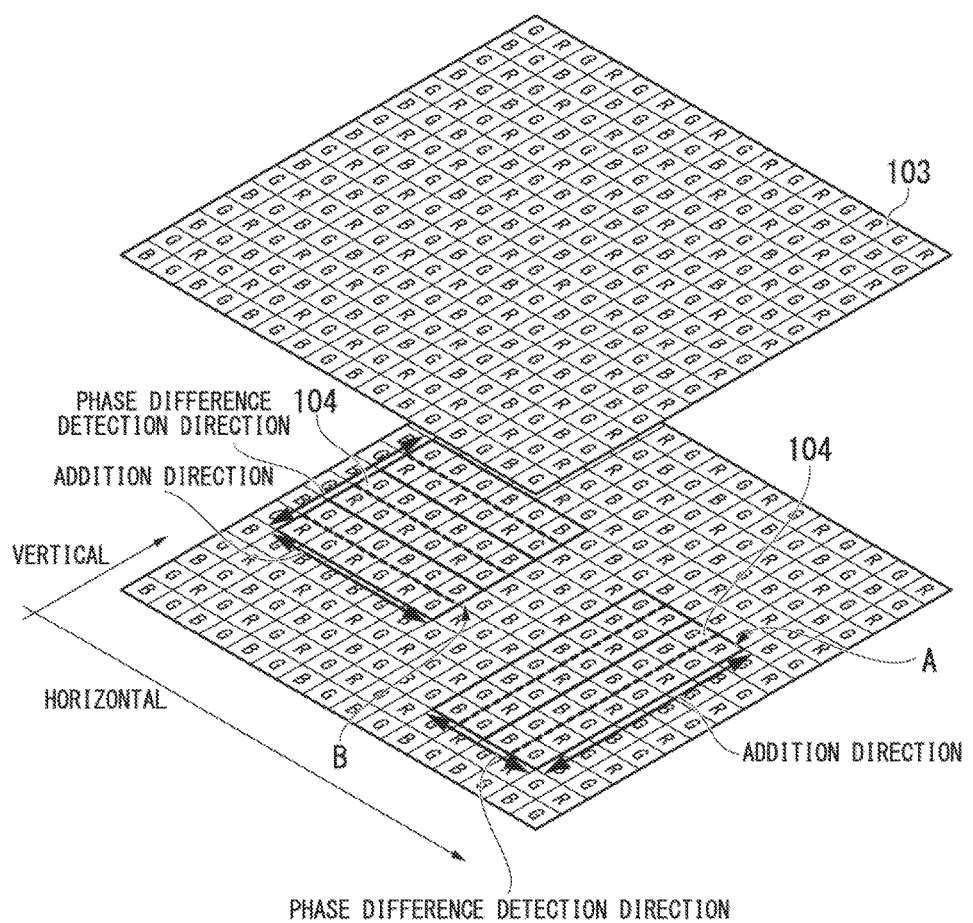
FIG. 27 is a diagram illustrating a relationship between a detection direction of a phase difference and a direction in which the signal charges are added and averaged of the solid-state imaging device of the embodiment of the present invention.

Another configuration for simultaneously detecting the phase differences in the two directions in the solid-state imaging device 1 of the embodiment will be described herein. FIG. 27 is a diagram illustrating a relationship between a detection direction of a phase difference and a direction in which the signal charges are added and averaged of the solid-state imaging device 1 of the embodiment of the present invention. FIG. 27 illustrates an example of an area of pixels in a case in which, when the solid-state imaging device 1 has the same configuration as a minimal configuration of the solid-state imaging device 1 illustrated in FIG. 1, the second charge accumulation circuit 104 outputs the horizontal phase difference image signal and the vertical phase difference image signal.

FIG. 27 illustrates an example of an area of pixels to which the first charge accumulation circuit 103 outputting the full-resolution image signal corresponds, and an area of pixels to which the second charge accumulation circuit 104 corresponds in order to output the horizontal phase difference image signal and the vertical phase difference image signal in a case in which color filters in a Bayer array are affixed to the solid-state imaging device 1, similar to the example illustrated in FIG. 22. Further, FIG. 27 illustrates a relationship between a detection direction of the phase difference (a phase difference detection direction) in an area of pixels for detecting a phase difference and a direction in which the second charge accumulation circuit 104 adds and averages the signal charges (addition direction), similar to the example illustrated in FIG. 22.

In the solid-state imaging device 1 having a configuration in which the second charge accumulation circuit 104 outputs both of the horizontal phase difference image signal and the vertical phase difference image signal, the area of pixels in which the second charge accumulation circuit 104 adds and averages the signal charges is divided into an area of pixels for detecting the phase difference in the horizontal direction and an area of pixels for detecting the phase difference in the vertical direction. The second charge accumulation circuit 104 adds and averages the signal charges for each area of pixels and outputs the signal charges as a phase difference image signal.

FIG. 27 illustrates an example of a case in which an area of pixels is divided into an area of pixels (pixel area A) in which the second charge accumulation circuit 104 adds and averages the signal charges to output a horizontal phase difference image signal, and an area of pixels (pixel area B) in which the second charge accumulation circuit 104 adds and averages the signal charges to output a vertical phase difference image signal. More specifically, FIG. 27 illustrates an example of a case in which the pixel area is divided into a pixel area A for detecting a phase difference in the horizontal direction in which two sets of eight pixel pairs arranged in the vertical direction are arranged in the horizontal direction, and a pixel area B for detecting a phase difference in the vertical direction in which three sets of six pixel pairs arranged in the horizontal direction are arranged in the vertical direction. FIG. 27 illustrates a relationship between the phase difference detection direction and the addition direction of the second charge accumulation circuit 104 corresponding to each pixel area. As illustrated in FIG. 27, in any direction in which the phase difference is detected, that is, in any of the pixel area A and the pixel area B, the phase difference detection direction and the addition direction are in an orthogonal direction relationship.

Eighth System Example

Next, an imaging system on which the solid-state imaging device 1 having another configuration coping with the phase difference AF in two directions is mounted will be described. The solid-state imaging device 1 having another configuration coping with the phase difference AF in two directions has the same configuration as a minimal configuration of the solid-state imaging device 1 illustrated in FIG. 1, and a specific circuit configuration and specific driving timings are the same as the circuit configuration and the driving timings of the first to third configuration examples illustrated in FIGS. 2 to 7.

However, the second charge accumulation circuit 104 in the solid-state imaging device 1 of the first to third configuration examples illustrated in FIGS. 1, 2, 4, and 6 has a configuration in which the signal charges generated by each of the photoelectric conversion unit 101a and the photoelectric conversion unit 101b constituting the different pixel pairs according to a difference between areas of the corresponding pixels, that is, a difference between the phase difference detection direction and the addition direction, are added, averaged, and held. That is, although the photoelectric conversion unit 101a and the photoelectric conversion unit 101b are illustrated in FIG. 1, the photoelectric conversion unit 101a and the photoelectric conversion unit 101b for which the second charge accumulation circuit 104 corresponding to the pixel area A adds and averages the signal charges, and the photoelectric conversion unit 101a and the photoelectric conversion unit 101b for which the second charge accumulation circuit 104 corresponding to the pixel area B adds and averages the signal charges are the photoelectric conversion unit 101a and the photoelectric conversion unit 101b that photoelectrically convert light of the same color in different pixel pairs.

Figure 28:
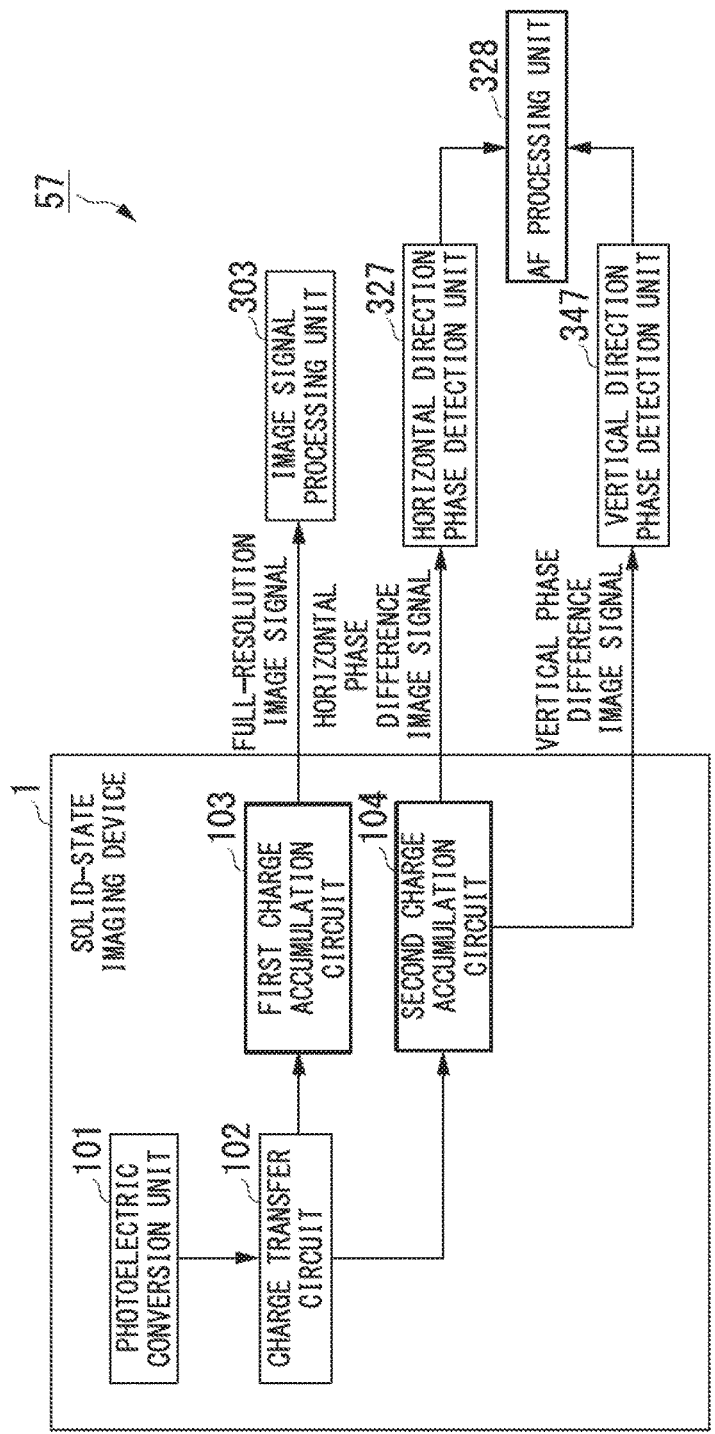
FIG. 28 is a block diagram illustrating an eighth system example of the imaging system on which the solid-state imaging device of the embodiment of the present invention is mounted.

FIG. 28 is a block diagram illustrating an eighth system example of the imaging system on which the solid-state imaging device 1 of the embodiment of the present invention is mounted. The eighth system example of the imaging system is a configuration example of an imaging system in which processing of a phase difference AF in the horizontal direction based on the horizontal phase difference image signal read from the solid-state imaging device 1 and processing of a phase difference AF in the vertical direction based on the vertical phase difference image signal read from the solid-state imaging device 1 are simultaneously performed while generating the full-resolution image based on the full-resolution image signal read from the solid-state imaging device 1 having another configuration coping with the phase difference AF in two directions. An imaging system 57 illustrated in FIG. 28 includes the solid-state imaging device 1, the horizontal direction phase detection unit 327, a vertical direction phase detection unit 347, the AF processing unit 328, and the image signal processing unit 303. In FIG. 28, the photoelectric conversion unit 101 that performs photoelectric conversion, the charge transfer circuit 102 that transfers signal charges, the first charge accumulation circuit 103 that outputs the full-resolution image signal, and the second charge accumulation circuit 104 that outputs the horizontal phase difference image signal and the vertical phase difference image signal, which are included in the solid-state imaging device 1, are also illustrated.

The horizontal direction phase detection unit 327 reads the horizontal phase difference image signal from the second charge accumulation circuit 104 corresponding to an area of pixels in which a phase difference in the horizontal direction is detected, which is included in the solid-state imaging device 1, and generates a horizontal phase difference image. The horizontal direction phase detection unit 327 analyzing the generated horizontal phase difference image, and outputs information on the detected phase difference in the horizontal direction to the AF processing unit 328. For example, when the solid-state imaging device 1 has the configuration illustrated in FIG. 27, the horizontal direction phase detection unit 327 detects the phase difference in the horizontal direction of the same subject included in the horizontal phase difference image generated based on the horizontal phase difference image signal read from the second charge accumulation circuit 104 corresponding to the pixel area A, and outputs information on the phase difference in the horizontal direction to the AF processing unit 328.

The vertical direction phase detection unit 347 reads the vertical phase difference image signal from the second charge accumulation circuit 104 corresponding to an area of pixels in which a phase difference in the vertical direction is detected, which is included in the solid-state imaging device 1, and generates a vertical phase difference image. The vertical direction phase detection unit 347 analyzing the generated vertical direction phase difference image, and outputs information on the detected phase difference in the vertical direction to the AF processing unit 328. For example, when the solid-state imaging device 1 has the configuration illustrated in FIG. 27, the vertical direction phase detection unit 347 detects the phase difference in the vertical direction of the same subject included in the vertical phase difference image generated based on the vertical phase difference image signal read from the second charge accumulation circuit 104 corresponding to the pixel area B, and outputs information on the phase difference in the vertical direction to the AF processing unit 328.

The AF processing unit 328 performs the phase difference AF processing for the two directions detected in the imaging system 57 on the basis of the information on the phase difference in the horizontal direction output from the horizontal direction phase detection unit 327 and the information on the phase difference in the vertical direction output from the vertical direction phase detection unit 347.

Since the image signal processing unit 303 is the same as in the sixth system example of the imaging system on which the solid-state imaging device 1 coping with the phase difference AF is mounted, and the seventh system example of the imaging system on which the solid-state imaging device 1 coping with the phase difference AF in the two directions is mounted, detailed description thereof will be omitted. However, in the solid-state imaging device 1 having another configuration coping with the phase difference AF in two directions, a light beam direction of the microlens that causes light in different beam directions to be incident on the respective photoelectric conversion unit 101 constituting the pixel pair for detecting the phase difference in the horizontal direction, and a light beam direction of the microlens that causes the light in different beam directions to be incident on the respective photoelectric conversion unit 101 constituting the pixel pair for detecting the phase difference in the vertical direction can be considered to be different. For example, the light beam direction of the light incident on the pixel pair for detecting the phase difference in the horizontal direction and the light beam direction of the light incident on the pixel pair for detecting the phase difference in the vertical direction can be considered to be orthogonal to each other. In this case, when the image signal processing unit 303 performs image signal processing on the full-resolution image signal read from the first charge accumulation circuit 103, the image signal processing unit 303 generates the full-resolution image in consideration of the configuration of the microlens in each area of pixels in the solid-state imaging device 1.

With this configuration, in the imaging system 57 of the eighth system example on which the solid-state imaging device 1 having another configuration coping with the phase difference AF in two directions is mounted, the phase difference AF processing in two directions can be simultaneously performed on the basis of the horizontal phase difference image signal and the vertical phase difference image signal, similar to the seventh system example of the imaging system on which the solid-state imaging device 1 coping with the phase difference AF in two directions is mounted. In this case, in the imaging system 57 of the eighth system example, since the full-resolution image signal, the horizontal phase difference image signal, and the vertical phase difference image signal are output separately and independently, similar to the imaging system 56 of the seventh system example, next phase difference AF processing can be performed even in a state in which reading of the full-resolution image signal is not completed. Accordingly, in the imaging system 57 of the eighth system example, it is possible to obtain the same effects as those of the imaging system 56 of the seventh system example. That is, in the imaging system 57 of the eighth system example, the control of the focus position of the optical lens can be rapidly completed with high accuracy, and it is possible to perform next photographing focusing on the subject at an early timing after the reading of the full-resolution image signal from the first charge accumulation circuit 103 is completed.

The readout sequence of the pixel signals in the imaging system 57 of the eighth system example can be similarly considered only when the phase difference image signal read from the second charge accumulation circuit 104 includes a horizontal phase difference image signal and a vertical phase difference image signal in the readout sequence of the pixel signals in the imaging system 55 of the sixth system example illustrated in FIG. 24. Therefore, detailed description of the readout sequence of the pixel signals in the imaging system 57 of the eighth system example will be omitted.

Thus, in the solid-state imaging device 1 of the embodiment, it is possible to cope with phase difference AF, in addition to the contrast AF. Accordingly, the solid-state imaging device 1 of the embodiment can be mounted on an imaging system that does not include a mirror that causes light (incident light) passing through the lens to be incident on the solid-state imaging device and guides light to, for example, a dedicated sensor for performing AF processing such as a phase difference AF sensor, which is conventionally widespread, that is, a mirrorless digital camera.

In the imaging system on which the solid-state imaging device 1 coping with the phase difference AF is mounted (the sixth to eighth system examples), the configuration for realizing the phase difference AF processing function in the imaging system has been described. However, the function realized in the imaging system on which the solid-state imaging device 1 coping with the phase difference AF is mounted is not limited to the phase difference AF processing function, and the functions shown in the first to fifth system examples may also be realized together. In this case, the circuit configuration and the driving timing of the solid-state imaging device 1 are a circuit configuration and a driving timing according to the function to be realized.

As described above, in the solid-state imaging device 1 coping with the phase difference AF, the case in which the respective microlenses causing light to be incident on the respective pixel 100 included in the pixel array are arranged so that light in different beam directions is incident on the two adjacent pixel 100 constituting the pixel pair has been described. However, the arrangement of the pixel 100 on which the microlenses cause the light in different beam directions to be incident is not limited to that described above. For example, the pixel 100 adjacent in the row direction (the horizontal direction), the pixel 100 adjacent in the column direction (the vertical direction), and the pixel 100 adjacent in an oblique direction are four adjacent pixel 100 in one group (hereinafter, "pixel group") may be arranged, and such that light in different light beam directions are incident on the pixels. That is, a configuration in which one microlens causes the light in different beam directions to be incident on the four photoelectric conversion unit 101 constituting the pixel group may be adopted. Even when the microlenses are arranged as above, it is possible to realize the solid-state imaging device 1 that simultaneously outputs the horizontal phase difference image signal and the vertical phase difference image signal. In this case, the signal charges that are added, averaged, and held by the second charge accumulation circuit 104 or the second charge accumulation circuit 124 are the signal charges generated by the respective photoelectric conversion unit 101 that photoelectrically convert light of the same color in different pixel groups.

Ninth System Example

Figure 29:
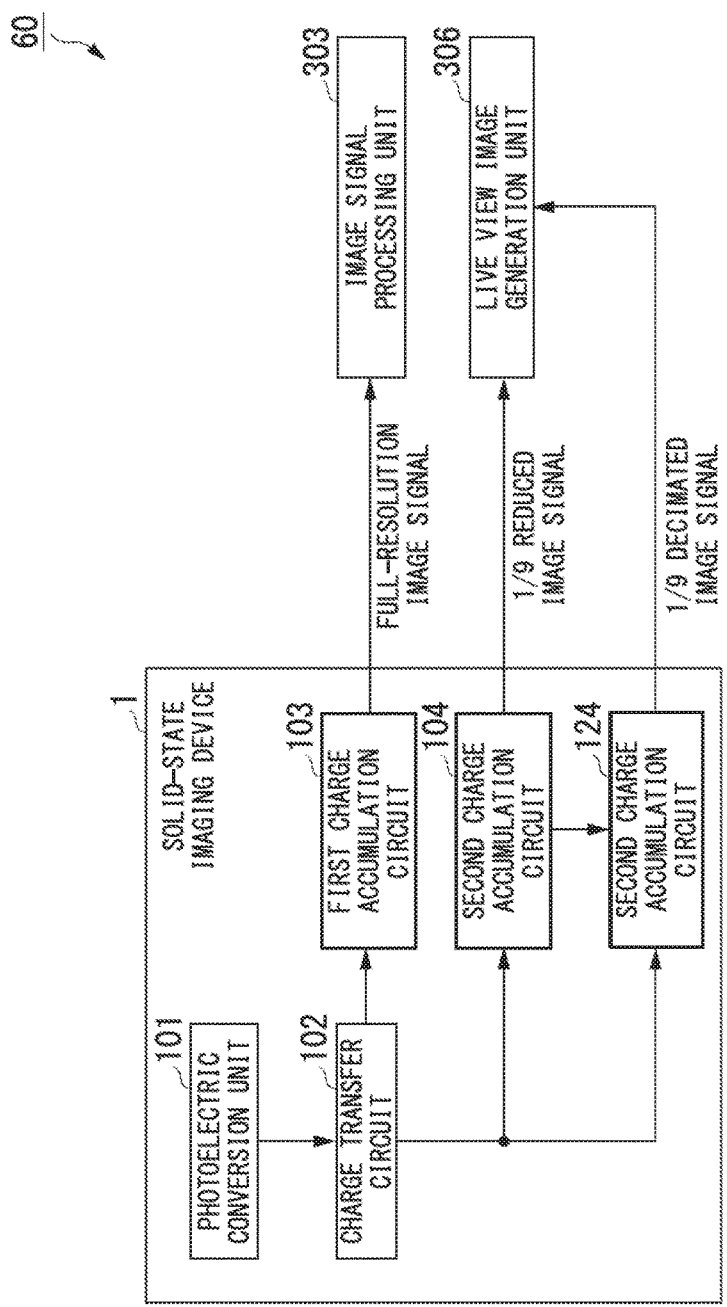
FIG. 29 is a block diagram illustrating a ninth system example of the imaging system on which the solid-state imaging device of the embodiment of the present invention is mounted.

FIG. 29 is a block diagram illustrating a ninth system example of the imaging system on which the solid-state imaging device 1 of the embodiment of the present invention is mounted. The ninth system example of the imaging system is a configuration example of an imaging system in which a pixel signal for generating the live view image is switched to any one of the ⅕ reduced image signal and the ⅕ decimated image signal read from the solid-state imaging device 1 according to a focus control method in the imaging system. The imaging system 60 illustrated in FIG. 29 includes the solid-state imaging device 1, the live view image generation unit 306, and the image signal processing unit 303. In FIG. 29, the photoelectric conversion unit 101 that performs photoelectric conversion, the charge transfer circuit 102 that transfers signal charges, the first charge accumulation circuit 103 that outputs the full-resolution image signal, the second charge accumulation circuit 104 that outputs the 1/9 reduced image signal, and the second charge accumulation circuit 124 that outputs the 1/9 decimated image signal, which are included in the solid-state imaging device 1, are also illustrated.

The live view image generation unit 306 selects any one of the 1/9 reduced image signal from the second charge accumulation circuit 104 included in the solid-state imaging device 1 and the 1/9 decimated image signal from the second charge accumulation circuit 124 included in the solid-state imaging device 1, as a pixel signal for generating the live view image, according to a focus control method set by a control device that controls the imaging system 60 of the ninth system example. The live view image generation unit 306 generates the live view image based on the selected pixel signal. That is, the live view image generation unit 306 generates the 1/9 reduced image or the 1/9 decimated image as the live view image. More specifically, since focus control is not performed using the live view image when the set focus control method is automatic, that is, when the AF processing is performed, the live view image generation unit 306 reads the 1/9 reduced image signal from the second charge accumulation circuit 104 included in the solid-state imaging device 1 and generates the 1/9 reduced image as the live view image. Further, since there is a case in which the set focus control method is manual, that is, focus control (focus adjustment) is performed using the live view image, the live view image generation unit 306 reads the 1/9 decimated image signal from the second charge accumulation circuit 124 included in the solid-state imaging device 1 and generates a 1/9 decimated image as the live view image.

Accordingly, the imaging system 60 can perform focus control for manually adjusting focus, that is, manual focus, while confirming aliasing noise such as moiré and jaggies due to aliasing generated in the live view image.

Since the image signal processing unit 303 is the same as the fourth system example and the fifth system example of the imaging system on which the solid-state imaging device 1 of the embodiment is mounted, detailed description thereof will be omitted.

With this configuration, in the imaging system 60 of the ninth system example on which the solid-state imaging device 1 of the embodiment is mounted, moiré and jaggies generated in the live view image (the 1/9 decimated image) displayed on a display device, such as a liquid crystal display (LCD) or an electronic view finder (EVF) that displays the live view image, which is included in the imaging system 60, can be used when the manual focus is performed. The 1/9 decimated image can be used for manual focus because aliasing noise that depends on a subject and further increases as a bandwidth of the subject increases appears more remarkably in the decimated image generated based on the decimated image signal obtained by decimating the pixels, in comparison with the reduced image generated based on the pixel signal obtained by adding and averaging the pixel signal. It is possible to confirm a focusing state with respect to the subject from a state of the aliasing noise.

Further, in the imaging system on which the solid-state imaging device 1 of the embodiment is mounted, a timing at which the full-resolution image is generated on the basis of the full-resolution image signal can be determined using the reduced image (live view image) generated based on the reduced image signal using the fact that the reduced image signal obtained through the same exposure can be read faster than the full-resolution image signal.

Tenth System Example

Figure 30:
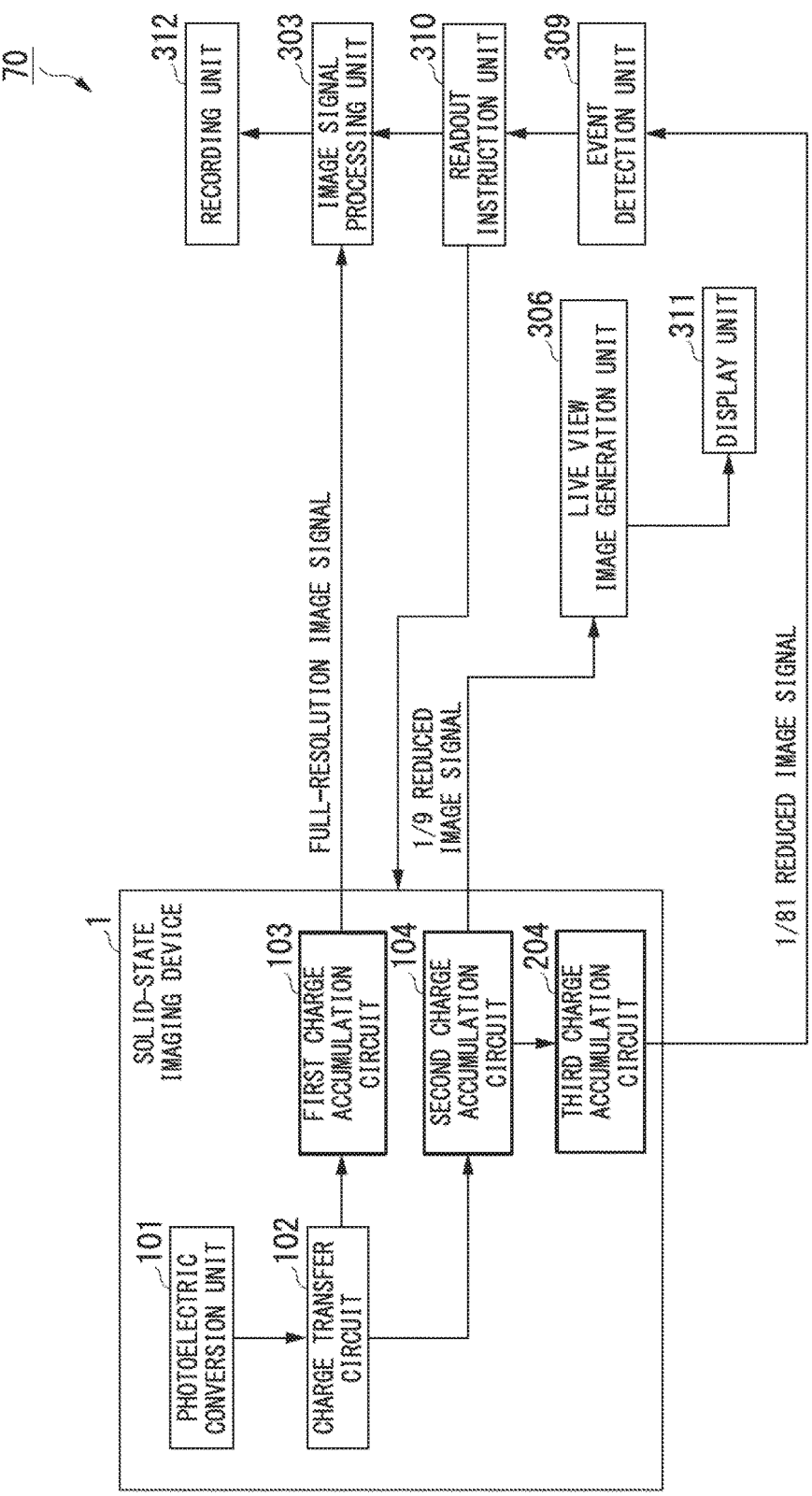
FIG. 30 is a block diagram illustrating a tenth system example of the imaging system on which the solid-state imaging device of the embodiment of the present invention is mounted.

FIG. 30 is a block diagram illustrating a tenth system example of the imaging system on which the solid-state imaging device 1 of the embodiment of the present invention is mounted. The tenth system example of the imaging system is a configuration example of an imaging system in which, when the live view image generated based on the 1/9 reduced image signal read from the solid-state imaging device 1 is displayed on the display unit, if an event of performing photographing occurs, a full-resolution image generated based on the full-resolution image signal obtained through the same exposure as the live view image displayed at a timing at which the event is detected is recorded. The imaging system 70 illustrated in FIG. 30 includes the solid-state imaging device 1, the live view image generation unit 306, an event detection unit 309, a readout instruction unit 310, the image signal processing unit 303, a display unit 311, and a recording unit 312. In FIG. 30, the photoelectric conversion unit 101 that performs photoelectric conversion, the charge transfer circuit 102 that transfers signal charges, the first charge accumulation circuit 103 that outputs the full-resolution image signal, the second charge accumulation circuit 104 that outputs the 1/9 reduced image signal, and the third charge accumulation circuit 204 that outputs the 1/81 reduced image signal, which are included in the solid-state imaging device 1, are also illustrated.

The live view image generation unit 306 reads the 1/9 reduced image signal from the second charge accumulation circuit 104 included in the solid-state imaging device 1, and generates the 1/9 reduced image based on the read 1/9 reduced image signal. The live view image generation unit 306 outputs the generated 1/9 reduced image as the live view image to the display unit 311.

The live view image generation unit 306 may be configured to read the 1/81 reduced image signal from the third charge accumulation circuit 204 included in the solid-state imaging device 1 and output the 1/81 reduced image generated based on the read 1/81 reduced image signal to the display unit 311 as the live view image.

The display unit 311 is a display device such as an LCD that displays the live view images input from the live view image generation unit 306.

The event detection unit 309 detects, as an event, a state of an operation performed with respect to the imaging system 70, such as pressing of a release button or a changing of a setting button included in the imaging system 70, and outputs information on the detected event to the readout instruction unit 310. A configuration in which the operation of the operation unit included in the imaging system 70 is detected as the event detected by the event detection unit 309, and also a specific subject or a motion of the subject is detected, for example, on the basis of the 1/81 reduced image generated based on the 1/81 reduced image signal read from the solid-state imaging device 1 or the live view image displayed on the display unit 311, and a change in a state of the subject is detected as the event, that is, the event is detected through subject recognition, may be adopted. Further, a configuration in which the event is detected according to, for example, a change in of light and darkness of the 1/81 reduced image or the live view image, or a result of monitoring of a detection unit (not illustrated) may be adopted. Further, in order to perform detection of the event at a high speed while maintaining the image quality of the live view image, the 1/9 reduced image signal read from the second charge accumulation circuit 104 may be used for the generation of the live view image, and the 1/81 reduced image signal read from the third charge accumulation circuit 204 may be used for, for example, the generation of the image (event detection image) for detecting presence or absence of a subject such as a person or a change in a state of the image, such as an illumination environment or color.

The readout instruction unit 310 instructs the reading of the pixel signal from the solid-state imaging device 1 based on the event information input from the event detection unit 309. When the event information input from the event detection unit 309 is, for example, information indicating an instruction to perform photographing performed for the imaging system 70 due to pressing of the release button or information indicating that a timing at which photographing is performed arrives due to a change in a state of a subject, the readout instruction unit 310 determines that the full-resolution image signal is read from the first charge accumulation circuit 103 included in the solid-state imaging device 1, and the full-resolution image is generated. The readout instruction unit 310 outputs the readout instruction indicating that the full-resolution image signal is read from the first charge accumulation circuit 103, to the solid-state imaging device 1 based on a result of the determination. Accordingly, the solid-state imaging device 1 outputs the full-resolution image signal from the first charge accumulation circuit 103. The readout instruction unit 310 outputs the information (notification) indicating that the instruction to read the full-resolution image signal is output to the solid-state imaging device 1, to the image signal processing unit 303. The readout instruction indicating that the full-resolution image signal is read from the first charge accumulation circuit 103 included in the solid-state imaging device 1, which is output by the readout instruction unit 310, may be simply output according to the fact that the information on the event input from the event detection unit 309 indicates an instruction to perform photographing.

The image signal processing unit 303 performs various types of predetermined image signal processing on the full-resolution image signal output from the first charge accumulation circuit 103 included in the solid-state imaging device 1 according to information (a notification) indicating that the instruction to read the full-resolution image signal, which is output from the readout instruction unit 310, is output to the solid-state imaging device 1, to generate the full-resolution image. The image signal processing unit 303 outputs the generated full-resolution image to the recording unit 312 as a recording image.

The recording unit 312 records the recording image input from the image signal processing unit 303. The recording unit 312 may be configured to record the recording image input from the image signal processing unit 303 in, for example, a recording medium detachably provided in the imaging system 70, such as a memory card.

Figure 31:
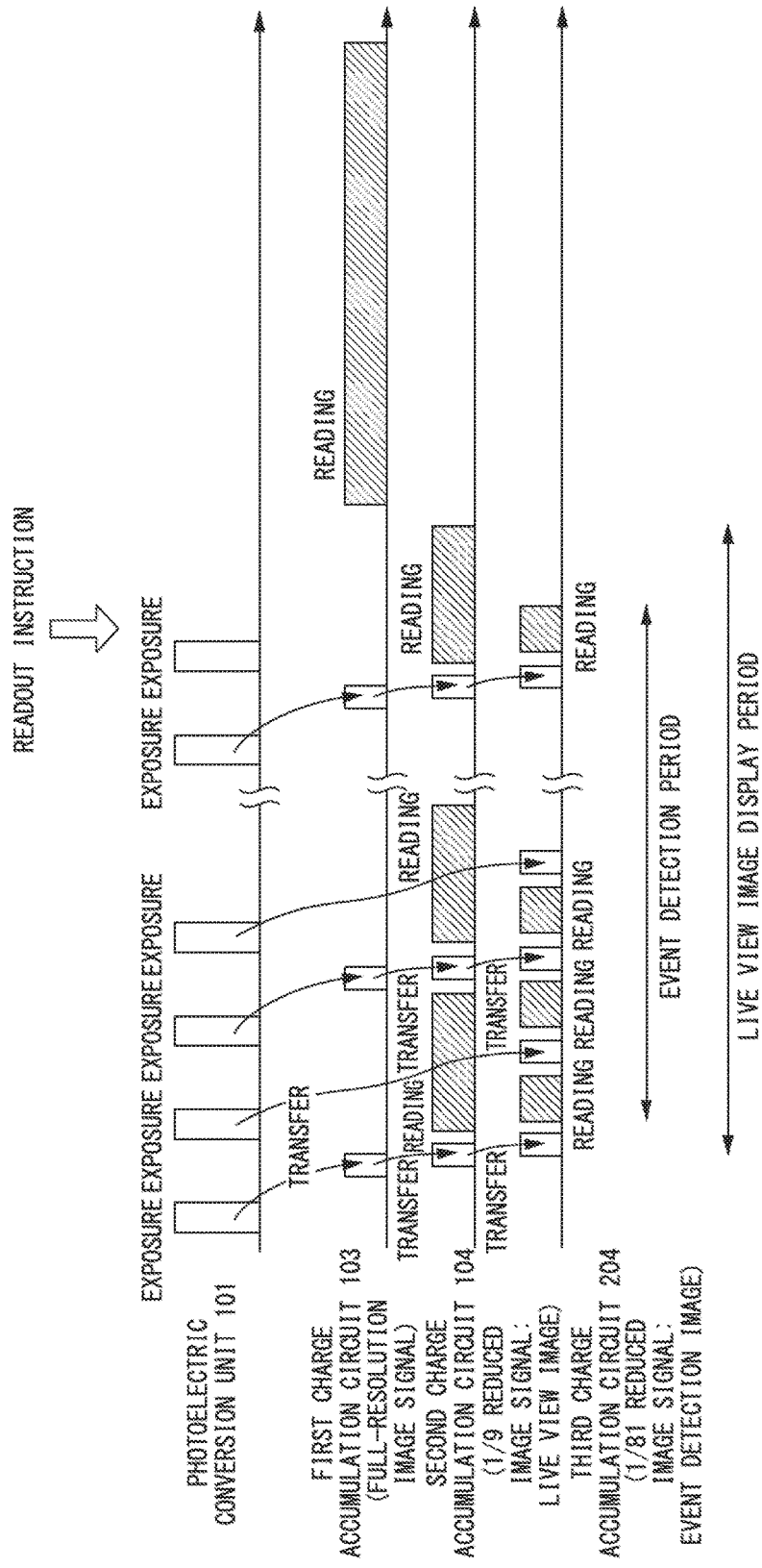
FIG. 31 is a timing chart illustrating a readout sequence of the pixel signals of the imaging system of the tenth system example on which the solid-state imaging device of the embodiment of the present invention is mounted.

Here, a timing when each pixel signal is read from the solid-state imaging device 1 in the tenth system example of the imaging system will be described. FIG. 31 is a timing chart illustrating a readout sequence of the pixel signals of the imaging system 70 of the tenth system example on which the solid-state imaging device 1 of the embodiment of the present invention is mounted.

The imaging system 70 causes the charge transfer circuit 102 to transfer the signal charges exposed by the photoelectric conversion unit 101 to the first charge accumulation circuit 103 and to the second charge accumulation circuit 104, as illustrated in FIG. 31, using a control device (not illustrated) that controls the solid-state imaging device 1. The imaging system 70 causes the second charge accumulation circuit 104 to transfer the averaged signal charges to the third charge accumulation circuit 204.

Thereafter, in the imaging system 70, the live view image generation unit 306 reads the $1/9$ reduced image signal from the second charge accumulation circuit 104, generates the $1/9$ reduced image (live view image), outputs the generated live view image to the display unit 311, and displays the generated live view image on the display unit 311. Further, in the imaging system 70, the event detection unit 309 reads the $1/81$ reduced image signal from the third charge accumulation circuit 204, generates the $1/81$ reduced image (event detection image), and starts detection of the event based on the generated event detection image.

Further, in the imaging system 70, after the transfer of the averaged signal charges to the third charge accumulation circuit 204 ends, the photoelectric conversion unit 101 starts a next exposure. Accordingly, the photoelectric conversion unit 101 generates and accumulates the signal charges obtained by performing the photoelectric conversion on the incident light.

Thereafter, in the imaging system 70, after the reading of the $1/81$ reduced image signal from the third charge accumulation circuit 204 ends, the charge transfer circuit 102 is caused to transfer the signal charges obtained by the photoelectric conversion unit 101 performing current exposure to the first charge accumulation circuit 103 and the second charge accumulation circuit 104. The second charge accumulation circuit 104 is caused to transfer the signal charges obtained by averaging the signal charges obtained by the photoelectric conversion unit 101 performing current exposure to the third charge accumulation circuit 204. Further, in the imaging system 70, the event detection unit 309 reads the $1/81$ reduced image signal in the current exposure from the third charge accumulation circuit 204, generates a next event detection image, and performs detection of the event based on the generated event detection image.

In this case, the transfer of the signal charges obtained through the current exposure to a charge accumulation circuit in which the reading of the signal charges that have been previously transferred does not end is not performed. In the timing chart illustrated in FIG. 31, a case in which the signal charges obtained through the second and fourth exposures are transferred to only the third charge accumulation circuit 204, and the signal charges obtained through the third exposures are transferred to the first charge accumulation circuit 103, the second charge accumulation circuit 104, and the third charge accumulation circuit 204 is shown. This is because reading of the $1/9$ reduced image signal from the second charge accumulation circuit 104 does not end in the live view image generation unit 306 at a timing at which the signal charges obtained through the second and fourth exposures are transferred. An operation of maintaining the signal charges without performing the reading of the full-resolution image signal and the $1/9$ reduced image signal while performing reading of the $1/81$ reduced image signal is the same as the operation of the imaging system 30 in the third system example.

Thus, in an event detection period in the imaging system 70, the exposure in the photoelectric conversion unit 101, the transfer of the signal charges to the respective charge accumulation circuits, the reading of the $1/8$ reduced image signal from the third charge accumulation circuit 204, and the generation of the event detection image are repeatedly performed at a period of a timing at which the event detection unit 309 generates the event detection image. Further, in a live view image display period in the imaging system 70, the reading of the $1/9$ reduced image signal from the second charge accumulation circuit 104 and the display of the live view image are repeatedly performed at a period of a timing at which the live view image generation unit 306 generates the live view image.

As can be seen from the timing chart of FIG. 31, the reading of the full-resolution image signal from the first charge accumulation circuit 103 is not performed in the event detection period or the live view image display period. This is because, in the process of the imaging system 70, the event detection unit 309 does not detect the event indicating that photographing is performed and the readout instruction unit 310 does not output the readout instruction. Therefore, in the imaging system 70, the signal charges of the photoelectric conversion unit 101 are transferred to the first charge accumulation circuit 103 and the second charge accumulation circuit 104 in each exposure, but when the signal charges obtained through next exposure are transferred, the signal charges transferred in the previous exposure, that is, the signal charges currently held in the first charge accumulation circuit 103, are discarded. For example, in a case in which the signal charges currently held in the first charge accumulation circuit 103 are discarded in the first to third configuration examples of the solid-state imaging device 1 illustrated in FIGS. 2 to 7, the vertical scanning circuit (not illustrated) sets the control signal φRST2 to an "H" level to cause the first clamping transistor 109a and the first clamping transistor 109b to be in an ON state. Accordingly, each of the first charge accumulation unit 110a and the first charge accumulation unit 110b is clamped to a fixed potential VREF, and the signal charges currently held in each of the first charge accumulation unit 110a and the first charge accumulation unit 110b are discarded (reset). As a method of discarding the signal charges currently held in the first charge accumulation circuit 103, the readout instruction unit 310 may be configured to output an instruction indicating that the currently held signal charges are discarded, to the solid-state imaging device 1.

Thereafter, when the event detection unit 309 detects an event indicating that photographing is performed and the readout instruction unit 310 outputs a readout instruction to the solid-state imaging device 1, the solid-state imaging device 1 outputs the full-resolution image signal from the first charge accumulation circuit 103. The image signal processing unit 303 generates the full-resolution image based on the full-resolution image signal output from the solid-state imaging device 1 according to information (a notification) indicating that the readout instruction output from the readout instruction unit 310 is output to the solid-state imaging device 1, and outputs the full-resolution image to the recording unit 312 such that the full-resolution image is recorded in the recording unit 312.

Thus, in the imaging system 70, if the transfer of the signal charges to the respective charge accumulation circuits ends, the next exposure starts and the signal charges obtained by the photoelectric conversion unit 101 performing photoelectric conversion through current exposure are transferred to the respective charge accumulation circuits. That is, in the imaging system 70, photographing is performed in a period of a timing at which a 1/81 reduced image of which the frame rate is highest is generated. When the event detection unit 309 detects the event indicating that photographing is performed, the full-resolution image signal is read from the first charge accumulation circuit 103, and the full-resolution image is generated and recorded in the recording unit 312. In this case, the full-resolution image recorded in the recording unit 312 is the full-resolution image generated based on the full-resolution image signal obtained through the same exposure as the exposure of the event detection image in which the event indicating that photographing is performed is detected.

According to the tenth system example, the imaging system (the imaging system 70) further included an event detection unit (the event detection unit 309) for detecting, the photographing operation or the change in a state of the subject, as an event, in which perform the reading of the first pixel signal (the full-resolution image signal) by the first reading unit (the image signal processing unit 303), when the event is detected by the event detection unit 309, and discards the signal charges held in the first charge accumulation circuit (the first charge accumulation circuit 103), when the event is not detected by the event detection unit, is configured.

Further, according to the tenth system example, the imaging system (the imaging system 70) further included the event detection unit 309 for detecting, a photographing operation or a change in a state of the subject, as an event, in which perform at least one of the reading of the first pixel signal (the full-resolution image signal) by the image signal processing unit 303 and the reading of the second pixel signal (the reduced image signal) by the second reading unit, when the event is detected by the event detection unit, and discards the signal charges held in among the first charge accumulation circuit 103 and the second charge accumulation circuit (the second charge accumulation circuit 104) in which the reading is not performed, when the event is not detected by the event detection unit, is configured.

Thus, in the imaging system 70 of the tenth system example on which the solid-state imaging device 1 of the embodiment is mounted, the exposure is performed at a period in which the frame rate is highest to generate the event detection image in a state in which the image quality of the live view image is held, and the full-resolution image is generated when the event is detected. In the related art, an event can be detected from the live view image and the full-resolution image can be generated. However, in the related art, since the exposure for obtaining the full-resolution image signal is performed after the event is detected, the exposure of the live view image in which the event is detected and the exposure of the full-resolution image to be recorded are different timings. On the other hand, in the imaging system 70 of the tenth system example on which the solid-state imaging device 1 of the embodiment is mounted, it is possible to generate the full-resolution image based on the full-resolution image signal obtained through the same exposure as the exposure of the event detection image in which the event is detected. That is, in the related art, there is a deviation due to a difference between a timing at which the event is detected and a timing of the exposure for generating the full-resolution image to be recorded, that is, a release time lag. On the other hand, in the imaging system 70 of the tenth system example on which the solid-state imaging device 1 of the embodiment is mounted, since the exposure for detecting the event and the exposure for generating the full-resolution image are the same exposure, it is possible to eliminate the release time lag. Particularly, event detection through subject recognition is advantageous since it is possible to record the full-resolution image generated based on the full-resolution image signal obtained through the same exposure as the event detection image in which the event is detected when the event is detected through subject recognition.

Figure 32A:
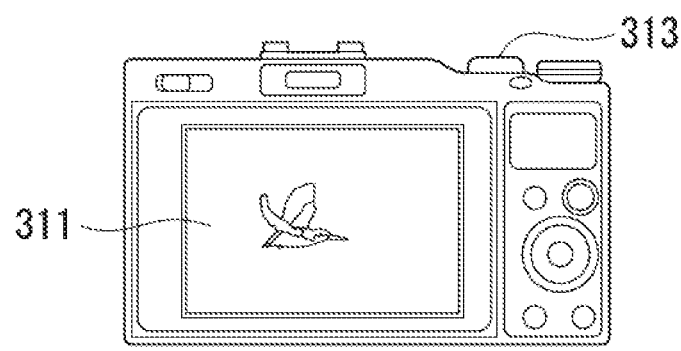
FIG. 32A is a diagram illustrating an example of an appearance of the imaging system of the tenth system example on which the solid-state imaging device of the embodiment of the present invention is mounted.

FIGS. 32A and 32B are diagrams schematically illustrating an operation of the imaging system 70 of the tenth system example on which the solid-state imaging device 1 of the embodiment of the present invention is mounted. FIG. 32A illustrates an example of an appearance of the imaging system 70, and FIG. 32B illustrates an example of live view images displayed on the display unit 311 included in the imaging system 70 in time series.

As illustrated in FIG. 32B, in the imaging system 70, live view images LV1 to LV9 that the live view image generation unit 306 generates based on the ⅑ reduced image signal obtained through the respective exposures are sequentially displayed on the display unit 311. In this case, for example, if a release button 313 illustrated in FIG. 32A is pressed at a timing at which the live view image LV5 is displayed, the event detection unit 309 outputs information on an event in which pressing of the release button 313 is detected to the readout instruction unit 310. The readout instruction unit 310 outputs a readout instruction to the solid-state imaging device 1, and outputs information (a notification) indicating that the readout instruction is output to the solid-state imaging device 1, to the image signal processing unit 303. Accordingly, the image signal processing unit 303 generates a full-resolution image P5 on the basis of the full-resolution image signal output from the first charge accumulation circuit 103 included in the solid-state imaging device 1 and records the full-resolution image P5 in the recording unit 312.

Further, in the related art, it is possible to generate a full-resolution image when an event is detected, by adopting a configuration in which the full-resolution image signals having the predetermined number of frames are all read and stored. However, for this purpose, it is necessary to include a large-capacity memory for storing full-resolution image signals having a plurality of frames. On the other hand, in the imaging system 70 of the tenth system example on which the solid-state imaging device 1 of the embodiment is mounted, since it is possible to read only the full-resolution image signal when an event is detected, it is not necessary to include a large-capacity memory, and the imaging system 70 is advantageous from the viewpoint of a storage capacity of a memory included in the imaging system. Further, in the imaging system 70 of the tenth system example on which the solid-state imaging device 1 of the embodiment is mounted, since it is not necessary to always perform the reading of the full-resolution image signal unlike the related art, the imaging system 70 is also advantageous from the viewpoint of power consumption of the imaging system.

In FIG. 32B, the live view images LV6 to LV9 after a timing of the view image LV5 at which the release button 313 is pressed are illustrated. In the imaging system 70, even after the release button 313 is pressed, that is, in a period in which the full-resolution image signal is read, next exposure can be performed and the live view images LV6 to LV9 can be displayed on the display unit 311. In this case, in the imaging system 70, the charge transfer circuit 102 does not perform transfer of the signal charges exposed by the photoelectric conversion unit 101 in a period in which the full-resolution image signal is read, to the first charge accumulation circuit 103, and transfers the signal charges to only the second charge accumulation circuit 104. Accordingly, in the imaging system 70, in a period in which the full-resolution image signal is read, the live view image generation unit 306 can read the ⅑ reduced image signal in the current exposure from the second charge accumulation circuit 104, generate next live view images LV6 to LV9, and display the live view images LV6 to LV9 on the display unit 311. The second charge accumulation circuit 104 transfers signal charges obtained by averaging the transferred signal charges to the third charge accumulation circuit 204.

Although the case in which the event detected by the event detection unit 309 is pressing of the release button 313 has been described with reference to FIGS. 32A and 32B in the above description, an operation is the same even when the event detection unit 309 detects an event through subject recognition, and the full-resolution image of an accurate timing can be generated and recorded.

As described above, according to each embodiment of the present invention, the first charge accumulation circuit that holds (accumulates) the respective signal charges generated by the photoelectric conversion units in the respective pixels included in the solid-state imaging device, and the second charge accumulation circuit that holds (accumulates) the signal charges generated through the same exposure by the photoelectric conversion unit in the predetermined pixel in order to reduce the number of pixels are included. Accordingly in each embodiment of the present invention, the pixel signals (the full-resolution image signals) according to signal charges of all the pixels, and the pixel signal in which the number of pixels is reduced (the reduced image signal and the decimated image signal), which are obtained through the same exposure from the solid-state imaging device, can be output separately and independently.

Further, in each embodiment of the present invention, by arranging the microlenses so that light in different light beam directions is incident on the respective pixels included in the solid-state imaging device, a pixel signal for detecting the phase difference (the phase difference image signal (including the horizontal phase difference image signal and the vertical phase difference image signal)) can be output separately and independently from the pixel signal (full-resolution image signal) according to the signal charges of all the pixels from the second charge accumulation circuit for holding (accumulating) the signal charges generated through the same exposure by the photoelectric conversion unit in the predetermined pixel.

Accordingly, in each embodiments of the present invention, in the imaging system including the solid-state imaging device, various processes can be performed in parallel using the respective pixel signals that are output separately and independently, based on the signal charges obtained through the same single exposure. Accordingly, in each embodiments of the present invention, it is possible to generate an image of high image quality and to achieve high image quality of the imaging system by performing the processing using the pixel signals suitable for the respective processing performed in the imaging system including the solid-state imaging device. Further, in each embodiment of the present invention, it is possible to acquire information necessary for respective processes performed in the imaging system included in the solid-state imaging device, at an early stage, or to switch between the pixel signals used according to the processes, and it is possible to achieve a high speed or high accuracy of the process of the imaging system. In each embodiment of the present invention, in the imaging system including the solid-state imaging device, it is possible to read the pixel signal and generate the image at a desired timing and achieve high performance and low power consumption of the imaging system.

A specific configuration of the present invention is not limited to any embodiment of the present invention, and various modifications are also included without departing from the spirit of the present invention. For example, in the respective embodiment of the present invention, the first to fourth configuration examples are shown as the configurations and the example of the driving methods in the respective configuration examples are shown, but a specific constitution of the configuration and the driving method is not limited to any of the embodiments of the present invention. Even when the components and the driving method of the pixels are changed, the concept of the present invention may be applied according to the changed components and the changed driving method of the pixels. For example, in the respective embodiments of the present invention, the first to tenth system examples are shown as the imaging systems, and the examples of functions and operations in the respective imaging systems are shown, but specific components included in the imaging system are not limited to the embodiments of the present invention. Even when the components included in the imaging system are changed, the concept of the present invention may be applied according to the changed components. In this case, even when the components included in the solid-state imaging device are changed according to the components included in the imaging system, the concept of the present invention may be applied according to the changed components in the solid-state imaging device.

Further, the number of pixels and the reduction number of the number of pixels are not limited to any embodiment of the present invention, and the number of pixels and the reduction number of the number of pixels may be changed without departing from the spirit of the present invention.

Further, although the example of the case in which the color filters in a Bayer array are affixed is shown in each embodiment of the present invention, the color arrangement of the color filters affixed to the solid-state imaging device is not limited to any embodiment of the present invention. Even when the color arrangement of the affixed color filters is changed, the concept of the present invention may be applied according to the changed color arrangement.

Embodiments of the present invention have been described with reference to the drawings, but specific configurations are not limited to the embodiments, and various modifications are included without departing from the scope of the present invention.

The invention claimed is:

1. A solid-state imaging device, comprising:
    pixels which are arranged in a matrix to form a pixel array;
    photoelectric conversion units each of which is arranged in each of the pixels and generates signal charges obtained by photoelectrically converting incident light;
    first charge accumulation circuits each of which holds the signal charges generated by one of the photoelectric conversion units and outputs a signal voltage according to the held signal charges as a first pixel signal;
    charge transfer circuits each of which transfers the signal charges generated by one of the photoelectric conversion units to one of the first charge accumulation circuits; and
    second charge accumulation circuits each of which holds signal charges based on the signal charges generated by at least two of the photoelectric conversion units and outputs a signal voltage according to the held signal charges as a second pixel signal in which the number of the pixels is reduced to a predetermined number,
    wherein each of the charge transfer circuits transfers the signal charges generated by one of the photoelectric conversion units in a same exposure period to one of the second charge accumulation circuits when transferring the signal charges of the same exposure period to one of the first charge accumulation circuits.

2. The solid-state imaging device according to claim 1, wherein each of the second charge accumulation circuits holds signal charges of a charge amount obtained by adding or averaging the respective signal charges generated by at least two of the photoelectric conversion units.

3. The solid-state imaging device according to claim 1, wherein each of the second charge accumulation circuits holds any one of the signal charges generated by one of the photoelectric conversion units in predetermined one of the pixels among the respective signal charges generated by at least two of the photoelectric conversion units.

4. The solid-state imaging device according to claim 2, further comprising:
    a photoelectric conversion substrate on which the photoelectric conversion units are arranged;
    a first substrate on which one of the first charge accumulation circuits and second charge accumulation circuits are arranged;
    a second substrate on which the other of the first charge accumulation circuits and the second charge accumulation circuits are arranged;
    a first connection portion that electrically connects the photoelectric conversion substrate to the first substrate; and
    a second connection portion that electrically connects the first substrate to the second substrate.

5. The solid-state imaging device according to claim 2, further comprising:
    a photoelectric conversion substrate on which the photoelectric conversion units are arranged;
    a first substrate on which the first charge accumulation circuits and the second charge accumulation circuits are arranged; and
    a first connection portion that electrically connects the photoelectric conversion substrate to the first substrate.

6. The solid-state imaging device according to claim 2, wherein the pixel array includes an area in which pixel groups are arranged, each of the pixel groups including at least adjacent two of the pixels on which light in different directions is incident, and
    each of the second charge accumulation circuits holds signal charges of a charge amount obtained by adding or averaging the respective signal charges generated by at least two of the photoelectric conversion units, the respective signal charges being obtained by photoelectrically converting light in a same direction incident on the pixel groups.

7. The solid-state imaging device according to claim 6, wherein, in the area in which the pixel groups are arranged, the pixel groups are arranged in a direction perpendicular to a direction in which the pixels constituting one of the pixel groups are adjacent to each other.

8. The solid-state imaging device according to claim 7, wherein, in one of the pixel groups,
    the pixels constituting one of the pixel groups are adjacent to each other at least in a row direction or a column direction, and
    in the area in which the pixel groups are arranged,
    the pixel groups are arranged at least in the column direction or the row direction.

9. The solid-state imaging device according to claim 1, further comprising:
    third charge accumulation circuits each of which holds signal charges based on the signal charges held in at least two of the second charge accumulation circuits and outputs a signal voltage according to the held signal charges as a third pixel signal in which the number of the pixels is further reduced to a predetermined number.

10. The solid-state imaging device according to claim 9, wherein each of the third charge accumulation circuits holds signal charges of a charge amount obtained by adding or averaging the respective signal charges held in at least two of the second charge accumulation circuits.

11. The solid-state imaging device according to claim 9, further comprising:
   a photoelectric conversion substrate on which the photoelectric conversion units are arranged;
   a first substrate on which one of the first charge accumulation circuits and the second charge accumulation circuits are arranged;
   a second substrate on which the other of the first charge accumulation circuits and the second charge accumulation circuits are arranged;
   a third substrate on which the third charge accumulation circuits are arranged;
   a first connection portion that electrically connects the photoelectric conversion substrate to the first substrate;
   a second connection portion that electrically connects the first substrate to the second substrate; and
   a third connection portion that electrically connects the second substrate to the third substrate.

12. The solid-state imaging device according to claim 9, further comprising:
   a photoelectric conversion substrate on which the photoelectric conversion units are arranged;
   a first substrate on which the first charge accumulation circuits, the second charge accumulation circuits, and the third charge accumulation circuits are arranged; and
   a first connection portion that electrically connects the photoelectric conversion substrate to the first substrate.

* * * * *